US012587979B2

(12) United States Patent  (10) Patent No.: US 12,587,979 B2
Qiao et al.  (45) Date of Patent: Mar. 24, 2026

(54) HANDOVER FOR SYNCHRONIZATION OF DATA FLOWS

(71) Applicant: Ofinno, LLC, Reston, VA (US)

(72) Inventors: Weihua Qiao, Herndon, VA (US); Esmael Hejazi Dinan, McLean, VA (US); Kyungmin Park, Vienna, VA (US); Peyman Talebi Fard, Vienna, VA (US); Jinsook Ryu, Oakton, VA (US); Taehun Kim, Fairfax, VA (US)

(73) Assignee: Ofinno, LLC, Reston, VA (US)

( * ) Notice: Subject to any disclaimer, the term of this patent is extended or adjusted under 35 U.S.C. 154(b) by 366 days.

(21) Appl. No.: 18/107,646

(22) Filed: Feb. 9, 2023

(65) Prior Publication Data

US 2023/0189172 A1  Jun. 15, 2023

Related U.S. Application Data

(63) Continuation of application No. PCT/US2021/045501, filed on Aug. 11, 2021.

(60) Provisional application No. 63/064,165, filed on Aug. 11, 2020.

(51) Int. Cl.
*H04W 56/00*  (2009.01)
*H04W 36/00*  (2009.01)

(52) U.S. Cl.
CPC ................................ *H04W 56/001* (2013.01)

(58) Field of Classification Search
CPC .................................................. H04W 56/001
See application file for complete search history.

(56) References Cited

U.S. PATENT DOCUMENTS

| | | | |
|---|---|---|---|
| 8,692,861 B2 | 4/2014 | Liu et al. | |
| 2002/0122424 A1* | 9/2002 | Kawarai | H04L 49/9094 |
| | | | 370/412 |
| 2005/0100102 A1 | 5/2005 | Gazdzinski et al. | |
| 2016/0223986 A1 | 8/2016 | Archambeau et al. | |
| 2018/0063484 A1 | 3/2018 | Smits | |
| 2021/0114616 A1* | 4/2021 | Altman | H04W 76/15 |
| 2021/0174791 A1* | 6/2021 | Shen | G10L 25/84 |
| 2022/0361129 A1* | 11/2022 | Fan | H04W 56/0045 |
| 2023/0067851 A1* | 3/2023 | Zeng | H04W 28/0268 |

FOREIGN PATENT DOCUMENTS

| | | |
|---|---|---|
| CN | 107885016 A | 4/2018 |
| EP | 4 294 074 A1 | 12/2023 |

OTHER PUBLICATIONS 5G powers 3D holographic communication; 5G power holographic calls—Ericsson; https://www.ericsson.com/en/news/2018/11/3d-holographic-calls-with-5g; Nov. 22, 2018.
Strinati et al.; 6G: The Next Frontier; arXiv: 1901.03239 v2 [cs.NI]; May 16, 2019; pp. 1-16.

(Continued)

*Primary Examiner* — Xuan Lu
(74) *Attorney, Agent, or Firm* — Xin Gao; Kavon Nasabzadeh; Jacob L. Mangan

(57) ABSTRACT

A second base station receives, from a first base station, an indication of synchronization of data flows of one or more wireless devices. The second base station synchronizes forwarding, based on the indication of synchronization, of packets of the data flows.

20 Claims, 31 Drawing Sheets

(56) References Cited

OTHER PUBLICATIONS

Jingnan et al.; An Efficient Packet Scheduling Algorithm in Network Processors; Published 2005; IEEE.

Kalansooriya et al.; Assessing the Applicability of 3D Holographic Technology as an Enhanced Technology for Distance Learning; The IAFOR Journal of Education; Technologies & Education Special Edition; 2015; pp. 43-57.

Li et al.; Network 2030 A Blueprint of Technology, Applications and Market Drivers Towards the Year 2030 and Beyond; 2019.

Makhijani; Holographic Type Communication Delivering the Promise of Future Media by 2030; ICNS, IARIA; Jun. 3, 2019; Athens, Greece.

Li; Next-Generation Networks: Requirements and Research Directions; ETSI New Internet Forum; Oct. 12, 2018.

Blinder et al.; Signal processing challenges for digital holographic video display systems; Signal Processing: Image Communication; vol. 70; 2019; pp. 114-130.

Li; Towards a New Internet for the Year 2030 and Beyond; Third Annual ITU IMT-2020/5G Workshop and Demo Day; Jul. 18, 2018; Geneva, Switzerland.

S1-202142; Study on Holographic-Type Communication Service; China Telecom; 3GPP TSG SA WG1 Meeting #90e; E-meeting, May 18-22, 2020.

S1-202254; (revision of S1-202140); 3GPP TSG-SA WG1 Meeting #90; Electronic Meeting, May 18-22, 2020; Source: China Telecom; Title: New SID on Study on Holographic-Type Communication Service; Document for : Approval; Agenda Item: 4.

3GPP TS 38.300 V16.2.0 (Jul. 2020); Technical Specification; 3rd Generation Partnership Project; Technical Specification Group Radio Access Network; NR; NR and NG-RAN Overall Description; Stage 2; (Release 16).

3GPP TS 38.423 V16.2.0 (Jul. 2020); Technical Specification; 3rd Generation Partnership Project; Technical Specification Group Radio Access Network; NG-RAN; Xn application protocol (XnAP); (Release 16).

International Search Report and Written Opinion of the International Searching authority mailed Nov. 22, 2021, in International Application No. PCT/US2021/045501.

S2-18xxxx; SA WG2 Meeting #128-Bis; Aug. 20-24, 2018, Sophia Antipolis; Source: Nokia, Nokia Shanghai Bell; Title: Mobility for vertical LAN (deterministic) services (e.g. TSN); Document for: Discussion/ Approval; Agenda Item: 6.15; Work Item/ Release: FS_Vertical_LAN.

R3-191233; 3GPP TSG-RAN WG3 #103bis; Xi'an, China, Apr. 8-12, 2019; Source: CATT; Title: Discussion on TSC Pattern info transfer; Agenda Item: 17.3; Document for: Discussion and Decision.

R3-193467; 3GPP TSG-RAN WG3 #105; Ljubljana, Slovenia, Aug. 26-Aug. 30, 2019; Source: CATT; Title: Discussion on TSC Assistance Information; Agenda Item: 17.3.2; Document for: Discussion and Decision.

Office Action mailed Oct. 11, 2024 in European Patent Application No. 21762967.4.

* cited by examiner

RM State Transition in UE

RM State Transition in AMF

CM State Transition in UE

CM State Transition in AMF

| IE/Group Name | Presence | IE type and reference | Semantics description |
|---|---|---|---|
| Message Type | M | | |
| Source NG-RAN node UE XnAP ID reference | M | NG-RAN node UE XnAP ID | Allocated at the source NG-RAN node |
| Cause | M | | |
| Target Cell Global ID | M | | Includes either an E-UTRA CGI or an NR CGI |
| GUAMI | M | | |
| UE Context Information | | | |
| >NG-C UE associated Signalling reference | M | AMF UE NGAP ID | Allocated at the AMF on the source NG-C connection. |
| >Signalling TNL association address at source NG-C side | M | CP Transport Layer Information | AMF's IP address of the SCTP association |
| >UE Security Capabilities | M | | |
| >AS Security Information | M | | |
| >Index to RAT/Frequency Selection Priority | O | | |
| >UE Aggregate Maximum Bit Rate | M | | |
| >PDU Session Resources To Be Setup List | | | UL tunnel information per PDU Session Resource; and the source side QoS flow ⇔ DRB mapping |
| >RRC Context | M | OCTET STRING | Includes the *HandoverPreparationInformation* message |
| >Location Reporting Information | O | | Includes the necessary parameters for location reporting. |
| >Management Based MDT PLMN List | O | MDT PLMN List | |
| >5GC Mobility Restriction List Container | O | | |
| >UE Radio Capability ID | O | | |
| UE History Information | M | | |
| UE Context Reference at the S-(R)AN node | O | | |
| >Global (R)AN Node ID | M | | |
| >S-(R)AN node UE XnAP ID | M | NG-RAN node UE XnAP ID | |
| Conditional Handover Information | O | | |
| >CHO Trigger | M | ENUMERATED | |
| >Target RAN node UE XnAP ID | C-ifCHOmod | NG-RAN node UE XnAP ID | Allocated at the T-(R)AN node |
| Flows Synchronization Information | | | |
| >Flows Synchronization Indication | O | | Request Synchronization of multiple SDFs |
| >Flow Information | O | | Flow information of multiple SDFs |
| >HTC Network Slice | O | | |
| >HTC DNN | O | | |
| >Time Configuration information | O | | |

FIG. 21

S-(R)AN receiving, by a source base station from a first network function (FNF), a first message comprising a flows synchronization request indication (FSRI) requesting synchronization of multiple service data flows (SDFs)

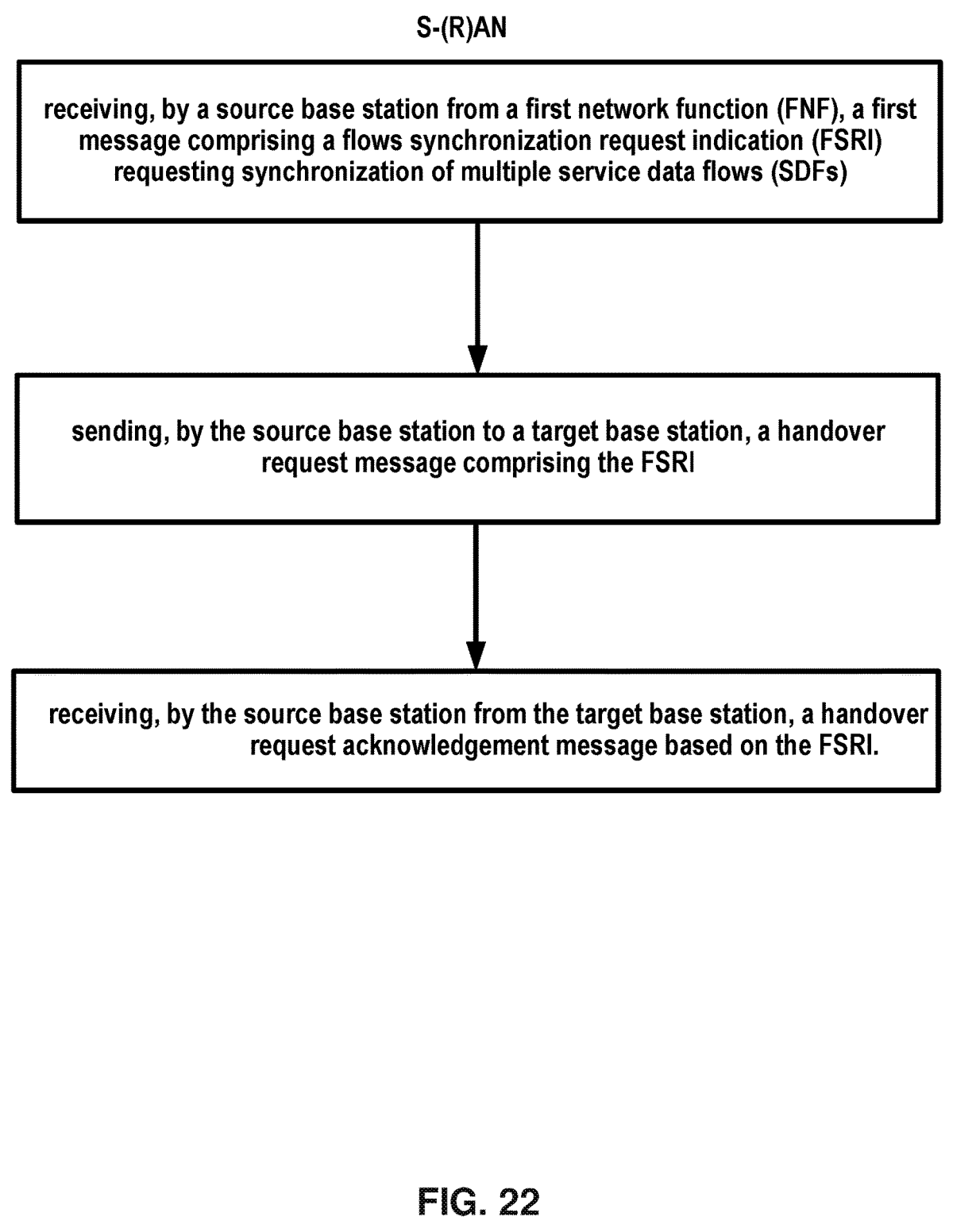

sending, by the source base station to a target base station, a handover request message comprising the FSRI receiving, by the source base station from the target base station, a handover request acknowledgement message based on the FSRI.

FIG. 22

T-(R)AN receiving, by a target base station from a source base station (S-BS), a handover request message comprising a flows synchronization request indication (FSRI) requesting synchronization of multiple service data flows (SDFs)

receiving, by the T-BS, packets of the multiple SDFs enforcing, by the T-BS and based on the FSRI, synchronization of the multiple SDFs.

FIG. 23

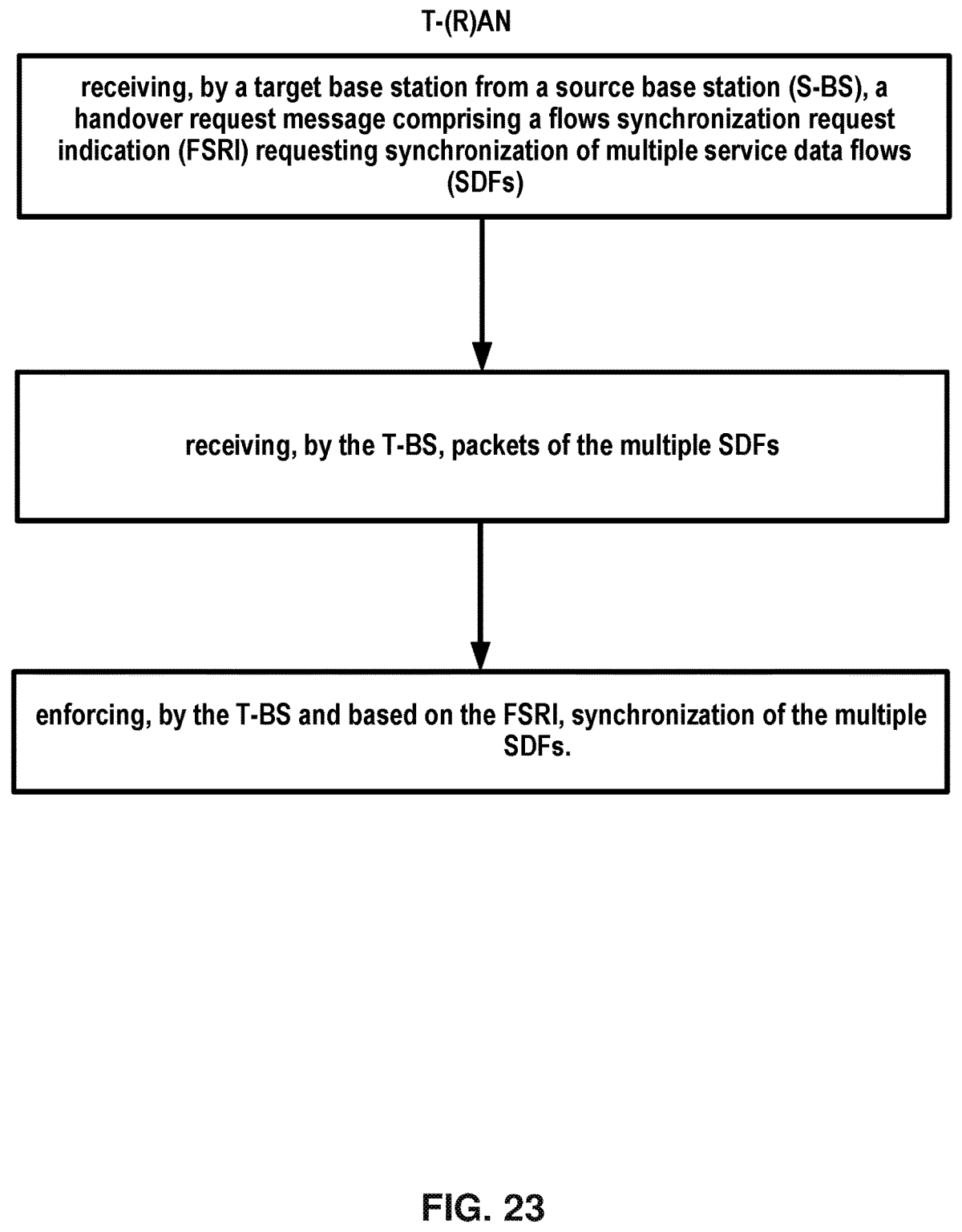

HANDOVER FOR SYNCHRONIZATION OF DATA FLOWS

CROSS-REFERENCE TO RELATED APPLICATIONS

This application is a continuation of International Application No. PCT/US2021/045501, filed Aug. 11, 2021, which claims the benefit of U.S. Provisional Application No. 63/064,165, filed Aug. 11, 2020, all of which are hereby incorporated by reference in their entireties.

BRIEF DESCRIPTION OF THE SEVERAL VIEWS OF THE DRAWINGS

Examples of several of the various embodiments of the present invention are described herein with reference to the drawings.

FIG. 21 is an example diagram depicting a handover request message body as per an aspect of an embodiment of the present disclosure.

FIG. 22 is an example diagram depicting the procedures of a S-(R)AN as per an aspect of an embodiment of the present disclosure.

FIG. 23 is an example diagram depicting the procedures of a T-(R)AN as per an aspect of an embodiment of the present disclosure.

DETAILED DESCRIPTION

Example embodiments of the present invention enable implementation of enhanced features and functionalities in 5G systems. Example embodiments of the present invention enable implementation of enhanced features and functionalities in 6G systems or a future communication system. More particularly, the embodiments of the technology disclosed herein may relate to handover for synchronization of multiple service data flows (e.g. for 5G/6G or future communication system). Throughout the present disclosure, UE, wireless device, terminal, and mobile device are used interchangeably. Throughout the present disclosure, base station, (Radio) Access Network ((R)AN), Next Generation Radio Access Network (NG-RAN), New radio Node B (gNB), Next Generation eNodeB (ng-eNBs) are used interchangeably. Throughout the present disclosure, base station, Radio Access Network (RAN), eNodeB are used interchangeably.

Figure 4:
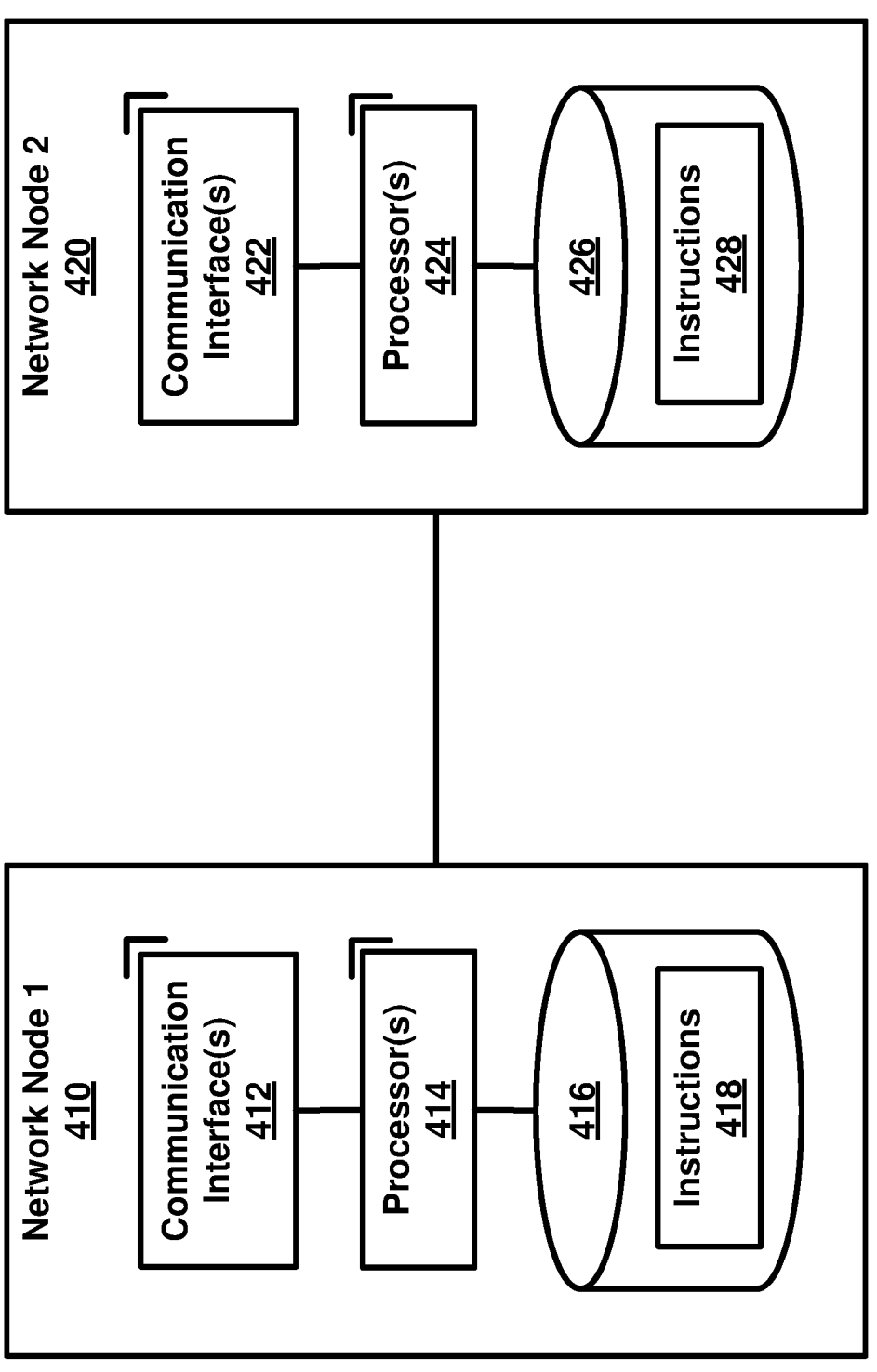
FIG. 4 is a system diagram of an example wireless device as per an aspect of an embodiment of the present disclosure.

Throughout the present disclosure, FNF, SNF, CHF, AMF, SMF, UPF, PCF, UDM, OAM, AF are example network functions which may be implemented either as a network element on a (dedicated) hardware, and/or a network node as depicted FIG. 4, or as a software instance running on a (dedicated) hardware and/or shared hardware, or as a virtualized function instantiated on an appropriate platform.

The following acronyms are used throughout the present disclosure:

5G 5th generation mobile networks

5GC 5G Core Network

5GS 5G System

5G-AN 5G Access Network

Figure 1:
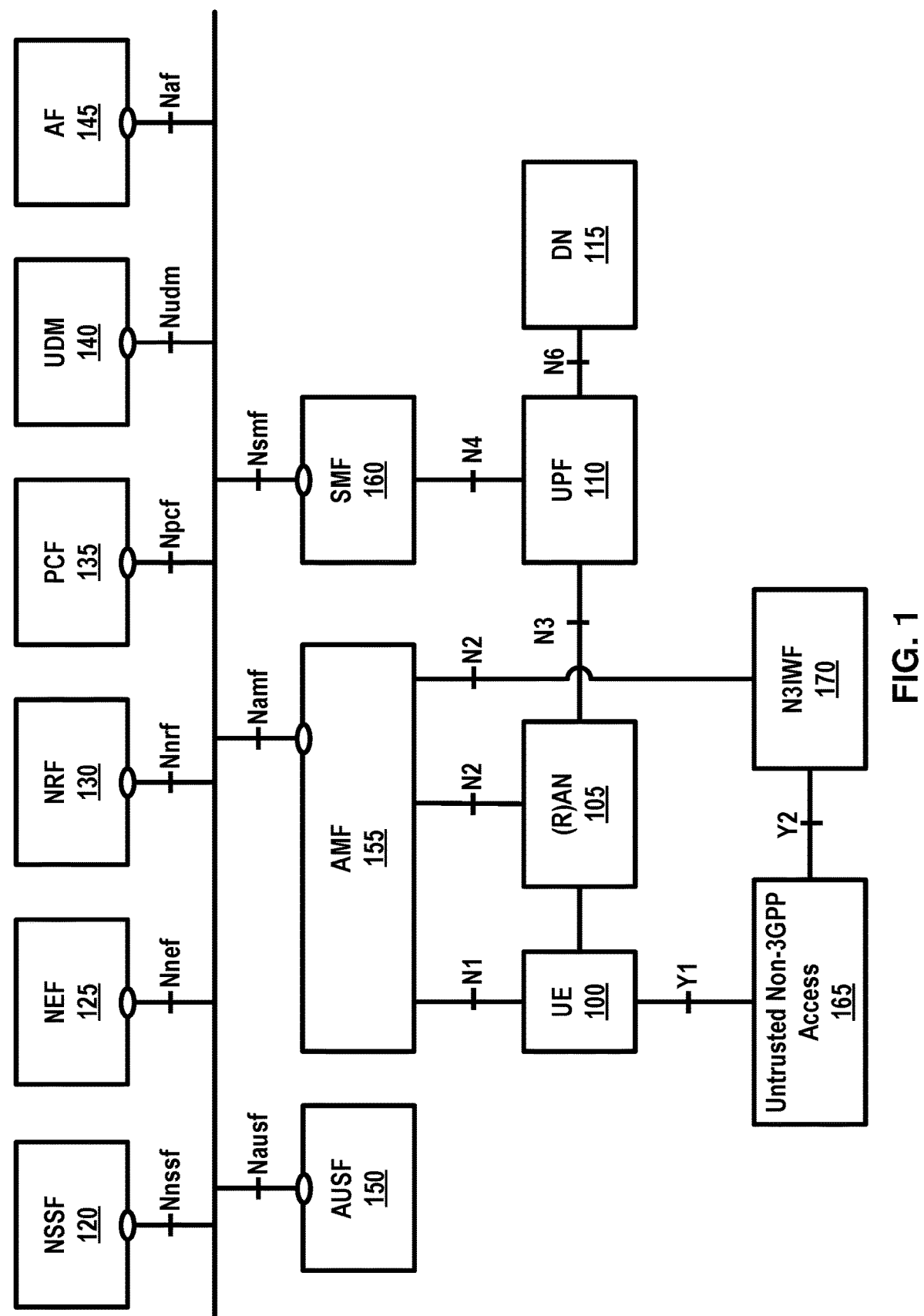
FIG. 1 is a diagram of an example 5G system architecture as per an aspect of an embodiment of the present disclosure.
Figure 2:
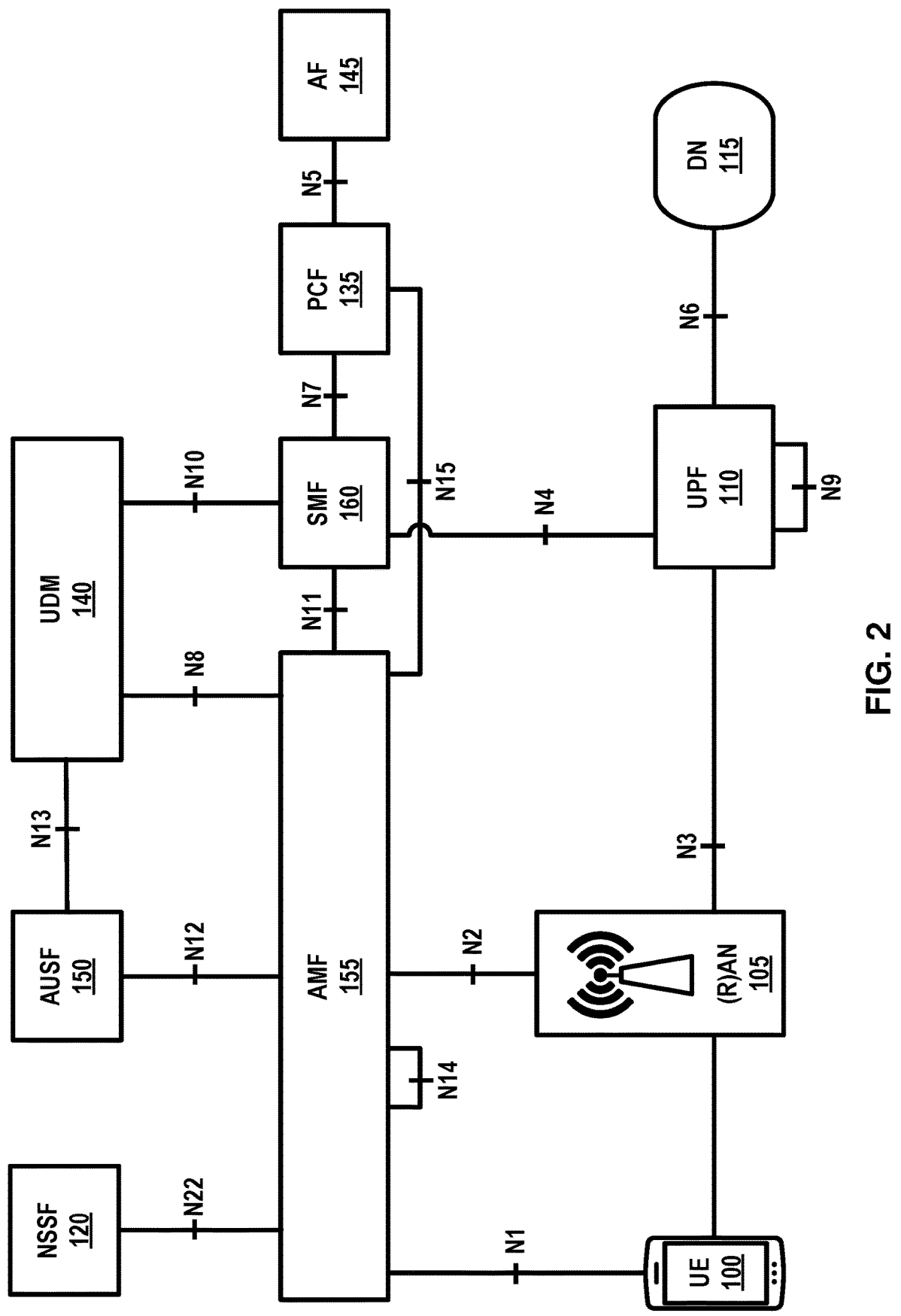
FIG. 2 is a diagram of an example 5G System architecture as per an aspect of an embodiment of the present disclosure.

5QI 5G QoS Indicator
ACK Acknowledgement
AF Application Function
A-GNSS Assisted GNSS
AMBR Aggregate Maximum Bit Rate
AMF Access and Mobility Management Function
AN Access Network
ANDSP Access Network Discovery & Selection Policy
APN Access Point Name
ARP Allocation and Retention Priority
BD Billing Domain
BPS Barometric Pressure Sensor
CCNF Common Control Network Functions
CDR Charging Data Record
CHF Charging Function
CIoT Cellular IoT
CN Core Network
CP Control Plane
C-V2X Cellular Vehicle-To-Everything
DAB Digital Audio Broadcasting
DDN Downlink Data Notification
DDoS Distributed Denial of Service
DL Downlink
DN Data Network
DN-AAA Data Network Authentication Authorization
    and Accounting
DNN Data Network Name
DTMB Digital Terrestrial Multimedia Broadcast
ECGI E-UTRAN Cell Global Identifier
ECID Enhanced Cell Identity
E-CSCF Emergency Call Session Control Function
eNodeB evolved Node B
EPS Evolved Packet System
E-UTRAN Evolved Universal Terrestrial Radio Access
    Network
FDD Frequency Division Duplex
FNF First Network Function
FQDN Fully Qualified Domain Name
F-TEID Fully Qualified TEID
GAD Geographical Area Description
GMLC Gateway Mobile Location Centre
gNB Next Generation Node B
gNB-CU-CP gNB Central Unit Control Plane
GNSS Global Navigation Satellite System
GPSI Generic Public Subscription Identifier
GTP GPRS Tunneling Protocol
GUTI Globally Unique Temporary Identifier
GW Gateway
HGMLC Home GMLC
HTC Holographic-Type Communication
HTTP Hypertext Transfer Protocol
ID Identifier
IMEI International Mobile Equipment Identity
IMEI DB IMEI Database
IMS IP Multimedia Subsystem
IMSI International Mobile Subscriber Identity
IP Internet Protocol
IP-CAN IP Connectivity Access Network
L2 Layer 2 (data link layer)
L3 Layer 3 (network layer)
LADN Local Area Data Network
LAN local area network
LCS LoCation Services
LI Lawful Intercept
LMC Location Management Component
LMF Location Management Function
LPP LTE Positioning Protocol LRF location retrieval function
MAC Media Access Control
MEI Mobile Equipment Identifier
MIB Master Information Block
MICO Mobile Initiated Connection Only
MME Mobility Management Entity
MO Mobile Originated
MO-LR Mobile Originated Location Request
MSISDN Mobile Subscriber ISDN
MT Mobile Terminating
MT-LR Mobile Terminated Location Request
N3IWF Non-3GPP InterWorking Function
NAI Network Access Identifier
NAS Non Access Stratum
NAT Network address translation
NB-IoT Narrow Band IoT
NCGI NR Cell Global Identity
NEF Network Exposure Function
NF Network Function
NGAP Next Generation Application Protocol
ng-eNB Next Generation eNB
NG-RAN NR Radio Access Network
NI-LR Network Induced Location Request
NR New Radio
NRF Network Repository Function
NRPPa New Radio Positioning Protocol A
NSI Network Slice Instance
NSSAI Network Slice Selection Assistance Information
NSSF Network Slice Selection Function
NWDAF Network Data Analytics Function
OAM Operation Administration and Maintenance
OCS Online Charging System
OFCS Offline Charging System
OTDOA Observed Time Difference of Arrival
PCC Policy and Charging Control
PCF Policy Control Function
PCRF Policy and Charging Rules Function
PDN Packet Data Network
PDU Protocol Data Unit
PEI Permanent Equipment Identifier
PGW PDN Gateway
PLMN Public Land Mobile Network
ProSe Proximity-based Services
QFI QoS Flow Identifier
QoS Quality of Service
RM Registration Management
RA Random Access
RAN Radio Access Network
RAT Radio Access Technology
RRC Radio Resource Control
RM Registration Management
S1-AP S1 Application Protocol
SBA Service Based Architecture
SCM Security Context Management
SEA Security Anchor Function
SET SUPL Enabled Terminal
SGW Serving Gateway
SIB System Information Block
SLP SUPL Location Platform
SM Session Management
SMF Session Management Function
SMSF SMS Function
SNF Second Network Function
S-NSSAI Single Network Slice Selection Assistance
    information
SS Synchronization Signal
SSC Session and Service Continuity SUCI Served User Correlation ID SUPI Subscriber Permanent Identifier SUPL Secure User Plane Location TA Tracking Area TAI Tracking Area Identity TBS Terrestrial Beacon System TCP Transmission Control Protocol TEID Tunnel Endpoint Identifier TMSI Temporary Mobile Subscriber Identity TNAN Trusted Non-3GPP Access Network TNGF Trusted Non3GPP Gateway TRP Transmission and Reception Point UCMF UE radio Capability Management Function UDR Unified Data Repository UDM Unified Data Management UDP User Datagram Protocol UE User Equipment UL Uplink UL CL Uplink Classifier UPF User Plane Function V2X Vehicle-To-Everything WLAN Wireless Local Area Network XML Extensible Markup Language Example FIG. 1 and FIG. 2 depict a 5G system comprising of access networks and 5G core network. An example 5G access network may comprise an access network connecting to a 5G core network. An access network may comprise an NG-RAN 105 and/or non-3GPP AN 165. An example 5G core network may connect to one or more 5G access networks 5G-AN and/or NG-RANs. 5G core network may comprise functional elements or network functions as in example FIG. 1 and example FIG. 2 where interfaces may be employed for communication among the functional elements and/or network elements.

Figure 3:
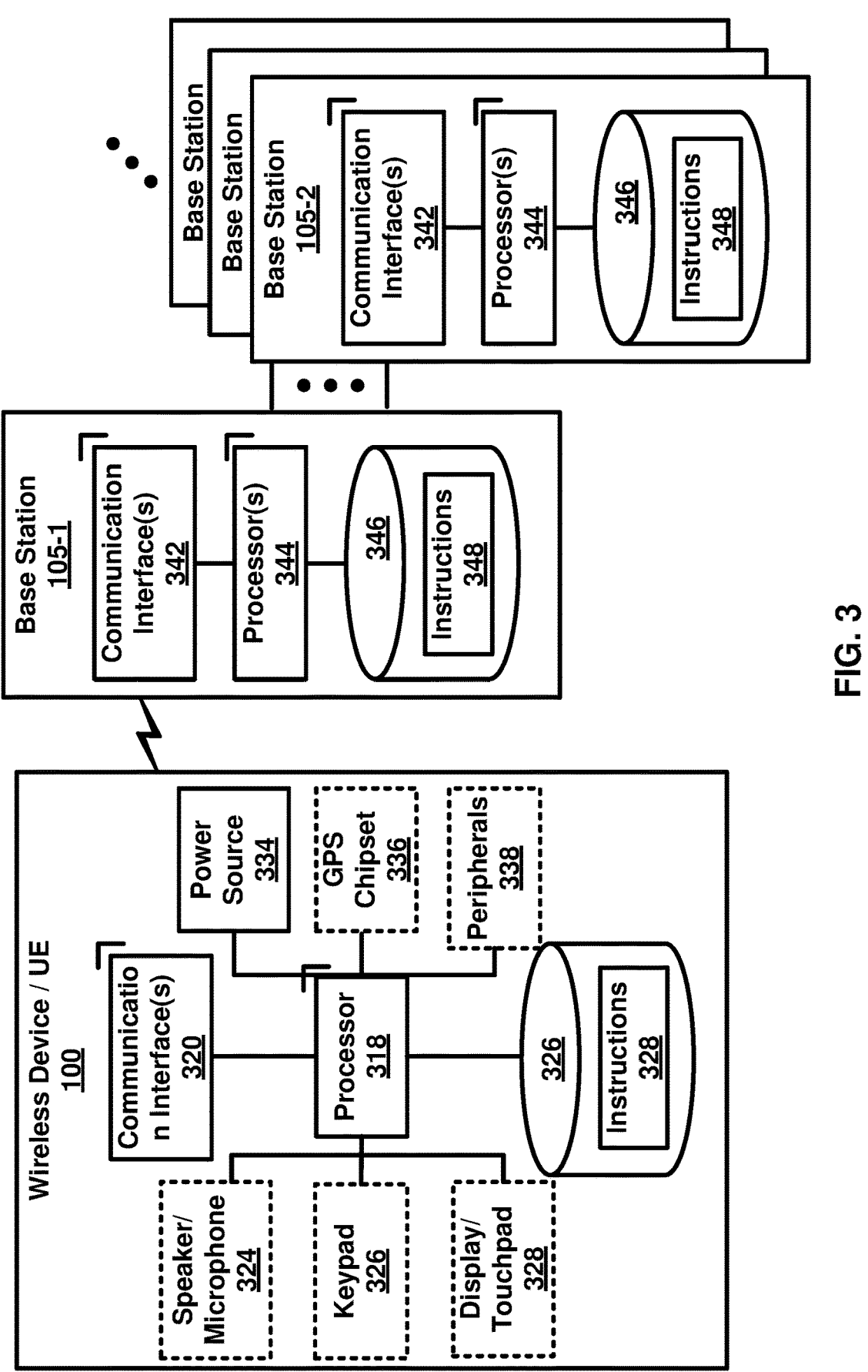
FIG. 3 is a system diagram of an example wireless device and a network node in a 5G system as per an aspect of an embodiment of the present disclosure.

In an example, a network function may be a processing function in a network, which may have a functional behavior and/or interfaces. A network function may be implemented either as a network element on a dedicated hardware, and/or a network node as depicted in FIG. 3 and FIG. 4, or as a software instance running on a dedicated hardware and/or shared hardware, or as a virtualized function instantiated on an appropriate platform.

In an example, access and mobility management function, AMF 155, may include the following functionalities (some of the AMF 155 functionalities may be supported in a single instance of an AMF 155): termination of RAN 105 CP interface (N2), termination of NAS (N1), NAS ciphering and integrity protection, registration management, connection management, reachability management, mobility management, lawful intercept (for AMF 155 events and interface to LI system), provide transport for session management, SM messages between UE 100 and SMF 160, transparent proxy for routing SM messages, access authentication, access authorization, provide transport for SMS messages between UE 100 and SMSF, security anchor function, SEA, interaction with the AUSF 150 and the UE 100, receiving the intermediate key established as a result of the UE 100 authentication process, security context management, SCM, that receives a key from the SEA that it uses to derive access network specific keys, and/or the like.

In an example, the AMF 155 may support non-3GPP access networks through N2 interface with N3IWF 170, NAS signaling with a UE 100 over N3IWF 170, authentication of UEs connected over N3IWF 170, management of mobility, authentication, and separate security context state(s) of a UE 100 connected via non-3GPP access 165 or connected via 3GPP access 105 and non-3GPP access 165 simultaneously, support of a coordinated RM context valid over 3GPP access 105 and non 3GPP access 165, support of CM management contexts for the UE 100 for connectivity over non-3GPP access, and/or the like.

In an example, an AMF 155 region may comprise one or multiple AMF 155 sets. The AMF 155 set may comprise some AMF 155 that serve a given area and/or network slice(s). In an example, multiple AMF 155 sets may be per AMF 155 region and/or network slice(s). Application identifier may be an identifier that may be mapped to a specific application traffic detection rule. Configured NSSAI may be an NSSAI that may be provisioned in a UE 100. DN 115 access identifier (DNAI), for a DNN, may be an identifier of a user plane access to a DN 115. Initial registration may be related to a UE 100 registration in RM-DEREGISTERED 500, 520 states. N2AP UE 100 association may be a logical per UE 100 association between a 5G AN node and an AMF 155. N2AP UE-TNLA-binding may be a binding between a N2AP UE 100 association and a specific transport network layer, TNL association for a given UE 100.

In an example, session management function, SMF 160, may include one or more of the following functionalities (one or more of the SMF 160 functionalities may be supported in a single instance of a SMF 160): session management (e.g. session establishment, modify and release, including tunnel maintain between UPF 110 and AN 105 node), UE 100 IP address allocation & management (including optional authorization), selection and control of UP function(s), configuration of traffic steering at UPF 110 to route traffic to proper destination, termination of interfaces towards policy control functions, control part of policy enforcement and QoS. lawful intercept (for SM events and interface to LI System), termination of SM parts of NAS messages, downlink data notification, initiation of AN specific SM information, sent via AMF 155 over N2 to (R)AN 105, determination of SSC mode of a session, roaming functionality, handling local enforcement to apply QoS SLAs (VPLMN), charging data collection and charging interface (VPLMN), lawful intercept (in VPLMN for SM events and interface to LI System), support for interaction with external DN 115 for transport of signaling for PDU session authorization/authentication by external DN 115, and/or the like.

In an example, a user plane function, UPF 110, may include one or more of the following functionalities (some of the UPF 110 functionalities may be supported in a single instance of a UPF 110): anchor point for Intra-/Inter-RAT mobility (when applicable), external PDU session point of interconnect to DN 115, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering, downlink data notification triggering, and/or the like.

In an example, the UE 100 IP address management may include allocation and release of the UE 100 IP address and/or renewal of the allocated IP address. The UE 100 may set a requested PDU type during a PDU session establishment procedure based on its IP stack capabilities and/or configuration. In an example, the SMF 160 may select PDU type of a PDU session. In an example, if the SMF 160 receives a request with PDU type set to IP, the SMF 160 may select PDU type IPv4 or IPv6 based on DNN configuration and/or operator policies. In an example, the SMF 160 may provide a cause value to the UE 100 to indicate whether the other IP version is supported on the DNN. In an example, if the SMF 160 receives a request for PDU type IPv4 or IPv6 and the requested IP version is supported by the DNN the SMF 160 may select the requested PDU type.

In an example embodiment, the 5GC elements and UE 100 may support the following mechanisms: during a PDU session establishment procedure, the SMF 160 may send the IP address to the UE 100 via SM NAS signaling. The IPv4 address allocation and/or IPv4 parameter configuration via DHCPv4 may be employed once PDU session may be established. IPv6 prefix allocation may be supported via IPv6 stateless autoconfiguration, if IPv6 is supported. In an example, 5GC network elements may support IPv6 param-eter configuration via stateless DHCPv6.

The 5GC may support the allocation of a static IPv4 address and/or a static IPv6 prefix based on subscription information in a UDM 140 and/or based on the configuration on a per-subscriber, per-DNN basis.

User plane function(s) (UPF 110) may handle the user plane path of PDU sessions. A UPF 110 that provides the interface to a data network may support functionality of a PDU session anchor.

In an example, a policy control function, PCF 135, may support unified policy framework to govern network behav-ior, provide policy rules to control plane function(s) to enforce policy rules, implement a front end to access sub-scription information relevant for policy decisions in a user data repository (UDR), and/or the like.

A network exposure function, NEF 125, may provide means to securely expose the services and capabilities provided by the 3GPP network functions, translate between information exchanged with the AF 145 and information exchanged with the internal network functions, receive information from other network functions, and/or the like.

In an example, an network repository function, NRF 130 may support service discovery function that may receive NF discovery request from NF instance, provide information about the discovered NF instances (be discovered) to the NF instance, and maintain information about available NF instances and their supported services, and/or the like.

In an example, an NSSF 120 may select a set of network slice instances serving the UE 100, may determine allowed NSSAI. In an example, the NSSF 120 may determine the AMF 155 set to be employed to serve the UE 100, and/or, based on configuration, determine a list of candidate AMF 155(*s*) 155 by querying the NRF 130.

In an example, stored data in a UDR may include at least user subscription data, including at least subscription iden-tifiers, security credentials, access and mobility related sub-scription data, session related subscription data, policy data, and/or the like.

In an example, an AUSF 150 may support authentication server function (AUSF 150).

In an example, an application function, AF 145, may interact with the 3GPP core network to provide services. In an example, based on operator deployment, application functions may be trusted by the operator to interact directly with relevant network functions. Application functions not allowed by the operator to access directly the network functions may use an external exposure framework (e.g., via the NEF 125) to interact with relevant network functions.

In an example, control plane interface between the (R)AN 105 and the 5G core may support connection of multiple different kinds of AN(s) (e.g. 3GPP RAN 105, N3IWF 170 for Un-trusted access 165) to the 5GC via a control plane protocol. In an example, an N2 AP protocol may be employed for both the 3GPP access 105 and non-3GPP access 165. In an example, control plane interface between the (R)AN 105 and the 5G core may support decoupling between AMF 155 and other functions such as SMF 160 that may need to control the services supported by AN(s) (e.g. control of the UP resources in the 105 for a PDU session).

In an example, the 5GC may provide policy information from the PCF 135 to the UE 100. In an example, the policy information may comprise: access network discovery and selection policy, UE 100 route selection policy (URSP), SSC mode selection policy (SSCMSP), network slice selection policy (NSSP), DNN selection policy, non-seamless offload policy, and/or the like.

Figures 5A, 5B:
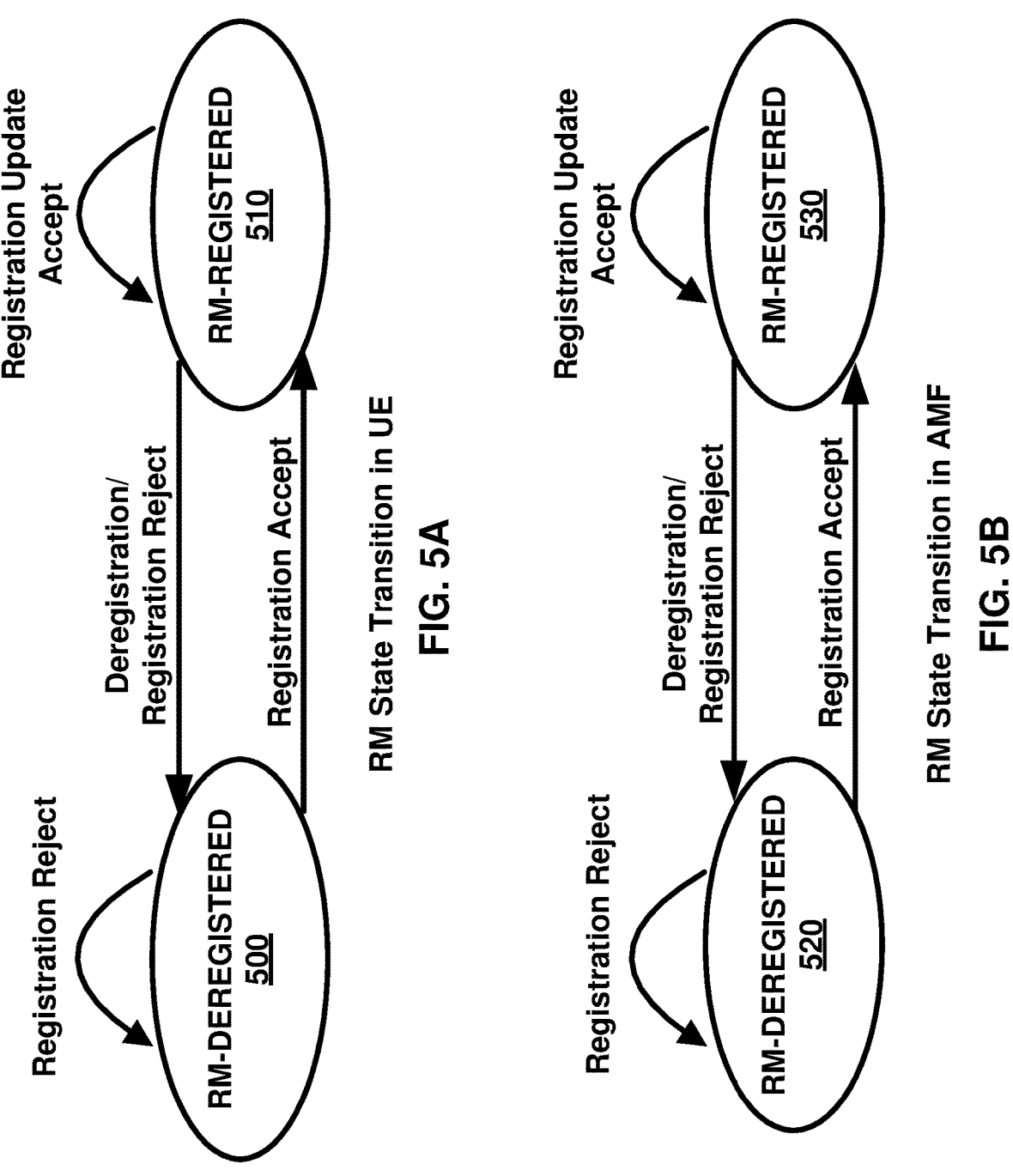
FIG. 5A and FIG. 5B depict two registration management state models in UE 100 and AMF 155 as per an aspect of embodiments of the present disclosure.

In an example, as depicted in example FIG. 5A and FIG. 5B, the registration management, RM may be employed to register or de-register a UE/user 100 with the network, and establish the user context in the network. Connection man-agement may be employed to establish and release the signaling connection between the UE 100 and the AMF 155.

In an example, a UE 100 may register with the network to receive services that require registration. In an example, the UE 100 may update its registration with the network periodically in order to remain reachable (periodic registra-tion update), or upon mobility (e.g., mobility registration update), or to update its capabilities or to re-negotiate protocol parameters.

Figure 8:
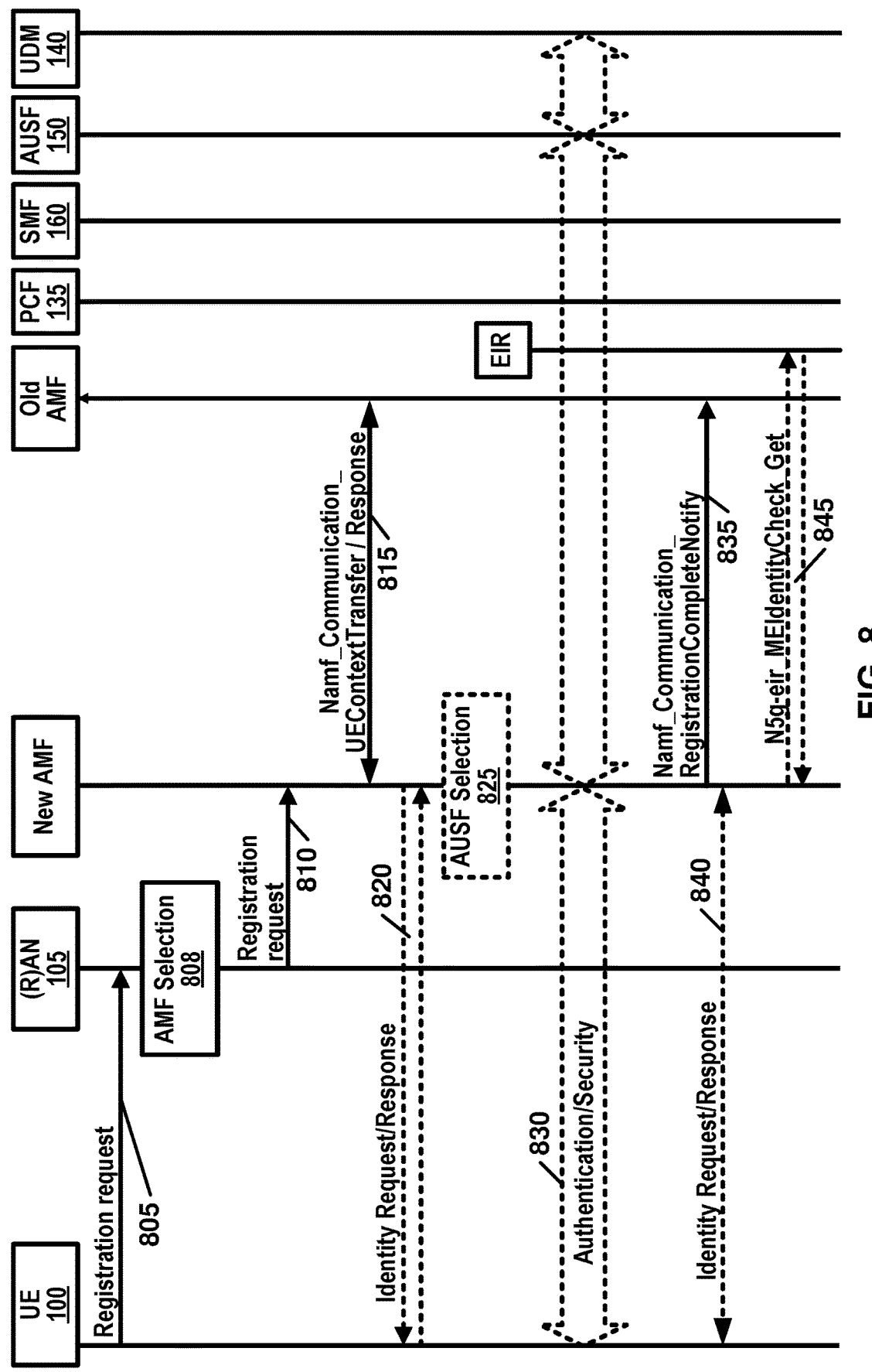
FIG. 8 is an example call flow for registration procedure as per an aspect of an embodiment of the present disclosure.
Figure 9:
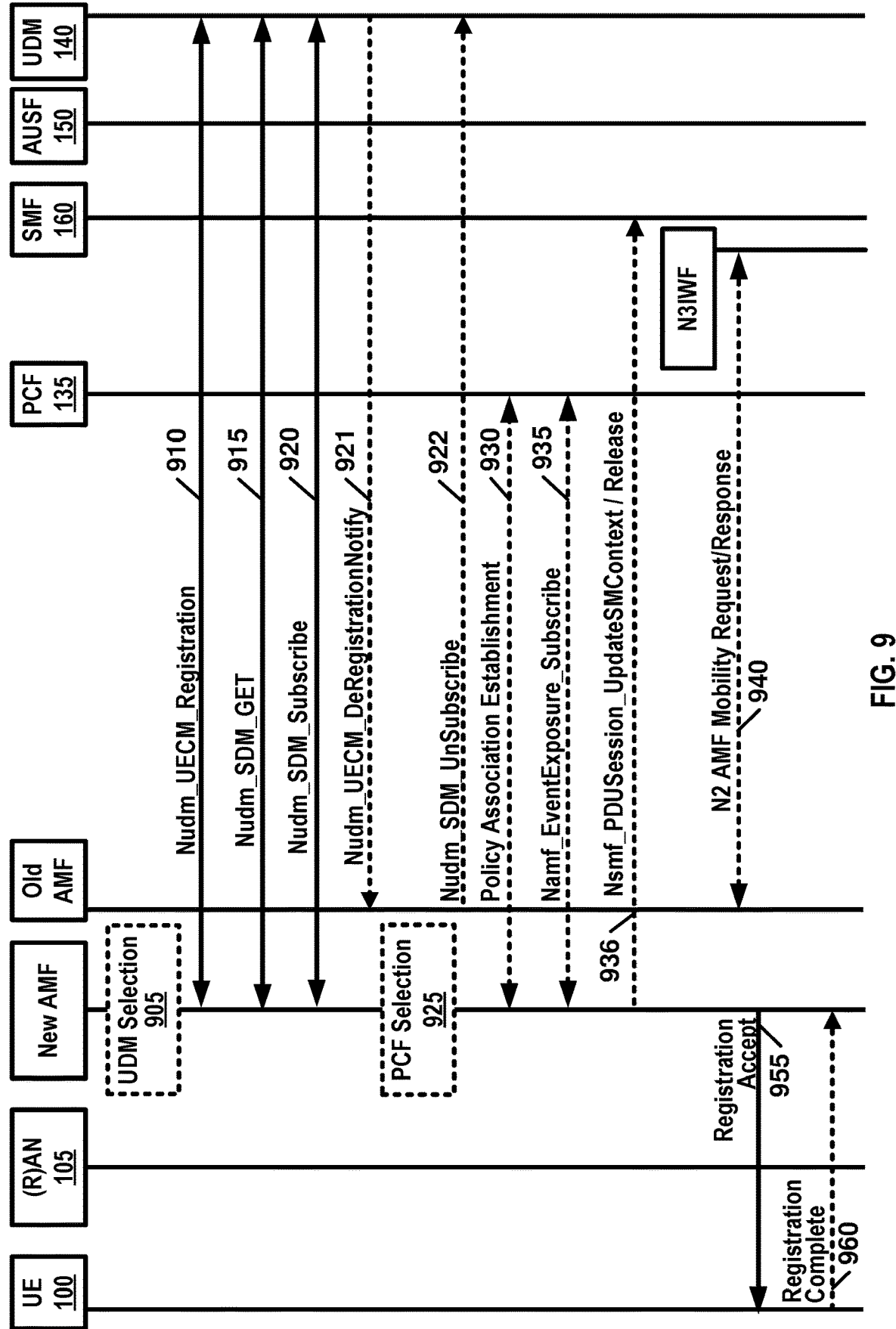
FIG. 9 is an example call flow for registration procedure as per an aspect of an embodiment of the present disclosure.

In an example, an initial registration procedure as depicted in example FIG. 8 and FIG. 9 may involve execu-tion of network access control functions (e.g. user authen-tication and access authorization based on subscription profiles in UDM 140). Example FIG. 9 is a continuation of the initial registration procedure depicted in FIG. 8. As a result of the initial registration procedure, the identity of the serving AMF 155 may be registered in a UDM 140.

In an example, the registration management, RM proce-dures may be applicable over both 3GPP access 105 and non 3GPP access 165.

An example FIG. 5A may depict the RM states of a UE 100 as observed by the UE 100 and AMF 155. In an example embodiment, two RM states may be employed in the UE 100 and the AMF 155 that may reflect the registration status of the UE 100 in the selected PLMN: RM-DEREGISTERED 500, and RM-REGISTERED 510. In an example, in the RM DEREGISTERED state 500, the UE 100 may not be regis-tered with the network. The UE 100 context in the AMF 155 may not hold valid location or routing information for the UE 100 so the UE 100 may not be reachable by the AMF 155. In an example, the UE 100 context may be stored in the UE 100 and the AMF 155. In an example, in the RM REGISTERED state 510, the UE 100 may be registered with the network. In the RM-REGISTERED 510 state, the UE 100 may receive services that may require registration with the network.

In an example embodiment, two RM states may be employed in AMF 155 for the UE 100 that may reflect the registration status of the UE 100 in the selected PLMN: RM-DEREGISTERED 520, and RM-REGISTERED 530.

Figures 6A, 6B:
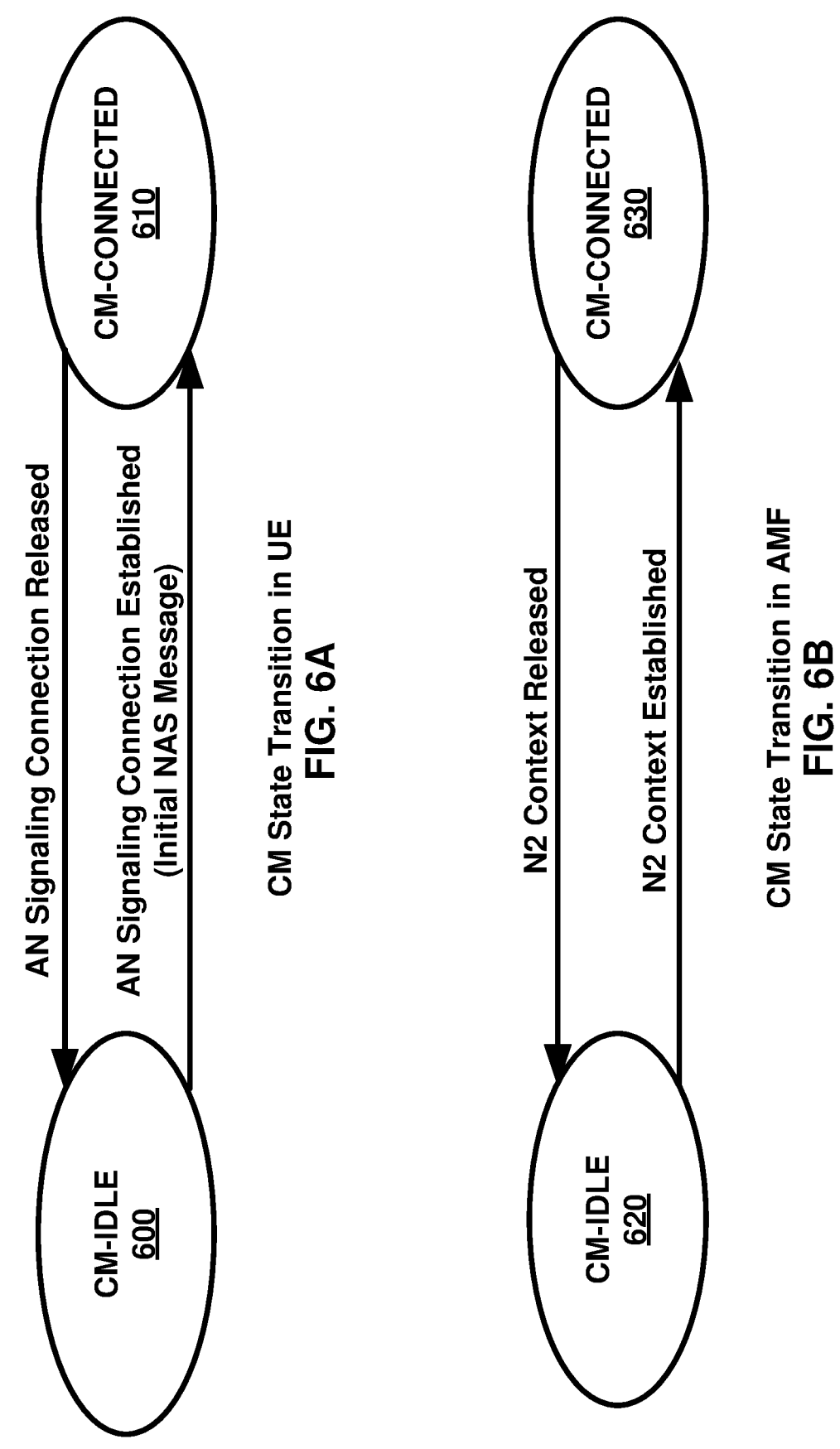
FIG. 6A and FIG. 6B depict two connection management state models in UE 100 and AMF 155 as per an aspect of embodiments of the present disclosure.

As depicted in example FIG. 6A and FIG. 6B, connection management, CM, may comprise establishing and releasing a signaling connection between a UE 100 and an AMF 155 over N1 interface. The signaling connection may be employed to enable NAS signaling exchange between the UE 100 and the core network. The signaling connection between the UE 100 and the AMF 155 may comprise both the signaling connection between the UE 100 and the (R)AN 105 (e.g. RRC connection over 3GPP access) and the N2 connection for the UE 100 between the and the AMF 155.

As depicted in example FIG. 6A and FIG. 6B, two CM states may be employed for the NAS signaling connectivity of the UE 100 with the AMF 155, CM-IDLE 600, 620 and CM-CONNECTED 610, 630. A UE 100 in CM-IDLE 600 state may be in RM-REGISTERED 510 state and may have no NAS signaling connection established with the AMF 155 over N1. The UE 100 may perform cell selection, cell reselection, PLMN selection, and/or the like. A UE 100 in CM-CONNECTED 610 state may have a NAS signaling connection with the AMF 155 over N1.

In an example embodiment two CM states may be employed for the UE 100 at the AMF 155, CM-IDLE 620 and CM-CONNECTED 630.

In an example, an RRC inactive state may apply to NG-RAN (e.g. it may apply to NR and E-UTRA connected to 5G CN). The AMF 155, based on network configuration, may provide assistance information to the NG RAN 105, to assist the NG RAN's 105 decision whether the UE 100 may be sent to RRC inactive state. When a UE 100 is CM-CONNECTED 610 with RRC inactive state, the UE 100 may resume the RRC connection due to uplink data pending, mobile initiated signaling procedure, as a response to RAN 105 paging, to notify the network that it has left the RAN 105 notification area, and/or the like.

In an example, a NAS signaling connection management may include establishing and releasing a NAS signaling connection. A NAS signaling connection establishment function may be provided by the UE 100 and the AMF 155 to establish the NAS signaling connection for the UE 100 in CM-IDLE 600 state. The procedure of releasing the NAS signaling connection may be initiated by the 5G (R)AN 105 node or the AMF 155.

In an example, reachability management of a UE 100 may detect whether the UE 100 is reachable and may provide the UE 100 location (e.g. access node) to the network to reach the UE 100. Reachability management may be done by paging the UE 100 and the UE 100 location tracking. The UE 100 location tracking may include both UE 100 registration area tracking and UE 100 reachability tracking. The UE 100 and the AMF 155 may negotiate UE 100 reachability characteristics in CM-IDLE 600, 620 state during registration and registration update procedures.

In an example, two UE 100 reachability categories may be negotiated between a UE 100 and an AMF 155 for CM-IDLE 600, 620 state. 1) UE 100 reachability allowing mobile device terminated data while the UE 100 is CM-IDLE 600 mode. 2) Mobile initiated connection only (MICO) mode. The 5GC may support a PDU connectivity service that provides exchange of PDUs between the UE 100 and a data network identified by a DNN. The PDU connectivity service may be supported via PDU sessions that are established upon request from the UE 100.

In an example, a PDU session may support one or more PDU session types. PDU sessions may be established (e.g. upon UE 100 request), modified (e.g. upon UE 100 and 5GC request) and/or released (e.g. upon UE 100 and 5GC request) using NAS SM signaling exchanged over N1 between the UE 100 and the SMF 160. Upon request from an application server, the 5GC may be able to trigger a specific application in the UE 100. When receiving the trigger, the UE 100 may send it to the identified application in the UE 100. The identified application in the UE 100 may establish a PDU session to a specific DNN.

Figure 7:
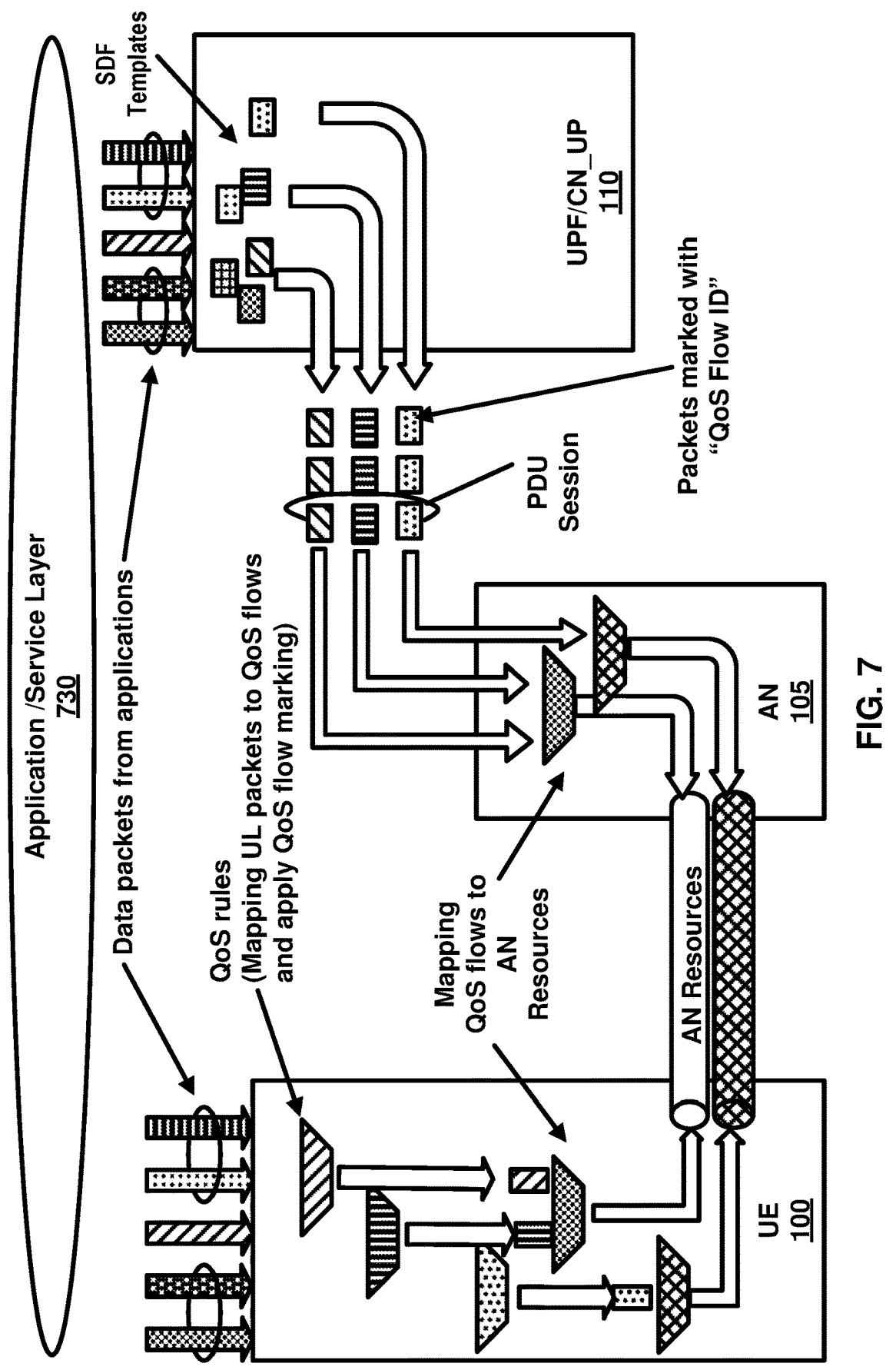
FIG. 7 is diagram for classification and marking traffic as per an aspect of an embodiment of the present disclosure.

In an example, the 5G QoS model may support a QoS flow based framework as depicted in example FIG. 7. The 5G QoS model may support both QoS flows that require a guaranteed flow bit rate and QoS flows that may not require guaranteed flow bit rate.

a guaranteed flow bit rate. In an example, the 5G QoS model may support reflective QoS. The QoS model may comprise flow mapping or packet marking at the UPF 110 (CN_UP) 110, AN 105 and/or the UE 100. In an example, packets may arrive from and/or destined to the application/service layer 730 of UE 100, UPF 110 (CN_UP) 110, and/or the AF 145.

In an example, the QoS flow may be a granularity of QoS differentiation in a PDU session. A QoS flow ID, QFI, may be employed to identify the QoS flow in the 5G system. In an example, user plane traffic with the same QFI within a PDU session may receive the same traffic forwarding treatment. The QFI may be carried in an encapsulation header on N3 and/or N9 (e.g. without any changes to the end-to-end packet header). In an example, the QFI may be applied to PDUs with different types of payload. The QFI may be unique within a PDU session.

In an example, the QoS parameters of a QoS flow may be provided to the (R)AN 105 as a QoS profile over N2 at PDU session establishment, QoS flow establishment, or when NG-RAN is used at every time the user plane is activated. In an example, a default QoS rule may be required for every PDU session. The SMF 160 may allocate the QFI for a QoS flow and may derive QoS parameters from the information provided by the PCF 135. In an example, the SMF 160 may provide the QFI together with the QoS profile containing the QoS parameters of a QoS flow to the (R)AN 105.

In an example, 5G QoS flow may be a granularity for QoS forwarding treatment in the 5G system. Traffic mapped to the same 5G QoS flow may receive the same forwarding treatment (e.g. scheduling policy, queue management policy, rate shaping policy, RLC configuration, and/or the like). In an example, providing different QoS forwarding treatment may require separate 5G QoS flows.

In an example, a 5G QoS indicator may be a scalar that may be employed as a reference to a specific QoS forwarding behavior (e.g. packet loss rate, packet delay budget) to be provided to a 5G QoS flow. In an example, the 5G QoS indicator may be implemented in the access network by the 5QI referencing node specific parameters that may control the QoS forwarding treatment (e.g. scheduling weights, admission thresholds, queue management thresholds, link layer protocol configuration, and/or the like.).

In an example, 5GC may support edge computing and may enable operator(s) and 3rd party services to be hosted close to the UE's access point of attachment. The 5G core network may select a UPF 110 close to the UE 100 and may execute the traffic steering from the UPF 110 to the local data network via a N6 interface. In an example, the selection and traffic steering may be based on the UE's 100 subscription data, UE 100 location, the information from application function AF 145, policy, other related traffic rules, and/or the like. In an example, the 5G core network may expose network information and capabilities to an edge computing application function. The functionality support for edge computing may include local routing where the 5G core network may select a UPF 110 to route the user traffic to the local data network, traffic steering where the 5G core network may select the traffic to be routed to the applications in the local data network, session and service continuity to enable UE 100 and application mobility, user plane selection and reselection, e.g. based on input from application function, network capability exposure where 5G core network and application function may provide information to each other via NEf 125, QoS and charging where PCF 135 may provide rules for QoS control and charging for the traffic routed to the local data network, support of local area data network where 5G core network may provide support to connect to the LADN in a certain area where the applications are deployed, and/or the like.

An example 5G system may be a 3GPP system comprising of 5G access network 105, 5G core network and a UE 100, and/or the like. Allowed NSSAI may be an NSSAI provided by a serving PLMN during e.g. a registration procedure, indicating the NSSAI allowed by the network for the UE 100 in the serving PLMN for the current registration area.

In an example, a PDU connectivity service may provide exchange of PDUs between a UE 100 and a data network. A PDU session may be an association between the UE 100 and the data network, DN 115, that may provide the PDU connectivity service. The type of association may be IP, Ethernet and/or unstructured.

Establishment of user plane connectivity to a data network via network slice instance(s) may comprise the following: performing a RM procedure to select an AMF 155 that supports the required network slices, and establishing one or more PDU session(s) to the required data network via the network slice instance(s).

In an example, the set of network slices for a UE 100 may be changed at any time while the UE 100 may be registered with the network, and may be initiated by the network, or the UE 100.

In an example, a periodic registration update may be UE 100 re-registration at expiry of a periodic registration timer. A requested NSSAI may be a NSSAI that the UE 100 may provide to the network.

In an example, a service based interface may represent how a set of services may be provided/exposed by a given NF.

In an example, a service continuity may be an uninterrupted user experience of a service, including the cases where the IP address and/or anchoring point may change. In an example, a session continuity may refer to continuity of a PDU session. For PDU session of IP type session continuity may imply that the IP address is preserved for the lifetime of the PDU session. An uplink classifier may be a UPF 110 functionality that aims at diverting uplink traffic, based on filter rules provided by the SMF 160, towards data network, DN 115.

In an example, the 5G system architecture may support data connectivity and services enabling deployments to use techniques such as e.g. network function virtualization and/or software defined networking. The 5G system architecture may leverage service-based interactions between control plane (CP) network functions where identified. In 5G system architecture, separation of the user plane (UP) functions from the control plane functions may be considered. A 5G system may enable a network function to interact with other NF(s) directly if required.

In an example, the 5G system may reduce dependencies between the access network (AN) and the core network (CN). The architecture may comprise a converged access-agnostic core network with a common AN-CN interface which may integrate different 3GPP and non-3GPP access types.

In an example, the 5G system may support a unified authentication framework, stateless NFs, where the compute resource is decoupled from the storage resource, capability exposure, and concurrent access to local and centralized services. To support low latency services and access to local data networks, UP functions may be deployed close to the access network.

In an example, the 5G system may support roaming with home routed traffic and/or local breakout traffic in the visited PLMN. An example 5G architecture may be service-based and the interaction between network functions may be represented in two ways. (1) As service-based representation (depicted in example FIG. 1), where network functions within the control plane, may enable other authorized network functions to access their services. This representation may also include point-to-point reference points where necessary. (2) Reference point representation, showing the interaction between the NF services in the network functions described by point-to-point reference point (e.g. N11) between any two network functions.

In an example, a network slice may comprise the core network control plane and user plane network functions, the 5G Radio Access Network; the N3IWF functions to the non-3GPP Access Network, and/or the like. Network slices may differ for supported features and network function implementation. The operator may deploy multiple network slice instances delivering the same features but for different groups of UEs, e.g. as they deliver a different committed service and/or because they may be dedicated to a customer. The NSSF 120 may store the mapping information between slice instance ID and NF ID (or NF address).

In an example, a UE 100 may simultaneously be served by one or more network slice instances via a 5G-AN. In an example, the UE 100 may be served by k network slices (e.g. k=8, 16, etc) at a time. An AMF 155 instance serving the UE 100 logically may belong to a network slice instance serving the UE 100.

In an example, a PDU session may belong to one specific network slice instance per PLMN. In an example, different network slice instances may not share a PDU session. Different slices may have slice-specific PDU sessions using the same DNN.

An S-NSSAI (Single Network Slice Selection Assistance information) may identify a network slice. An S-NSSAI may comprise a slice/service type (SST), which may refer to the expected network slice behavior in terms of features and services; and/or a slice differentiator (SD). A slice differentiator may be optional information that may complement the slice/service type(s) to allow further differentiation for selecting a network slice instance from potentially multiple network slice instances that comply with the indicated slice/service type. In an example, the same network slice instance may be selected employing different S-NSSAIs. The CN part of a network slice instance(s) serving a UE 100 may be selected by CN.

In an example, subscription data may include the S-NSSAI(s) of the network slices that the UE 100 subscribes to. One or more S-NSSAIs may be marked as default S-NSSAI. In an example, k S-NSSAI may be marked default S-NSSAI (e.g. k=8, 16, etc.). In an example, the UE 100 may subscribe to more than 8 S-NSSAIs.

In an example, a UE 100 may be configured by the HPLMN with a configured

NSSAI per PLMN. Upon successful completion of a UE's registration procedure, the UE 100 may obtain from the AMF 155 an Allowed NSSAI for this PLMN, which may include one or more S-NSSAIs.

In an example, the Allowed NSSAI may take precedence over the configured NSSAI for a PLMN. The UE 100 may use the S-NSSAIs in the allowed NSSAI corresponding to a network slice for the subsequent network slice selection related procedures in the serving PLMN.

In an example, the establishment of user plane connectivity to a data network via a network slice instance(s) may comprise: performing a RM procedure to select an AMF 155 that may support the required network slices, establishing one or more PDU sessions to the required data network via the network slice instance(s), and/or the like.

In an example, when a UE 100 registers with a PLMN, if the UE 100 for the PLMN has a configured NSSAI or an allowed NSSAI, the UE 100 may provide to the network in RRC and NAS layer a requested NSSAI comprising the S-NSSAI(s) corresponding to the slice(s) to which the UE 100 attempts to register, a temporary user ID if one was assigned to the UE, and/or the like. The requested NSSAI may be configured-NSSAI, allowed-NSSAI, and/or the like.

In an example, when a UE 100 registers with a PLMN, if for the PLMN the UE 100 has no configured NSSAI or allowed NSSAI, the RAN 105 may route NAS signaling from/to the UE 100 to/from a default AMF 155.

In an example, the network, based on local policies, subscription changes and/or UE 100 mobility, may change the set of permitted network slice(s) to which the UE 100 is registered. In an example, the network may perform the change during a registration procedure or trigger a notification towards the UE 100 of the change of the supported network slices using an RM procedure (which may trigger a registration procedure). The network may provide the UE 100 with a new allowed NSSAI and tracking area list.

In an example, during a registration procedure in a PLMN, in case the network decides that the UE 100 should be served by a different AMF 155 based on network slice(s) aspects, the AMF 155 that first received the registration request may redirect the registration request to another AMF 155 via the RAN 105 or via direct signaling between the initial AMF 155 and the target AMF 155.

In an example, the network operator may provision the UE 100 with network slice selection policy (NSSP). The NSSP may comprise one or more NSSP rules.

In an example, if a UE 100 has one or more PDU sessions established corresponding to the a specific S-NSSAI, the UE 100 may route the user data of the application in one of the PDU sessions, unless other conditions in the UE 100 may prohibit the use of the PDU sessions. If the application provides a DNN, then the UE 100 may consider the DNN to determine which PDU session to use. In an example, if the UE 100 does not have a PDU session established with the specific S-NSSAI, the UE 100 may request a new PDU session corresponding to the S-NSSAI and with the DNN that may be provided by the application. In an example, in order for the RAN 105 to select a proper resource for supporting network slicing in the RAN 105, the RAN 105 may be aware of the network slices used by the UE 100.

In an example, an AMF 155 may select an SMF 160 in a network slice instance based on S-NSSAI, DNN and/or other information e.g. UE 100 subscription and local operator policies, and/or the like, when the UE 100 triggers the establishment of a PDU session. The selected SMF 160 may establish the PDU session based on S-NSSAI and DNN.

In an example, in order to support network-controlled privacy of slice information for the slices the UE 100 may access, when the UE 100 is aware or configured that privacy considerations may apply to NSSAI, the UE 100 may not include NSSAI in NAS signaling unless the UE 100 has a NAS security context and the UE 100 may not include NSSAI in unprotected RRC signaling.

In an example, for roaming scenarios, the network slice specific network functions in VPLMN and HPLMN may be selected based on the S-NSSAI provided by the UE 100 during PDU connection establishment. If a standardized S-NSSAI is used, selection of slice specific NF instances may be done by each PLMN based on the provided S-NSSAI. In an example, the VPLMN may map the S-NSSAI of HPLMN to a S-NSSAI of VPLMN based on roaming agreement (e.g., including mapping to a default S-NSSAI of VPLMN). In an example, the selection of slice specific NF instance in VPLMN may be done based on the S-NSSAI of VPLMN. In an example, the selection of any slice specific NF instance in HPLMN may be based on the S-NSSAI of HPLMN.

As depicted in example FIG. 8 and FIG. 9, a registration procedure may be performed by the UE 100 to get authorized to receive services, to enable mobility tracking, to enable reachability, and/or the like.

In an example, the UE 100 may send to the (R)AN 105 an AN message 805 (comprising AN parameters, RM-NAS registration request (registration type, SUCI or SUPI or 5G-GUTI, last visited TAI (if available), security parameters, requested NSSAI, mapping of requested NSSAI, UE 100 5GC capability, PDU session status, PDU session(s) to be re-activated, Follow on request, MICO mode preference, and/or the like), and/or the like). In an example, in case of NG-RAN, the parameters may include e.g. SUCI or SUPI or the 5G-GUTI, the Selected PLMN ID and requested NSSAI, and/or the like. In an example, the parameters may comprise establishment cause. The establishment cause may provide the reason for requesting the establishment of an RRC connection. In an example, the registration type may indicate if the UE 100 wants to perform an initial registration (i.e. the UE 100 is in RM-DEREGISTERED state), a mobility registration update (e.g., the UE 100 is in RM-REGISTERED state and initiates a registration procedure due to mobility), a periodic registration update (e.g., the UE 100 is in RM-REGISTERED state and may initiate a registration procedure due to the periodic registration update timer expiry) or an emergency registration (e.g., the UE 100 is in limited service state). In an example, if the UE 100 performing an initial registration (i.e., the UE 100 is in RM-DEREGISTERED state) to a PLMN for which the UE 100 does not already have a 5G-GUTI, the UE 100 may include its SUCI or SUPI in the registration request. The SUCI may be included if the home network has provisioned the public key to protect SUPI in the UE. If the UE 100 received a UE 100 configuration update command indicating that the UE 100 needs to re-register and the 5G-GUTI is invalid, the UE 100 may perform an initial registration and may include the SUPI in the registration request message. For an emergency registration, the SUPI may be included if the UE 100 does not have a valid 5G-GUTI available; the PEI may be included when the UE 100 has no SUPI and no valid 5G-GUTI. In other cases, the 5G-GUTI may be included and it may indicate the last serving AMF 155. If the UE 100 is already registered via a non-3GPP access in a PLMN different from the new PLMN (e.g., not the registered PLMN or an equivalent PLMN of the registered PLMN) of the 3GPP access, the UE 100 may not provide over the 3GPP access the 5G-GUTI allocated by the AMF 155 during the registration procedure over the non-3GPP access. If the UE 100 is already registered via a 3GPP access in a PLMN (e.g., the registered PLMN), different from the new PLMN (i.e. not the registered PLMN or an equivalent PLMN of the registered PLMN) of the non-3GPP access, the UE 100 may not provide over the non-3GPP access the 5G-GUTI allocated by the AMF 155 during the registration procedure over the 3GPP access. The UE 100 may provide the UE's usage setting based on its configuration. In case of initial registration or mobility registration update, the UE 100 may include the mapping of requested NSSAI, which may be the mapping of each S-NSSAI of the requested NSSAI to the S-NSSAIs of the configured NSSAI for the HPLMN, to ensure that the network is able to verify whether the S-NSSAI(s) in the requested NSSAI are permitted based on the subscribed S-NSSAIs. If available, the last visited TAI may be included in order to help the AMF 155 produce registration area for the UE. In an example, the security parameters may be used for authentication and integrity protection. requested NSSAI may indicate the network slice selection assistance information. The PDU session status may indicates the previously established PDU sessions in the UE. When the UE 100 is connected to the two AMF 155 belonging to different PLMN via 3GPP access and non-3GPP access then the PDU session status may indicate the established PDU session of the current PLMN in the UE. The PDU session(s) to be re-activated may be included to indicate the PDU session(s) for which the UE 100 may intend to activate UP connections. A PDU session corresponding to a LADN may not be included in the PDU session(s) to be re-activated when the UE 100 is outside the area of availability of the LADN. The follow on request may be included when the UE 100 may have pending uplink signaling and the UE 100 may not include PDU session(s) to be re-activated, or the registration type may indicate the UE 100 may want to perform an emergency registration.

In an example, if a SUPI is included or the 5G-GUTI does not indicate a valid AMF 155, the (R)AN 105, based on (R)AT and requested NSSAI, if available, may selects 808 an AMF 155. If UE 100 is in CM-CONNECTED state, the (R)AN 105 may forward the registration request message to the AMF 155 based on the N2 connection of the UE. If the (R)AN 105 may not select an appropriate AMF 155, it may forward the registration request to an AMF 155 which has been configured, in (R)AN 105, to perform AMF 155 selection 808.

In an example, the (R)AN 105 may send to the new AMF 155 an N2 message 810 (comprising: N2 parameters, RM-NAS registration request (registration type, SUPI or 5G-GUTI, last visited TAI (if available), security parameters, requested NSSAI, mapping of requested NSSAI, UE 100 5GC capability, PDU session status, PDU session(s) to be re-activated, follow on request, and MICO mode preference), and/or the like). In an example, when NG-RAN is used, the N2 parameters may comprise the selected PLMN ID, location information, cell identity and the RAT type related to the cell in which the UE 100 is camping. In an example, when NG-RAN is used, the N2 parameters may include the establishment cause.

In an example, the new AMF 155 may send to the old AMF 155 an
Namf_Communication_UEContextTransfer (complete registration request) 815. In an example, if the UE's 5G-GUTI was included in the registration request and the serving AMF 155 has changed since last registration procedure, the new AMF 155 may invoke the Namf_Communication_UEContextTransfer service operation 815 on the old AMF 155 including the complete registration request IE, which may be integrity protected, to request the UE's SUPI and MM Context. The old AMF 155 may use the integrity protected complete registration request IE to verify if the context transfer service operation invocation corresponds to the UE 100 requested. In an example, the old AMF 155 may transfer the event subscriptions information by each NF consumer, for the UE, to the new AMF 155. In an example, if the UE 100 identifies itself with PEI, the SUPI request may be skipped.

In an example, the old AMF 155 may send to new AMF 155 a response 815 to Namf_Communication_UEContextTransfer (SUPI, MM context, SMF 160 information, PCF ID). In an example, the old AMF 155 may respond to the new AMF 155 for the Namf_Communication_UEContextTransfer invocation by including the UE's SUPI and MM context. In an example, if old AMF 155 holds information about established PDU sessions, the old AMF 155 may include SMF 160 information including S-NSSAI(s), SMF 160 identities and PDU session ID. In an example, if old AMF 155 holds information about active NGAP UE-TNLA bindings to N3IWF, the old AMF 155 may include information about the NGAP UE-TNLA bindings.

In an example, if the SUPI is not provided by the UE 100 nor retrieved from the old AMF 155 the identity request procedure 820 may be initiated by the AMF 155 sending an identity request message to the UE 100 requesting the SUCI.

In an example, the UE 100 may respond with an identity response message 820 including the SUCI. The UE 100 may derive the SUCI by using the provisioned public key of the HPLMN.

In an example, the AMF 155 may decide to initiate UE 100 authentication 825 by invoking an AUSF 150. The AMF 155 may select an AUSF 150 based on SUPI or SUCI. In an example, if the AMF 155 is configured to support emergency registration for unauthenticated SUPIs and the UE 100 indicated registration type emergency registration the AMF 155 may skip the authentication and security setup or the AMF 155 may accept that the authentication may fail and may continue the registration procedure.

In an example, the authentication 830 may be performed by Nudm_UEAuthenticate_Get operation. The AUSF 150 may discover a UDM 140. In case the AMF 155 provided a SUCI to AUSF 150, the AUSF 150 may return the SUPI to AMF 155 after the authentication is successful. In an example, if network slicing is used, the AMF 155 may decide if the registration request needs to be rerouted where the initial AMF 155 refers to the AMF 155. In an example, the AMF 155 may initiate NAS security functions. In an example, upon completion of NAS security function setup, the AMF 155 may initiate NGAP procedure to enable 5G-AN use it for securing procedures with the UE. In an example, the 5G-AN may store the security context and may acknowledge to the AMF 155. The 5G-AN may use the security context to protect the messages exchanged with the UE.

In an example, new AMF 155 may send to the old AMF 155 Namf_Communication_RegistrationCompleteNotify 835. If the AMF 155 has changed, the new AMF 155 may notify the old AMF 155 that the registration of the UE 100 in the new AMF 155 may be completed by invoking the Namf_Communication_RegistrationCompleteNotify service operation. If the authentication/security procedure fails, then the registration may be rejected, and the new AMF 155 may invoke the Namf_Communication_RegistrationCompleteNotify service operation with a reject indication reason code towards the old AMF 155. The old AMF 155 may continue as if the UE 100 context transfer service operation was never received. If one or more of the S-NSSAIs used in the old registration area may not be served in the target registration area, the new AMF 155 may determine which PDU session may not be supported in the new registration area. The new AMF 155 may invoke the Namf_Communication_RegistrationCompleteNotify service operation including the rejected PDU session ID and a reject cause (e.g. the S-NSSAI becomes no longer available) towards the old AMF 155. The new AMF 155 may modify the PDU session status correspondingly. The old AMF 155 may inform the corresponding SMF 160(*s*) to locally release the UE's SM context by invoking the Nsmf_PDUSession_ReleaseSMContext service operation.

In an example, the new AMF 155 may send to the UE 100 an identity request/response 840 (e.g., PEI). If the PEI was not provided by the UE 100 nor retrieved from the old AMF 155, the identity request procedure may be initiated by AMF 155 sending an identity request message to the UE 100 to retrieve the PEI. The PEI may be transferred encrypted unless the UE 100 performs emergency registration and may not be authenticated. For an emergency registration, the UE 100 may have included the PEI in the registration request.

In an example, the new AMF 155 may initiate ME identity check 845 by invoking the N5g-eir_EquipmentIdentityCheck_Get service operation 845.

In an example, the new AMF 155, based on the SUPI, may select 905 a UDM 140.

The UDM 140 may select a UDR instance. In an example, the AMF 155 may select a UDM 140.

In an example, if the AMF 155 has changed since the last registration procedure, or if the UE 100 provides a SUPI which may not refer to a valid context in the AMF 155, or if the UE 100 registers to the same AMF 155 it has already registered to a non-3GPP access (e.g., the UE 100 is registered over a non-3GPP access and may initiate the registration procedure to add a 3GPP access), the new AMF 155 may register with the UDM 140 using Nudm_UECM_Registration 910 and may subscribe to be notified when the UDM 140 may deregister the AMF 155. The UDM 140 may store the AMF 155 identity associated to the access type and may not remove the AMF 155 identity associated to the other access type. The UDM 140 may store information provided at registration in UDR, by Nudr_UDM_Update. In an example, the AMF 155 may retrieve the access and mobility subscription data and SMF 160 selection subscription data using Nudm_SDM_Get 915. The UDM 140 may retrieve this information from UDR by Nudr_UDM_Query (access and mobility subscription data). After a successful response is received, the AMF 155 may subscribe to be notified using Nudm_SDM_Subscribe 920 when the data requested may be modified. The UDM 140 may subscribe to UDR by Nudr_UDM_Subscribe. The GPSI may be provided to the AMF 155 in the subscription data from the UDM 140 if the GPSI is available in the UE 100 subscription data. In an example, the new AMF 155 may provide the access type it serves for the UE 100 to the UDM 140 and the access type may be set to 3GPP access. The UDM 140 may store the associated access type together with the serving AMF 155 in UDR by Nudr_UDM_Update. The new AMF 155 may create an MM context for the UE 100 after getting the mobility subscription data from the UDM 140. In an example, when the UDM 140 stores the associated access type together with the serving AMF 155, the UDM 140 may initiate a Nudm_UECM_DeregistrationNotification 921 to the old AMF 155 corresponding to 3GPP access. The old AMF 155 may remove the MM context of the UE. If the serving NF removal reason indicated by the UDM 140 is initial registration, then the old AMF 155 may invoke the Namf_EventExposure_Notify service operation towards all the associated SMF 160s of the UE 100 to notify that the UE 100 is deregistered from old AMF 155. The SMF 160 may release the PDU session(s) on getting this notification. In an example, the old AMF 155 may unsubscribe with the UDM 140 for subscription data using Nudm_SDM_unsubscribe 922.

In an example, if the AMF 155 decides to initiate PCF 135 communication, e.g. the AMF 155 has not yet obtained access and mobility policy for the UE 100 or if the access and mobility policy in the AMF 155 are no longer valid, the AMF 155 may select 925 a PCF 135. If the new AMF 155 receives a PCF ID from the old AMF 155 and successfully contacts the PCF 135 identified by the PCF ID, the AMF 155 may select the (V-)PCF identified by the PCF ID. If the PCF 135 identified by the PCF ID may not be used (e.g. no response from the PCF 135) or if there is no PCF ID received from the old AMF 155, the AMF 155 may select 925 a PCF 135.

In an example, the new AMF 155 may perform a policy association establishment 930 during registration procedure. If the new AMF 155 contacts the PCF 135 identified by the (V-)PCF ID received during inter-AMF 155 mobility, the new AMF 155 may include the PCF-ID in the Npcf_AM-PolicyControl Get operation. If the AMF 155 notifies the mobility restrictions (e.g. UE 100 location) to the PCF 135 for adjustment, or if the PCF 135 updates the mobility restrictions itself due to some conditions (e.g. application in use, time and date), the PCF 135 may provide the updated mobility restrictions to the AMF 155.

In an example, the PCF 135 may invoke Namf_EventExposure_Subscribe service operation 935 for UE 100 event subscription.

In an example, the AMF 155 may send to the SMF 160 a Nsmf_PDUSession_UpdateSMContext 936. In an example, the AMF 155 may invoke the Nsmf_PDUSession_UpdateSMContext if the PDU session(s) to be re-activated is included in the registration request. The AMF 155 may send Nsmf_PDUSession_UpdateSMContext request to SMF 160(*s*) associated with the PDU session(s) to activate user plane connections of the PDU session(s). The SMF 160 may decide to trigger e.g. the intermediate UPF 110 insertion, removal or change of PSA. In the case that the intermediate UPF 110 insertion, removal, or relocation is performed for the PDU session(s) not included in PDU session(s) to be re-activated, the procedure may be performed without N11 and N2 interactions to update the N3 user plane between (R)AN 105 and 5GC. The AMF 155 may invoke the Nsmf_PDUSession_ReleaseSMContext service operation towards the SMF 160 if any PDU session status indicates that it is released at the UE 100. The AMF 155 may invoke the Nsmf_PDUSession_ReleaseSMContext service operation towards the SMF 160 in order to release any network resources related to the PDU session.

In an example, the new AMF 155155 may send to a N3IWF an N2 AMF 155 mobility request 940. If the AMF 155 has changed, the new AMF 155 may create an NGAP UE 100 association towards the N3IWF to which the UE 100 is connected. In an example, the N3IWF may respond to the new AMF 155 with an N2 AMF 155 mobility response 940.

In an example, the new AMF 155 may send to the UE 100 a registration accept 955 (comprising: 5G-GUTI, registration area, mobility restrictions, PDU session status, allowed NSSAI, [mapping of allowed NSSAI], periodic registration update timer, LADN information and accepted MICO mode, IMS voice over PS session supported indication, emergency service support indicator, and/or the like). In an example, the AMF 155 may send the registration accept message to the UE 100 indicating that the registration request has been accepted. 5G-GUTI may be included if the AMF 155 allocates a new 5G-GUTI. If the AMF 155 allocates a new registration area, it may send the registration area to the UE 100 via registration accept message 955. If there is no registration area included in the registration accept message, the UE 100 may consider the old registration area as valid. In an example, mobility restrictions may be included in case mobility restrictions may apply for the UE 100 and registration type may not be emergency registration. The AMF 155 may indicate the established PDU sessions to the UE 100 in the PDU session status. The UE 100 may remove locally any internal resources related to PDU sessions that are not marked as established in the received PDU session status. In an example, when the UE 100 is connected to the two AMF 155 belonging to different PLMN via 3GPP access and non-3GPP access then the UE 100 may remove locally any internal resources related to the PDU session of the current PLMN that are not marked as established in received PDU session status. If the PDU session status information was in the registration request, the AMF 155 may indicate the PDU session status to the UE. The mapping of allowed NSSAI may be the mapping of each S-NSSAI of the allowed NSSAI to the S-NSSAIs of the configured NSSAI for the HPLMN. The AMF 155 may include in the registration accept message 955 the LADN information for LADNs that are available within the registration area determined by the AMF 155 for the UE. If the UE 100 included MICO mode in the request, then AMF 155 may respond whether MICO mode may be used. The AMF 155 may set the IMS voice over PS session supported Indication. In an example, in order to set the IMS voice over PS session supported indication, the AMF 155 may perform a UE/RAN radio information and compatibility request procedure to check the compatibility of the UE 100 and RAN radio capabilities related to IMS voice over PS. In an example, the emergency service support indicator may inform the UE 100 that emergency services are supported, e.g., the UE 100 may request PDU session for emergency services. In an example, the handover restriction list and UE-AMBR may be provided to NG-RAN by the AMF 155.

In an example, the UE 100 may send to the new AMF 155 a registration complete 960 message. In an example, the UE 100 may send the registration complete message 960 to the AMF 155 to acknowledge that a new 5G-GUTI may be assigned. In an example, when information about the PDU session(s) to be re-activated is not included in the registration request, the AMF 155 may release the signaling connection with the UE 100. In an example, when the follow-on request is included in the registration request, the AMF 155 may not release the signaling connection after the completion of the registration procedure. In an example, if the AMF 155 is aware that some signaling is pending in the AMF 155 or between the UE 100 and the 5GC, the AMF 155 may not release the signaling connection after the completion of the registration procedure.

Figure 10:
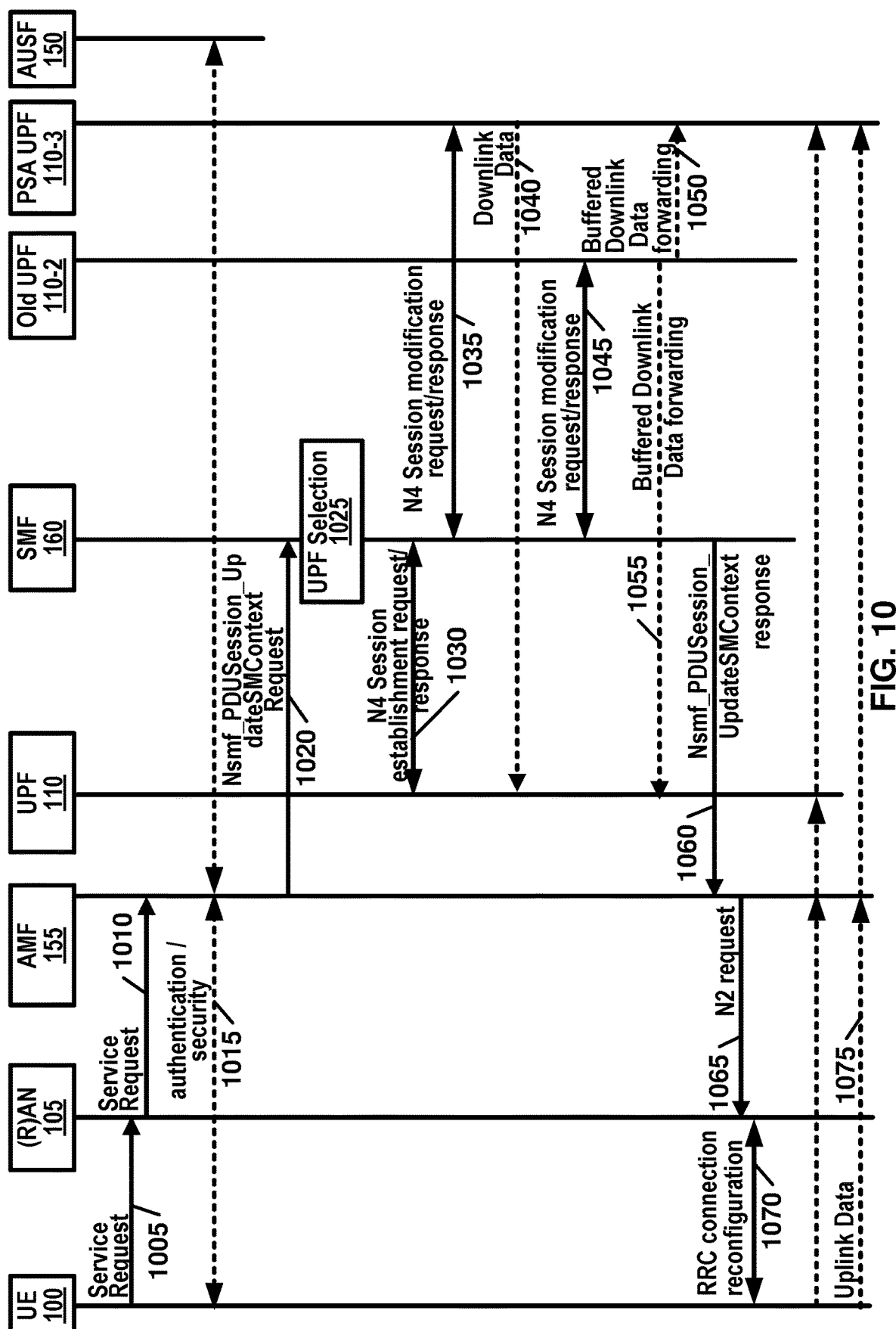
FIG. 10 is an example call flow for service request procedure as per an aspect of an embodiment of the present disclosure.
Figure 11:
FIG. 11 is an example call flow for service request procedure as per an aspect of an embodiment of the present disclosure.

As depicted in example FIG. 10 and FIG. 11, a service request procedure e.g., a UE 100 triggered service request procedure may be used by a UE 100 in CM-IDLE state to request the establishment of a secure connection to an AMF 155. FIG. 11 is continuation of FIG. 10 depicting the service request procedure. The service request procedure may be used to activate a user plane connection for an established PDU session. The service request procedure may be triggered by the UE 100 or the 5GC, and may be used when the UE 100 is in CM-IDLE and/or in CM-CONNECTED and may allow selectively to activate user plane connections for some of the established PDU sessions.

In an example, a UE 100 in CM IDLE state may initiate the service request procedure to send uplink signaling messages, user data, and/or the like, as a response to a network paging request, and/or the like. In an example, after receiving the service request message, the AMF 155 may perform authentication. In an example, after the establishment of signaling connection to the AMF 155, the UE 100 or network may send signaling messages, e.g. PDU session establishment from the UE 100 to a SMF 160, via the AMF 155.

In an example, for any service request, the AMF 155 may respond with a service accept message to synchronize PDU session status between the UE 100 and network. The AMF 155 may respond with a service reject message to the UE 100, if the service request may not be accepted by the network. The service reject message may include an indication or cause code requesting the UE 100 to perform a registration update procedure. In an example, for service request due to user data, network may take further actions if user plane connection activation may not be successful. In an example FIG. 10 and FIG. 11, more than one UPF, e.g., old UPF 110-2 and PDU session Anchor PSA UPF 110-3 may be involved.

In an example, the UE 100 may send to a (R)AN 105 an AN message comprising AN parameters, mobility management, MM NAS service request 1005 (e.g., list of PDU sessions to be activated, list of allowed PDU sessions, security parameters, PDU session status, and/or the like), and/or the like. In an example, the UE 100 may provide the list of PDU sessions to be activated when the UE 100 may re-activate the PDU session(s). The list of allowed PDU sessions may be provided by the UE 100 when the service request may be a response of a paging or a NAS notification, and may identify the PDU sessions that may be transferred or associated to the access on which the service request may be sent. In an example, for the case of NG-RAN, the parameters may include selected PLMN ID, and an establishment cause. The establishment cause may provide the reason for requesting the establishment of an RRC connection. The UE 100 may send NAS service request message towards the AMF 155 encapsulated in an RRC message to the RAN 105.

In an example, if the service request may be triggered for user data, the UE 100 may identify, using the list of PDU sessions to be activated, the PDU session(s) for which the UP connections are to be activated in the NAS service request message. If the service request may be triggered for signaling, the UE 100 may not identify any PDU session(s). If this procedure may be triggered for paging response, and/or the UE 100 may have at the same time user data to be transferred, the UE 100 may identify the PDU session(s) whose UP connections may be activated in MM NAS service request message, by the list of PDU sessions to be activated.

In an example, if the service request over 3GPP access may be triggered in response to a paging indicating non-3GPP access, the NAS service request message may identify in the list of allowed PDU sessions the list of PDU sessions associated with the non-3GPP access that may be re-activated over 3GPP. In an example, the PDU session status may indicate the PDU sessions available in the UE 100. In an example, the UE 100 may not trigger the service request procedure for a PDU session corresponding to a LADN when the UE 100 may be outside the area of availability of the LADN. The UE 100 may not identify such PDU session(s) in the list of PDU sessions to be activated, if the service request may be triggered for other reasons.

In an example, the (R)AN 105 may send to AMF 155 an N2 Message 1010 (e.g., a service request) comprising N2 parameters, MM NAS service request, and/or the like. The AMF 155 may reject the N2 message if it may not be able to handle the service request. In an example, if NG-RAN may be used, the N2 parameters may include the 5G-GUTI, selected PLMN ID, location information, RAT type, establishment cause, and/or the like. In an example, the 5G-GUTI may be obtained in RRC procedure and the (R)AN 105 may select the AMF 155 according to the 5G-GUTI. In an example, the location information and RAT type may relate to the cell in which the UE 100 may be camping. In an example, based on the PDU session status, the AMF 155 may initiate PDU session release procedure in the network for the PDU sessions whose PDU session ID(s) may be indicated by the UE 100 as not available.

In an example, if the service request was not sent integrity protected or integrity protection verification failed, the AMF 155 may initiate a NAS authentication/security procedure 1015.

In an example, if the UE 100 triggers the service request to establish a signaling connection, upon successful establishment of the signaling connection, the UE 100 and the network may exchange NAS signaling.

In an example the AMF 155 may send to the SMF 160 a PDU session update context request 1020 e.g., Nsmf_P-DUSession_UpdateSMContext request comprising PDU session ID(s), Cause(s), UE 100 location information, access type, and/or the like.

In an example, the Nsmf_PDUSession_UpdateSMContext request may be invoked by the AMF 155 if the UE 100 may identify PDU session(s) to be activated in the NAS service request message. In an example, the Nsmf_PDUSession_UpdateSMContext request may be triggered by the SMF 160 wherein the PDU session(s) identified by the UE 100 may correlate to other PDU session ID(s) than the one triggering the procedure. In an example, the Nsmf_PDUSession_UpdateSMContext request may be triggered by the SMF 160 wherein the current UE 100 location may be outside the area of validity for the N2 information provided by the SMF 160 during a network triggered service request procedure. The AMF 155 may not send the N2 information provided by the SMF 160 during the network triggered service request procedure.

In an example, the AMF 155 may determine the PDU session(s) to be activated and may send an Nsmf_PDUSession_UpdateSMContext request to SMF 160(*s*) associated with the PDU session(s) with cause set to indicate establishment of user plane resources for the PDU session(s).

In an example, if the procedure may be triggered in response to paging indicating non-3GPP access, and the list of allowed PDU sessions provided by the UE 100 may not include the PDU session for which the UE 100 was paged, the AMF 155 may notify the SMF 160 that the user plane for the PDU session may not be re-activated. The service request procedure may succeed without re-activating the user plane of any PDU sessions, and the AMF 155 may notify the UE 100.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) keep the PDU session, may reject the activation of user plane connection for the PDU session and may inform the AMF 155. In an example, if the procedure may be triggered by a network triggered service request, the SMF 160 may notify the UPF 110 that originated the data notification to discard downlink data for the PDU sessions and/or to not provide further data notification messages. The SMF 160 may respond to the AMF 155 with an appropriate reject cause and the user plane activation of PDU session may be stopped.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) release the PDU session. The SMF 160 may locally release the PDU session and may inform the AMF 155 that the PDU session may be released. The SMF 160 may respond to the AMF 155 with an appropriate reject cause and the user plane Activation of PDU session may be stopped.

In an example, if the UP activation of the PDU session may be accepted by the SMF 160, based on the location info received from the AMF 155, the SMF 160 may check the UPF 110 Selection 1025 Criteria (e.g., slice isolation requirements, slice coexistence requirements, UPF's 110 dynamic load, UPF's 110 relative static capacity among UPFs supporting the same DNN, UPF 110 location available at the SMF 160, UE 100 location information, Capability of the UPF 110 and the functionality required for the particular UE 100 session. In an example, an appropriate UPF 110 may be selected by matching the functionality and features required for a UE 100, DNN, PDU session type (i.e. IPv4, IPv6, ethernet type or unstructured type) and if applicable, the static IP address/prefix, SSC mode selected for the PDU session, UE 100 subscription profile in UDM 140, DNAI as included in the PCC rules, local operator policies, S-NSSAI, access technology being used by the UE 100, UPF 110 logical topology, and/or the like), and may determine to perform one or more of the following: continue using the current UPF(s); may select a new intermediate UPF 110 (or add/remove an intermediate UPF 110), if the UE 100 has moved out of the service area of the UPF 110 that was previously connecting to the (R)AN 105, while maintaining the UPF(s) acting as PDU session anchor; may trigger re-establishment of the PDU session to perform relocation/reallocation of the UPF 110 acting as PDU session anchor, e.g. the UE 100 has moved out of the service area of the UPF 110 which is connecting to RAN 105.

In an example, the SMF 160 may send to the UPF 110 (e.g., new intermediate UPF 110) an N4 session establishment request 1030. In an example, if the SMF 160 may select a new UPF 110 to act as intermediate UPF 110-2 for the PDU session, or if the SMF 160 may select to insert an intermediate UPF 110 for a PDU session which may not have an intermediate UPF 110-2, an N4 session establishment request 1030 message may be sent to the new UPF 110, providing packet detection, data forwarding, enforcement and reporting rules to be installed on the new intermediate UPF. The PDU session anchor addressing information (on N9) for this PDU session may be provided to the intermediate UPF 110-2.

In an example, if a new UPF 110 is selected by the SMF 160 to replace the old (intermediate) UPF 110-2, the SMF 160 may include a data forwarding indication. The data forwarding indication may indicate to the UPF 110 that a second tunnel endpoint may be reserved for buffered DL data from the old I-UPF.

In an example, the new UPF 110 (intermediate) may send to SMF 160 an N4 session establishment response message 1030. In case the UPF 110 may allocate CN tunnel info, the UPF 110 may provide DL CN tunnel info for the UPF 110 acting as PDU session anchor and UL CN tunnel info (e.g., CN N3 tunnel info) to the SMF 160. If the data forwarding indication may be received, the new (intermediate) UPF 110 acting as N3 terminating point may send DL CN tunnel info for the old (intermediate) UPF 110-2 to the SMF 160. The SMF 160 may start a timer, to release the resource in the old intermediate UPF 110-2.

In an example, if the SMF 160 may selects a new intermediate UPF 110 for the PDU session or may remove the old I-UPF 110-2, the SMF 160 may send N4 session modification request message 1035 to PDU session anchor, PSA UPF 110-3, providing the data forwarding indication and DL tunnel information from new intermediate UPF 110.

In an example, if the new intermediate UPF 110 may be added for the PDU session, the (PSA) UPF 110-3 may begin to send the DL data to the new I-UPF 110 as indicated in the DL tunnel information.

In an example, if the service request may be triggered by the network, and the SMF 160 may remove the old I-UPF 110-2 and may not replace the old I-UPF 110-2 with the new I-UPF 110, the SMF 160 may include the data forwarding indication in the request. The data forwarding indication may indicate to the (PSA) UPF 110-3 that a second tunnel endpoint may be reserved for buffered DL data from the old I-UPF 110-2. In this case, the PSA UPF 110-3 may begin to buffer the DL data it may receive at the same time from the N6 interface.

In an example, the PSA UPF 110-3 (PSA) may send to the SMF 160 an N4 session modification response 1035. In an example, if the data forwarding indication may be received, the PSA UPF 110-3 may become as N3 terminating point and may send CN DL tunnel info for the old (intermediate) UPF 110-2 to the SMF 160. The SMF 160 may start a timer, to release the resource in old intermediate UPF 110-2 if there is one.

In an example, the SMF 160 may send to the old UPF 110-2 an N4 session modification request 1045 (e.g., may comprise new UPF 110 address, new UPF 110 DL tunnel ID, and/or the like). In an example, if the service request may be triggered by the network, and/or the SMF 160 may remove the old (intermediate) UPF 110-2, the SMF 160 may send the N4 session modification request message to the old (intermediate) UPF 110-2, and may provide the DL tunnel information for the buffered DL data. If the SMF 160 may allocate new I-UPF 110, the DL tunnel information is from the new (intermediate) UPF 110 may act as N3 terminating point. If the SMF 160 may not allocate a new I-UPF 110, the DL tunnel information may be from the new UPF 110 (PSA) 110-3 acting as N3 terminating point. The SMF 160 may start a timer to monitor the forwarding tunnel. In an example, the old (intermediate) UPF 110-2 may send N4 session modification response message to the SMF 160.

In an example, if the I-UPF 110-2 may be relocated and forwarding tunnel was established to the new I-UPF 110, the old (intermediate) UPF 110-2 may forward its buffered data to the new (intermediate) UPF 110 acting as N3 terminating point. In an example, if the old I-UPF 110-2 may be removed and the new I-UPF 110 may not be assigned for the PDU session and forwarding tunnel may be established to the UPF 110 (PSA) 110-3, the old (intermediate) UPF 110-2 may forward its buffered data to the UPF 110 (PSA) 110-3 acting as N3 terminating point.

In an example, the SMF 160 may send to the AMF 155 an N11 message 1060 e.g., a Nsmf_PDUSession_UpdateSM-Context response (comprising: N1 SM container (PDU session ID, PDU session re-establishment indication), N2 SM information (PDU session ID, QoS profile, CN N3 tunnel info, S-NSSAI), Cause), upon reception of the Nsmf_PDUSession_UpdateSMContext request with a cause including e.g., establishment of user plane resources. The SMF 160 may determine whether UPF 110 reallocation may be performed, based on the UE 100 location information, UPF 110 service area and operator policies. In an example, for a PDU session that the SMF 160 may determine to be served by the current UPF 110, e.g., PDU session anchor or intermediate UPF, the SMF 160 may generate N2 SM information and may send an Nsmf_PDUSession_Up-dateSMContext response 1060 to the AMF 155 to establish the user plane(s). The N2 SM information may contain information that the AMF 155 may provide to the RAN 105. In an example, for a PDU session that the SMF 160 may determine as requiring a UPF 110 relocation for PDU session anchor UPF, the SMF 160 may reject the activation of UP of the PDU session by sending Nsmf_PDUSession_UpdateSMContext response that may contain N1 SM container to the UE 100 via the AMF 155. The N1 SM container may include the corresponding PDU session ID and PDU session re-establishment indication.

Upon reception of the Namf_EventExposure_Notify from the AMF 155 to the SMF 160, with an indication that the UE 100 is reachable, if the SMF 160 may have pending DL data, the SMF 160 may invoke the Namf_Communication_N1N2 MessageTransfer service operation to the AMF 155 to establish the user plane(s) for the PDU sessions. In an example, the SMF 160 may resume sending DL data noti-fications to the AMF 155 in case of DL data.

In an example, the SMF 160 may send a message to the AMF 155 to reject the activation of UP of the PDU session by including a cause in the Nsmf_PDUSession_UpdateSM-Context response if the PDU session may correspond to a LADN and the UE 100 may be outside the area of avail-ability of the LADN, or if the AMF 155 may notify the SMF 160 that the UE 100 may be reachable for regulatory prioritized service, and the PDU session to be activated may not for a regulatory prioritized service; or if the SMF 160 may decide to perform PSA UPF 110-3 relocation for the requested PDU session.

In an example, the AMF 155 may send to the (R)AN 105 an N2 request message 1065 (e.g., N2 SM information received from SMF 160, security context, AMF 155 signal-ing connection ID, handover restriction list, MM NAS service accept, list of recommended cells/TAs/NG-RAN node identifiers). In an example, the RAN 105 may store the security context, AMF 155 signaling connection Id, QoS information for the QoS flows of the PDU sessions that may be activated and N3 tunnel IDs in the UE 100 RAN 105 context. In an example, the MM NAS service accept may include PDU session status in the AMF 155. If the activation of UP of a PDU session may be rejected by the SMF 160, the MM NAS service accept may include the PDU session ID and the reason why the user plane resources may not be activated (e.g. LADN not available). Local PDU session release during the session request procedure may be indi-cated to the UE 100 via the session Status.

In an example, if there are multiple PDU sessions that may involve multiple SMF 160s, the AMF 155 may not wait for responses from all SMF 160s before it may send N2 SM information to the UE 100. The AMF 155 may wait for all responses from the SMF 160s before it may send MM NAS service accept message to the UE 100.

In an example, the AMF 155 may include at least one N2 SM information from the SMF 160 if the procedure may be triggered for PDU session user plane activation. AMF 155 may send additional N2 SM information from SMF 160s in separate N2 message(s) (e.g. N2 tunnel setup request), if there is any. Alternatively, if multiple SMF 160s may be involved, the AMF 155 may send one N2 request message to (R)AN 105 after all the Nsmf_PDUSession_UpdateSM- Context response service operations from all the SMF 160s associated with the UE 100 may be received. In such case, the N2 request message may include the N2 SM information received in each of the Nsmf_PDUSession_UpdateSMContext response and PDU session ID to enable AMF 155 to associate responses to relevant SMF 160.

In an example, if the RAN 105 (e.g., NG RAN) node may provide the list of recommended cells/TAs/NG-RAN node identifiers during the release procedure, the AMF 155 may include the information from the list in the N2 request. The RAN 105 may use this information to allocate the RAN 105 notification area when the RAN 105 may decide to enable RRC inactive state for the UE 100.

If the AMF 155 may receive an indication, from the SMF 160 during a PDU session establishment procedure that the UE 100 may be using a PDU session related to latency sensitive services, for any of the PDU sessions established for the UE 100 and the AMF 155 has received an indication from the UE 100 that may support the CM-CONNECTED with RRC inactive state, then the AMF 155 may include the UE's RRC inactive assistance information. In an example, the AMF 155 based on network configuration, may include the UE's RRC inactive assistance information.

In an example, the (R)AN 105 may send to the UE 100 a message to perform RRC connection reconfiguration 1070 with the UE 100 depending on the QoS information for all the QoS flows of the PDU sessions whose UP connections may be activated and data radio bearers. In an example, the user plane security may be established.

In an example, if the N2 request may include a MM NAS service accept message, the RAN 105 may forward the MM NAS service accept to the UE 100. The UE 100 may locally delete context of PDU sessions that may not be available in 5GC.

In an example, if the N1 SM information may be transmitted to the UE 100 and may indicate that some PDU session(s) may be re-established, the UE 100 may initiate PDU session re-establishment for the PDU session(s) that me be re-established after the service request procedure may be complete.

In an example, after the user plane radio resources may be setup, the uplink data from the UE 100 may be forwarded to the RAN 105. The RAN 105 (e.g., NG-RAN) may send the uplink data to the UPF 110 address and tunnel ID provided.

In an example, the (R)AN 105 may send to the AMF 155 an N2 request Ack 1105 (e.g., N2 SM information (comprising: AN tunnel info, list of accepted QoS flows for the PDU sessions whose UP connections are activated, list of rejected QoS flows for the PDU sessions whose UP connections are activated)). In an example, the N2 request message may include N2 SM information(s), e.g. AN tunnel info. RAN 105 may respond N2 SM information with separate N2 message (e.g. N2 tunnel setup response). In an example, if multiple N2 SM information are included in the N2 request message, the N2 request Ack may include multiple N2 SM information and information to enable the AMF 155 to associate the responses to relevant SMF 160.

In an example, the AMF 155 may send to the SMF 160 a Nsmf_PDUSession_UpdateSMContext request 1110 (N2 SM information (AN tunnel info), RAT type) per PDU session. If the AMF 155 may receive N2 SM information (one or multiple) from the RAN 105, then the AMF 155 may forward the N2 SM information to the relevant SMF 160. If the UE 100 time zone may change compared to the last reported UE 100 Time Zone then the AMF 155 may include the UE 100 time zone IE in the Nsmf_PDUSession_UpdateSMContext request message.

In an example, if dynamic PCC is deployed, the SMF 160 may initiate notification about new location information to the PCF 135 (if subscribed) by invoking an event exposure notification operation (e.g., a Nsmf_EventExposure_Notify service operation). The PCF 135 may provide updated policies by invoking a policy control update notification message 1115 (e.g., a Npcf_SMPolicyControl_UpdateNotify operation).

In an example, if the SMF 160 may select a new UPF 110 to act as intermediate UPF 110 for the PDU session, the SMF 160 may initiates an N4 session modification procedure 1120 to the new I-UPF 110 and may provide AN tunnel info. The downlink data from the new I-UPF 110 may be forwarded to RAN 105 and UE 100. In an example, the UPF 110 may send to the SMF 160, an N4 session modification response 1120. In an example, the SMF 160 may send to the AMF 155, an Nsmf_PDUSession_UpdateSMContext response 1140.

In an example, if forwarding tunnel may be established to the new I-UPF 110 and if the timer SMF 160 set for forwarding tunnel may be expired, the SMF 160 may sends N4 session modification request 1145 to new (intermediate) UPF 110 acting as N3 terminating point to release the forwarding tunnel. In an example, the new (intermediate) UPF 110 may send to the SMF 160 an N4 session modification response 1145. In an example, the SMF 160 may send to the PSA UPF 110-3 an N4 session modification request 1150, or N4 session release request. In an example, if the SMF 160 may continue using the old UPF 110-2, the SMF 160 may send an N4 session modification request 1155, providing AN tunnel info. In an example, if the SMF 160 may select a new UPF 110 to act as intermediate UPF 110, and the old UPF 110-2 may not be PSA UPF 110-3, the SMF 160 may initiate resource release, after timer expires, by sending an N4 session release request (release cause) to the old intermediate UPF 110-2.

In an example, the old intermediate UPF 110-2 may send to the SMF 160 an N4 session modification response or N4 session release response 1155. The old UPF 110-2 may acknowledge with the N4 session modification response or N4 session release response message to confirm the modification or release of resources. The AMF 155 may invoke the Namf_EventExposure_Notify service operation to notify the mobility related events, after this procedure may complete, towards the NFs that may have subscribed for the events. In an example, the AMF 155 may invoke the Namf_EventExposure_Notify towards the SMF 160 if the SMF 160 had subscribed for UE 100 moving into or out of area of interest and if the UE's current location may indicate that it may be moving into or moving outside of the area of interest subscribed, or if the SMF 160 had subscribed for LADN DNN and if the UE 100 may be moving into or outside of an area where the LADN is available, or if the UE 100 may be in MICO mode and the AMF 155 had notified an SMF 160 of the UE 100 being unreachable and that SMF 160 may not send DL data notifications to the AMF 155, and the AMF 155 may informs the SMF 160 that the UE 100 is reachable, or if the SMF 160 had subscribed for UE 100 reachability status, then the AMF 155 may notify the UE 100 reachability.

Figure 12:
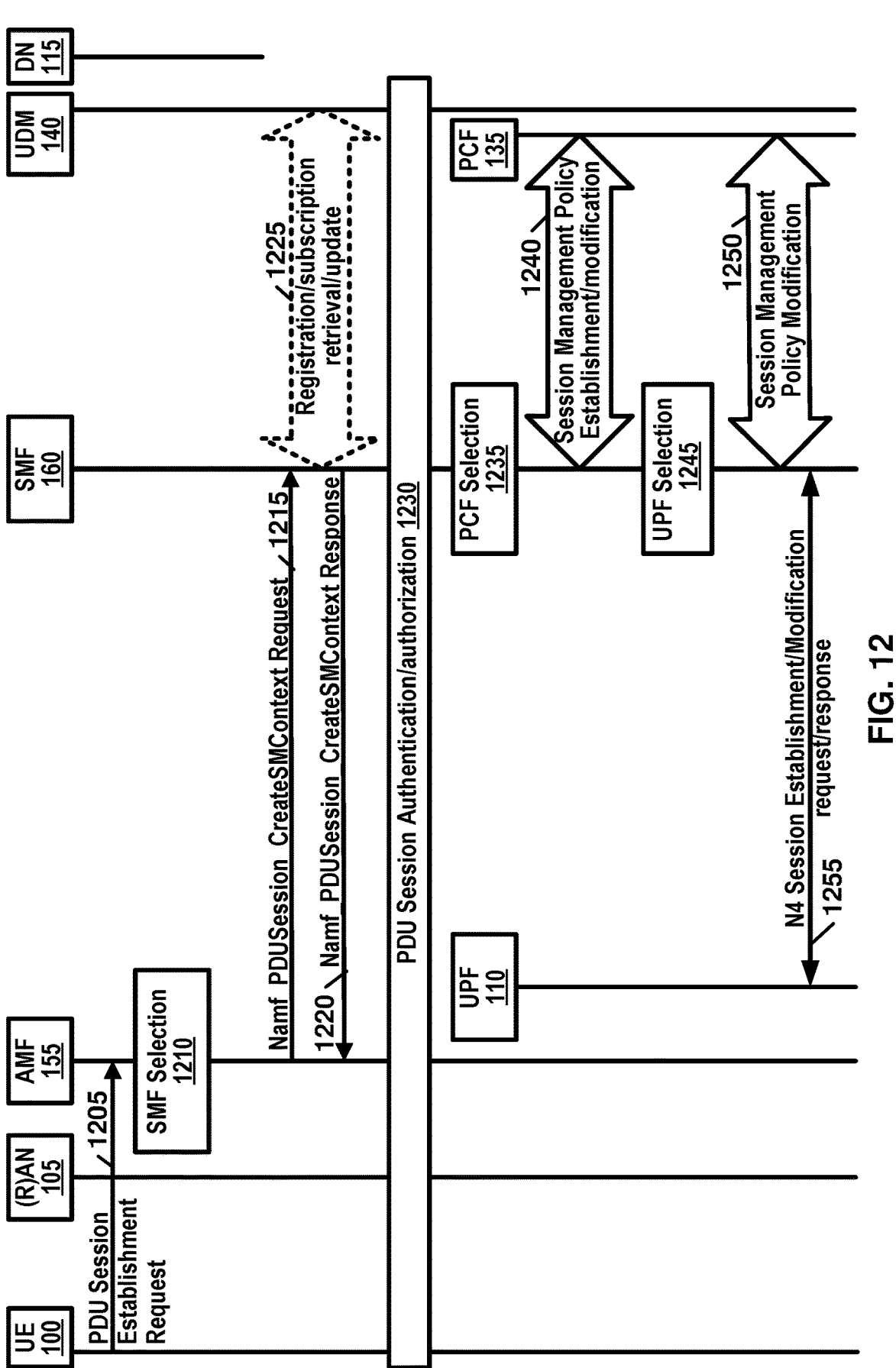
FIG. 12 is an example call flow for PDU session establishment procedure as per an aspect of an embodiment of the present disclosure.
Figure 13:
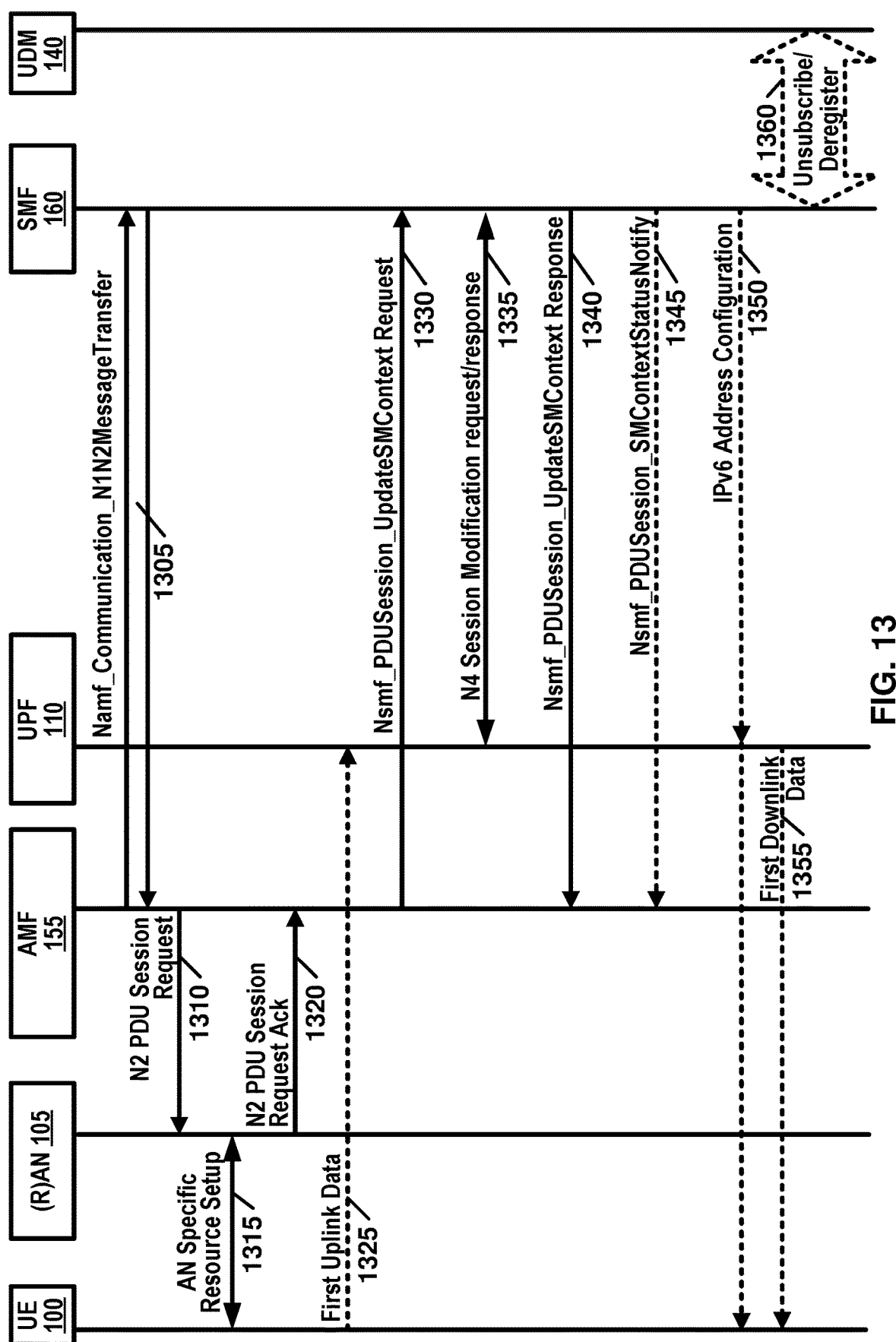
FIG. 13 is an example call flow for PDU session establishment procedure as per an aspect of an embodiment of the present disclosure.

An example PDU session establishment procedure depicted in FIG. 12 and FIG. 13. In an example embodiment, when the PDU session establishment procedure may be employed, the UE 100 may send to the AMF 155 a NAS Message 1205 (or a SM NAS message) comprising NSSAI, S-NSSAI (e.g., requested S-NSSAI, allowed S-NSSAI, subscribed S-NSSAI, and/or the like), DNN, PDU session ID, request type, old PDU session ID, N1 SM container (PDU session establishment request), and/or the like. In an example, the UE 100, in order to establish a new PDU session, may generate a new PDU session ID. In an example, when emergency service may be required and an emergency PDU session may not already be established, the UE 100 may initiate the UE 100 requested PDU session establishment procedure with a request type indicating emergency request. In an example, the UE 100 may initiate the UE 100 requested PDU session establishment procedure by the transmission of the NAS message containing a PDU session establishment request within the N1 SM container. The PDU session establishment request may include a PDU type, SSC mode, protocol configuration options, and/or the like. In an example, the request type may indicate initial request if the PDU session establishment is a request to establish the new PDU session and may indicate existing PDU session if the request refers to an existing PDU session between 3GPP access and non-3GPP access or to an existing PDN connection in EPC. In an example, the request type may indicate emergency request if the PDU session establishment may be a request to establish a PDU session for emergency services. The request type may indicate existing emergency PDU session if the request refers to an existing PDU session for emergency services between 3GPP access and non-3GPP access. In an example, the NAS message sent by the UE 100 may be encapsulated by the in a N2 message towards the AMF 155 that may include user location information and access technology type information. In an example, the PDU session establishment request message may contain SM PDU DN request container containing information for the PDU session authorization by the external DN. In an example, if the procedure may be triggered for SSC mode 3 operation, the UE 100 may include the old PDU session ID which may indicate the PDU session ID of the on-going PDU session to be released, in the NAS message. The old PDU session ID may be an optional parameter which may be included in this case. In an example, the AMF 155 may receive from the the NAS message (e.g., NAS SM message) together with user location information (e.g. cell ID in case of the RAN 105). In an example, the UE 100 may not trigger a PDU session establishment for a PDU session corresponding to a LADN when the UE 100 is outside the area of availability of the LADN.

In an example, the AMF 155 may determine that the NAS message or the SM NAS message may correspond to the request for the new PDU session based on that request type indicates initial request and that the PDU session ID may not be used for any existing PDU session(s) of the UE 100. If the NAS message does not contain an S-NSSAI, the AMF 155 may determine a default S-NSSAI for the requested PDU session either according to the UE 100 subscription, if it may contain only one default S-NSSAI, or based on operator policy. In an example, the AMF 155 may perform SMF 160 selection 1210 and select an SMF 160. If the request type may indicate initial request or the request may be due to handover from EPS, the AMF 155 may store an association of the S-NSSAI, the PDU session ID and a SMF 160 ID. In an example, if the request type is initial request and if the old PDU session ID indicating the existing PDU session may be contained in the message, the AMF 155 may select the SMF 160 and may store an association of the new PDU session ID and the selected SMF 160 ID.

In an example, the AMF 155 may send to the SMF 160, an N11 message 1215, e.g., Nsmf_PDUSession_CreateSM-Context request (comprising: SUPI or PEI, DNN, S-NSSAI, PDU session ID, AMF 155 ID, request type, N1 SM container (PDU session establishment request), user location information, access type, PEI, GPSI), or Nsmf_PDUSession_UpdateSMContext request (SUPI, DNN, S-NSSAI, PDU session ID, AMF 155 ID, request type, N1 SM container (PDU session establishment request), user location information, access type, RAT type, PEI). In an example, if the AMF 155 may not have an association with the SMF 160 for the PDU session ID provided by the UE 100 (e.g when request type indicates initial request), the AMF 155 may invoke the Nsmf_PDUSession_CreateSM-Context request, but if the AMF 155 already has an association with an SMF 160 for the PDU session ID provided by the UE 100 (e.g when request type indicates existing PDU session), the AMF 155 may invoke the Nsmf_P-DUSession_UpdateSMContext request. In an example, the AMF 155 ID may be the UE's GUAMI which uniquely identifies the AMF 155 serving the UE 100. The AMF 155 may forward the PDU session ID together with the N1 SM container containing the PDU session establishment request received from the UE 100. The AMF 155 may provide the PEI instead of the SUPI when the UE 100 has registered for emergency services without providing the SUPI. In case the UE 100 has registered for emergency services but has not been authenticated, the AMF 155 may indicate that the SUPI has not been authenticated.

In an example, if the request type may indicate neither emergency request nor existing emergency PDU session and, if the SMF 160 has not yet registered and subscription data may not be available, the SMF 160 may register with the UDM 140, and may retrieve subscription data 1225 and subscribes to be notified when subscription data may be modified. In an example, if the request type may indicate existing PDU session or existing emergency PDU session, the SMF 160 may determine that the request may be due to handover between 3GPP access and non-3GPP access or due to handover from EPS. The SMF 160 may identify the existing PDU session based on the PDU session ID. The SMF 160 may not create a new SM context but instead may update the existing SM context and may provide the representation of the updated SM context to the AMF 155 in the response. if the request type may be initial request and if the old PDU session ID may be included in Nsmf_PDUSession_CreateSMContext request, the SMF 160 may identify the existing PDU session to be released based on the old PDU session ID.

In an example, the SMF 160 may send to the AMF 155, the N11 message response 1220, e.g., either a PDU session create/update response, Nsmf_PDUSession_CreateSMContext response 1220 (cause, SM context ID or N1 SM container (PDU session reject(cause))) or an Nsmf_P-DUSession_UpdateSMContext response.

In an example, if the SMF 160 may perform secondary authorization/authentication 1230 during the establishment of the PDU session by a DN-AAA server, the SMF 160 may select a UPF 110 and may trigger a PDU session establishment authentication/authorization.

In an example, if the request type may indicate initial request, the SMF 160 may select an SSC mode for the PDU session. The SMF 160 may select one or more UPFs as needed. In case of PDU type IPv4 or IPv6, the SMF 160 may allocate an IP address/prefix for the PDU session. In case of PDU type IPv6, the SMF 160 may allocate an interface identifier to the UE 100 for the UE 100 to build its link-local address. For Unstructured PDU type the SMF 160 may allocate an IPv6 prefix for the PDU session and N6 point-to-point tunneling (based on UDP/IPv6).

In an example, if dynamic PCC is deployed, the may SMF 160 performs PCF 135 selection 1235. If the request type indicates existing PDU session or existing emergency PDU session, the SMF 160 may use the PCF 135 already selected for the PDU session. If dynamic PCC is not deployed, the SMF 160 may apply local policy.

In an example, the SMF 160 may perform a session management policy establishment procedure 1240 to establish a PDU session with the PCF 135 and may get the default PCC Rules for the PDU session. The GPSI may be included if available at the SMF 160. If the request type in 1215 indicates existing PDU session, the SMF 160 may notify an event previously subscribed by the PCF 135 by a session management policy modification procedure and the PCF 135 may update policy information in the SMF 160. The PCF 135 may provide authorized session-AMBR and the authorized 5QI and ARP to SMF 160. The PCF 135 may subscribe to the IP allocation/release event in the SMF 160 (and may subscribe other events).

In an example, the PCF 135, based on the emergency DNN, may set the ARP of the PCC rules to a value that may be reserved for emergency services.

In an example, if the request type in 1215 indicates initial request, the SMF 160 may select an SSC mode for the PDU session. The SMF 160 may select 1245 one or more UPFs as needed. In case of PDU type IPv4 or IPv6, the SMF 160 may allocate an IP address/prefix for the PDU session. In case of PDU type IPv6, the SMF 160 may allocate an interface identifier to the UE 100 for the UE 100 to build its link-local address. For unstructured PDU type the SMF 160 may allocate an IPv6 prefix for the PDU session and N6 point-to-point tunneling (e.g., based on UDP/IPv6). In an example, for Ethernet PDU type PDU session, neither a MAC nor an IP address may be allocated by the SMF 160 to the UE 100 for this PDU session.

In an example, if the request type in 1215 is existing PDU session, the SMF 160 may maintain the same IP address/prefix that may be allocated to the UE 100 in the source network.

In an example, if the request type in 1215 indicates existing PDU session referring to an existing PDU session moved between 3GPP access and non-3GPP access, the SMF 160 may maintain the SSC mode of the PDU session, e.g., the current PDU session Anchor and IP address. In an example, the SMF 160 may trigger e.g. new intermediate UPF 110 insertion or allocation of a new UPF 110. In an example, if the request type indicates emergency request, the SMF 160 may select 1245 the UPF 110 and may select SSC mode 1.

In an example, the SMF 160 may perform a session management policy modification 1250 procedure to report some event to the PCF 135 that has previously subscribed. If request type is initial request and dynamic PCC is deployed and PDU type is IPv4 or IPv6, the SMF 160 may notify the PCF 135 (that has previously subscribed) with the allocated UE 100 IP address/prefix.

In an example, the PCF 135 may provide updated policies to the SMF 160. The PCF 135 may provide authorized session-AMBR and the authorized 5QI and ARP to the SMF 160.

In an example, if request type indicates initial request, the SMF 160 may initiate an N4 session establishment procedure 1255 with the selected UPF 110. The SMF 160 may initiate an N4 session modification procedure with the selected UPF 110. In an example, the SMF 160 may send an N4 session establishment/modification request 1255 to the UPF 110 and may provide packet detection, enforcement, reporting rules, and/or the like to be installed on the UPF 110 for this PDU session. If CN tunnel info is allocated by the SMF 160, the CN tunnel info may be provided to the UPF 110. If the selective user plane deactivation is required for this PDU session, the SMF 160 may determine the Inactivity Timer and may provide it to the UPF 110. In an example, the UPF 110 may acknowledges by sending an N4 session establishment/modification response 1255. If CN tunnel info is allocated by the UPF, the CN tunnel info may be provided to SMF 160. In an example, if multiple UPFs are selected for the PDU session, the SMF 160 may initiate N4 session establishment/modification procedure 1255 with each UPF 110 of the PDU session.

In an example, the SMF 160 may send to the AMF 155 an Namf_Communication_N1N2 MessageTransfer 1305 message (comprising PDU session ID, access type, N2 SM information (PDU session ID, QFI(s), QoS profile(s), CN tunnel info, S-NSSAI, session-AMBR, PDU session type, and/or the like), N1 SM container (PDU session establishment accept (QoS Rule(s), selected SSC mode, S-NSSAI, allocated IPv4 address, interface identifier, session-AMBR, selected PDU session type, and/or the like))). In case of multiple UPFs are used for the PDU session, the CN tunnel info may comprise tunnel information related with the UPF 110 that terminates N3. In an example, the N2 SM information may carry information that the AMF 155 may forward to the (R)AN 105 (e.g., the CN tunnel info corresponding to the core network address of the N3 tunnel corresponding to the PDU session, one or multiple QoS profiles and the corresponding QFIs may be provided to the (R)AN 105, the PDU session ID may be used by AN signaling with the UE 100 to indicate to the UE 100 the association between AN resources and a PDU session for the UE100, and/or the like). In an example, a PDU session may be associated to an S-NSSAI and a DNN. In an example, the N1 SM container may contain the PDU session establishment accept that the AMF 155 may provide to the UE 100. In an example, multiple QoS rules and QoS profiles may be included in the PDU session establishment accept within the N1 SM and in the N2 SM information. In an example, the Namf_Communication_N1N2 MessageTransfer 1305 may further comprise the PDU session ID and information allowing the AMF 155 to know which access towards the UE 100 to use.

In an example, the AMF 155 may send to the (R)AN105 an N2 PDU session request 1310 (comprising N2 SM information, NAS message (PDU session ID, N1 SM container (PDU session establishment accept, and/or the like))). In an example, the AMF 155 may send the NAS message 1310 that may comprise PDU session ID and PDU session establishment accept targeted to the UE 100 and the N2 SM information received from the SMF 160 within the N2 PDU session request 1310 to the (R)AN 105.

In an example, the (R)AN 105 may issue AN specific signaling exchange 1315 with the UE 100 that may be related with the information received from SMF 160. In an example, in case of a 3GPP RAN 105, an RRC connection reconfiguration procedure may take place with the UE 100 to establish the necessary RAN 105 resources related to the QoS Rules for the PDU session request 1310. In an example, (R)AN 105 may allocate (R)AN 105 N3 tunnel information for the PDU session. In case of dual connectivity, the master RAN 105 node may assign some (zero or more) QFIs to be setup to a master RAN 105 node and others to the secondary RAN 105 node. The tunnel info may comprise a tunnel endpoint for each involved RAN 105 node, and the QFIs assigned to each tunnel endpoint. A QFI may be assigned to either the master RAN 105 node or the secondary RAN 105 node. In an example, (R)AN 105 may forward the NAS message 1310 (PDU session ID, N1 SM container (PDU session establishment accept)) to the UE 100. The (R)AN 105 may provide the NAS message to the UE 100 if the necessary RAN 105 resources are established and the allocation of (R)AN 105 tunnel information are successful.

In an example, the N2 PDU session response 1320 may comprise a PDU session ID, cause, N2 SM information (PDU session ID, AN tunnel info, list of accepted/rejected QFI(s)), and/or the like. In an example, the tunnel info may correspond to the access network address of the N3 tunnel corresponding to the PDU session.

In an example, the AMF 155 may forward the N2 SM information received from (R)AN 105 to the SMF 160 via a Nsmf_PDUSession_UpdateSMContext request 1330 (comprising: N2 SM information, request type, and/or the like). In an example, if the list of rejected QFI(s) is included in N2 SM information, the SMF 160 may release the rejected QFI(s) associated QoS profiles.

In an example, the SMF 160 may initiate an N4 session modification procedure 1335 with the UPF110. The SMF 160 may provide AN tunnel info to the UPF 110 as well as the corresponding forwarding rules. In an example, the UPF 110 may provide an N4 session modification response 1335 to the SMF 160160.

In an example, the SMF 160 may send to the AMF 155 an Nsmf_PDUSession_UpdateSMContext response 1340 (Cause). In an example, the SMF 160 may subscribe to the UE 100 mobility event notification from the AMF 155 (e.g. location reporting, UE 100 moving into or out of area of interest), after this step by invoking Namf_EventExposure_Subscribe service operation. For LADN, the SMF 160 may subscribe to the UE 100 moving into or out of LADN service area event notification by providing the LADN DNN as an indicator for the area of interest. The AMF 155 may forward relevant events subscribed by the SMF 160.

In an example, the SMF 160 may send to the AMF 155, a Nsmf_PDUSession_SMContextStatusNotify (release) 1345. In an example, if during the procedure, any time the PDU session establishment is not successful, the SMF 160 may inform the AMF 155 by invoking Nsmf_PDUSession_SMContextStatusNotify(release) 1345. The SMF 160 may releases any N4 session(s) created, any PDU session address if allocated (e.g IP address) and may release the association with the PCF 135.

In an example, in case of PDU type IPv6, the SMF 160 may generate an IPv6 Router Advertisement 1350 and may send it to the UE 100 via N4 and the UPF 110.

In an example, if the PDU session may not be established, the SMF 160 may unsubscribe 1360 to the modifications of session management subscription data for the corresponding (SUPI, DNN, S-NSSAI), using Nudm_SDM_Unsubscribe (SUPI, DNN, S-NSSAI), if the SMF 160 is no more handling a PDU session of the UE 100 for this (DNN, S-NSSAI). In an example, if the PDU session may not be established, the SMF 160 may deregister 1360 for the given PDU session using Nudm_UECM_Deregistration (SUPI, DNN, PDU session ID).

Figure 14:
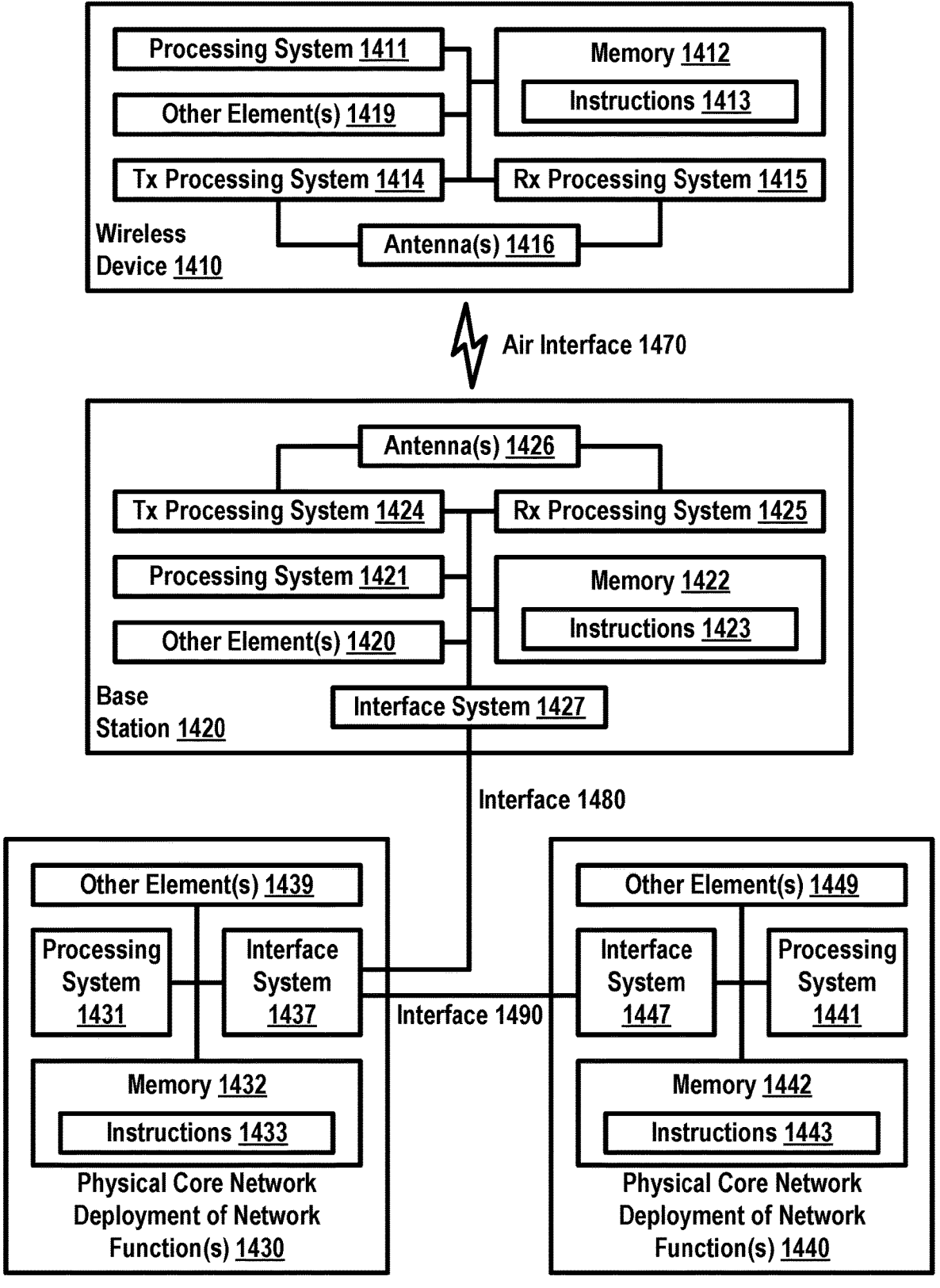
FIG. 14 illustrates an example mobile communication networks as per an aspect of an embodiment of the present disclosure.

FIG. 14 illustrates another example of a mobile communication network in which embodiments of the present disclosure may be implemented. The mobile communication network depicted in FIG. 14 includes a wireless device 1410, a base station 1420, a physical core network deployment of one or more network functions 1430 (henceforth "CN deployment 1430"), and a physical core network deployment of one or more network functions 1440 (henceforth "CN deployment 1440"). The deployment 1430 and the deployment 1440 may be elements of a core network.

The wireless device 1410 may communicate with the base station 1420 over an air interface 1470. The communication direction from the wireless device 1410 to the base station 1420 over the air interface is known as uplink, and the communication direction from the base station 1420 to the wireless device 1410 over the air interface 1470 is known as downlink. Downlink transmissions may be separated from uplink transmissions using FDD, TDD, and/or some combination of the two duplexing techniques. FIG. 14 shows a single wireless device 1410 and a single base station 1420, but it will be understood that the wireless device 1410 may communicate with any number of base stations or other access network components over the air interface 1470, and that the base station 1420 may communicate with any number of wireless devices over the air interface 1470.

The wireless device 1410 may comprise a processing system 1411 and a memory 1412. The memory 1412 may comprise one or more computer-readable media, for example, one or more non-transitory computer readable media. The memory 1412 may include instructions 1413. The processing system 1411 may process and/or execute the instructions 1413. Processing and/or execution of the instructions 1413 may cause the processing system 1411 to perform one or more functions or activities. The memory 1412 may include data (not shown). One of the functions or activities performed by the processing system 1411 may be to store data in the memory 1412 and/or retrieve previously-stored data from the memory 1412. In an example, downlink data received from the base station 1420 may be stored in the memory 1412, and uplink data for transmission to the base station 1420 may be retrieved from the memory 1412. The wireless device 1410 may communicate with the base station 1420 using a transmission processing system 1414 and a reception processing system 1415. The wireless device 1410 may comprise one or more antennas 1416 to access the air interface 1470. Although not shown in FIG. 14, the transmission processing system 1414 and/or the reception processing system 1415 may be coupled to a dedicated memory that is analogous to but separate from the memory 1412, and comprises instructions that may be processed and/or executed to carry out one or more of their respective functionalities.

The wireless device 1410 may comprise one or more other elements 1419. The one or more other elements 1419 may comprise software and/or hardware that provide features and/or functionalities, for example, a speaker, a microphone, a keypad, a display, a touchpad, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, a global positioning sensor (GPS) and/or the like). The wireless device 1410 may receive user input data from and/or provide user output data to the one or more one or more other elements 1419. The one or more other elements 1419 may comprise a power source. The wireless device 1410 may receive power from the power source and may be configured to distribute the power to the other components in the wireless device 1410. The power source may comprise one or more sources of power, for example, a battery, a solar cell, a fuel cell, or any combination thereof.

The wireless device 1410 may transmit data to the base station 1420 via the air interface 1470. To perform the transmission, the processing system 1411 may implement layer 3 and layer 2 open systems interconnection (OSI) functionality to process the data for uplink transmission. Layer 3 may include a radio resource control layer (RRC). Layer 14 may include a service data application protocol layer (SDAP), a packet data convergence protocol layer (PDCP), a radio link control layer (RLC), and a media access control layer (MAC). The data may be provided to the transmission processing system 1414, which may implement layer 1 OSI functionality. Layer 1 may include a physical layer (PHY). The wireless device 1410 may transmit the data over the air interface 1470 using one or more antennas 1416. For scenarios where the one or more antennas 1416 include multiple antennas, the multiple antennas may be used to perform one or more multi-antenna techniques, such as spatial multiplexing (e.g., single-user multiple-input multiple output (MIMO) or multi-user MIMO), transmit/receive diversity, and/or beamforming.

The wireless device 1410 may receive downlink data from the base station 1420 over the air interface 1470. The downlink data may be received via the one or more antennas 1416. The reception processing system 1415 may implement layer 1 OSI functionality on the received downlink data and may provide the data to the processing system 1411. The processing system 1411 may implement layer 2 and layer 3 OSI functionality to process the received downlink data. The base station 1420 may comprise elements analogous to the elements of the wireless device 1410. The base station 1420 may comprise a processing system 1421 and a memory 1422. The memory 1422 may comprise one or more computer-readable media, for example, one or more non-transitory computer readable media. The memory 1422 may include instructions 1423. The processing system 1421 may process and/or execute the instructions 1423. Processing and/or execution of the instructions 1423 may cause the processing system 1421 to perform one or more functions or activities. The memory 1422 may include data (not shown). One of the functions or activities performed by the processing system 1421 may be to store data in the memory 1422 and/or retrieve previously-stored data from the memory 1422. The base station 1420 may communicate with the wireless device 1410 using a transmission processing system 1424 and a reception processing system 1425. The base station 1420 may comprise one or more antennas 1426 to access the air interface 1470. The processing system 1421 may implement layer 14 and layer 3 OSI functionality. The transmission processing system 1424 and the reception processing system 1425 may implement layer 1 OSI functionality to perform transmission of downlink data and reception of uplink data, respectively.

The base station 1420 may comprise an interface system 1427. The interface system 1427 may communicate with one or more elements of the core network via an interface 1480. The interface 1480 may be wired and/or wireless and the interface system 1427 may include one or more components suitable for communicating via the interface 1480. In FIG. 14, the interface 1480 connects the base station 1420 to a single CN deployment 1430, but it will be understood that the wireless device 1410 may communicate with any number of CN deployments over the interface 1480, and that the CN deployment 1430 may communicate with any number of base stations over the interface 1480. The base station 1420 may comprise one or more other elements 1429 analogous to one or more of the one or more other elements 1419.

The CN deployment 1430 may comprise one or more network functions (NFs). For example, the CN deployment 1430 may comprise an AMF and/or a UPF analogous to the AMF and UPF depicted in FIG. 1. The CN deployment 1430 may comprise elements analogous to the elements of the wireless device 1410 and the base station 1420, as described above. The CN deployment 1430 may comprise a processing system 1431 and a memory 1432. The memory 1432 may comprise one or more computer-readable media, for example, one or more non-transitory computer readable media. The memory 1432 may include instructions 1433. The processing system 1431 may process and/or execute the instructions 1433. Processing and/or execution of the instructions 1433 may cause the processing system 1431 to perform one or more functions or activities. The memory 1432 may include data (not shown). One of the functions or activities performed by the processing system 1431 may be to store data in the memory 1432 and/or retrieve previously-stored data from the memory 1432. The CN deployment 1430 may access the interface 1480 using an interface system 1437. The CN deployment 1430 may also use the interface system 1437 to access an interface 1490. The CN deployment 1430 may use the interface 1490 to communicate with one or more data networks (analogous to, for example, the DN(s) depicted in FIG. 1 and/or one or more other CN deployments, including the CN deployment 1440 depicted in FIG. 14. The CN deployment 1430 may comprise one or more other elements 1439.

The CN deployment 1440 may comprise elements analogous to the elements of the CN deployment 1430, as described above. The CN deployment 1440 may comprise a processing system 1441 and a memory 1442. The memory 1442 may comprise one or more computer-readable media, for example, one or more non-transitory computer readable media. The memory 1442 may include instructions 1443. The processing system 1441 may process and/or execute the instructions 1443. Processing and/or execution of the instructions 1443 may cause the processing system 1441 to perform one or more functions or activities. The memory 1442 may include data (not shown). One of the functions or activities performed by the processing system 1441 may be to store data in the memory 1442 and/or retrieve previously-stored data from the memory 1442. The CN deployment 1440 may access the interface 1490 using an interface system 1447. The CN deployment 1440 may comprise one or more other elements.

The processing system 1411, the processing system 1421, the processing system 1431, and/or the processing system 1441 may comprise one or more controllers and/or one or more processors. The one or more controllers and/or one or more processors may comprise, for example, a general-purpose processor, a digital signal processor (DSP), a micro-controller, an application specific integrated circuit (ASIC), a field programmable gate array (FPGA) and/or other programmable logic device, discrete gate and/or transistor logic, discrete hardware components, an on-board unit, or any combination thereof. The processing system 1411, the processing system 1421, the processing system 1431, and/or the processing system 1441 may perform signal coding/processing, data processing, power control, input/output processing, and/or any other functionality that may enable the wireless device 1410, base station 1420, CN deployment 1430, and/or CN deployment 1440 to operate in a mobile communications system.

Each CN deployment may comprise one or more network functions. Depending on the context in which the term is used, a network function (NF) may refer to a particular set of functionalities and/or one or more physical elements configured to perform those functionalities (e.g., a processing system and memory comprising instructions that, when executed by the processing system, cause the processing system to perform the functionalities). There are many different types of NF and each type of NF may be associated with a different set of functionalities. Different NFs may be flexibly deployed at different locations (for example, in different physical core network deployments) or in a same location (for example, co-located in the same physical core network deployment). Moreover, physical CN deployment are not limited to implementation of NFs. For example, a particular physical CN deployment may further include a base station or portions therefor and/or a data network or portions thereof. Accordingly, one or more NFs implemented on a particular physical core network deployment may be co-located with one or more non-core elements, including elements of an access network or data network.

Figure 15:
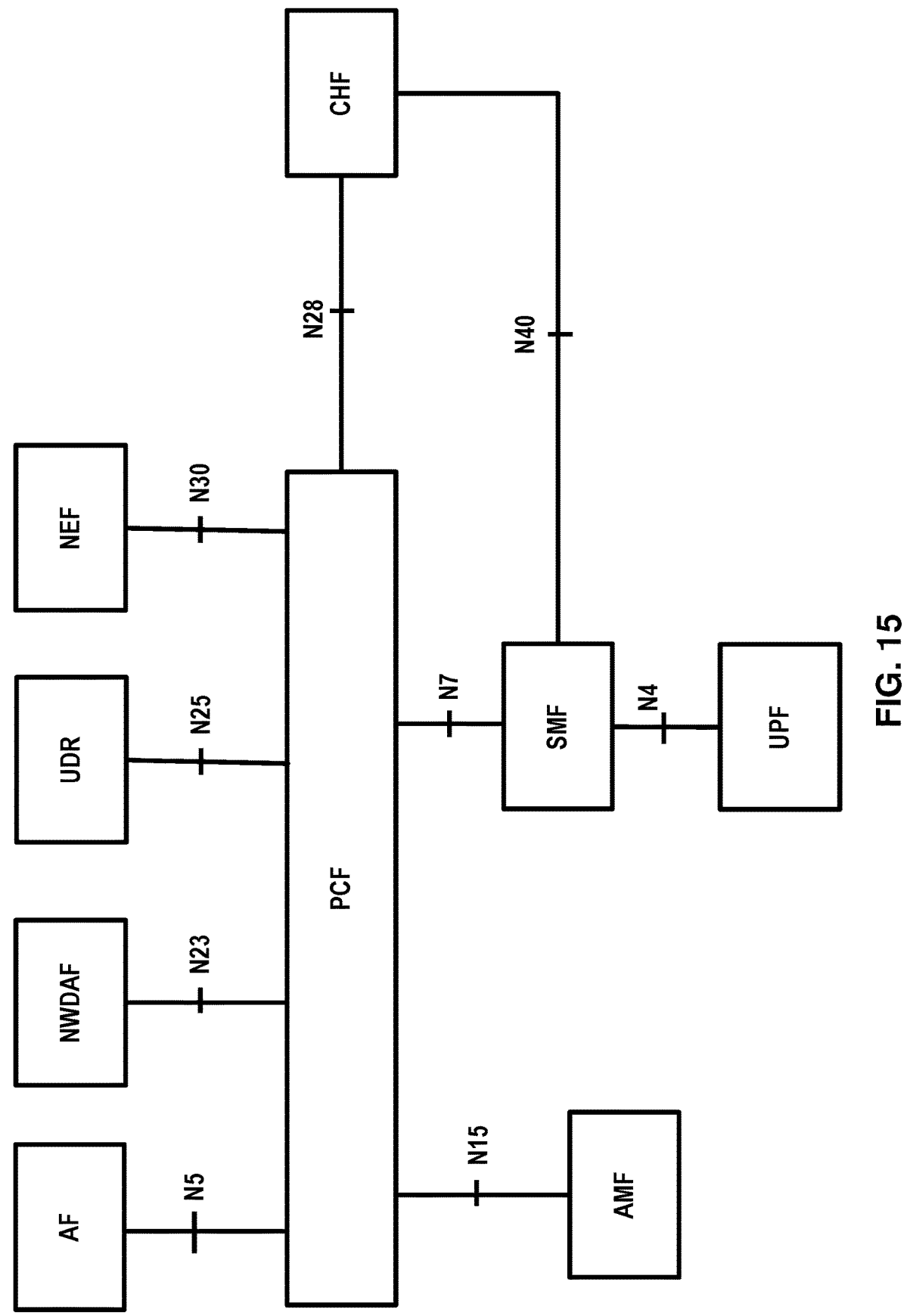
FIG. 15 is a diagram of an example 5G policy and charging control system architecture as per an aspect of an embodiment of the present disclosure.

In an example, FIG. 15 is a diagram of 5G policy and charging control system architecture. The reference architecture of policy and charging control framework for the 5G system may comprise one or more of the following network functions: policy control function (PCF), session management function (SMF), user plane function (UPF), access and mobility management function (AMF), network exposure functionality (NEF), network data analytics function (NWDAF), charging function (CHF), application function (AF) and unified data repository (UDR).

In an example, the CHF may support at least one charging method: offline charging, online charging, or converged charging. In an example, the offline charging may be a process where charging information for network resource usage may be collected concurrently with that resource usage. At the end of the process, CDR files may be generated by the network, which may be transferred to a network operator's billing domain (BD) for the purpose of subscriber billing and/or inter-operator accounting (or additional functions, e.g. statistics, at the operator's discretion). The BD typically comprises post-processing systems such as the operator's billing system or billing mediation device. In an example conclusion, offline charging may be a mechanism where charging information does not affect, in real-time, the service rendered. In an example, online charging may be a process where charging information for network resource usage may be collected concurrently with that resource usage in the same fashion as in offline charging. However, authorization for the network resource usage may be obtained by the network prior to the actual resource usage to occur. In an example, the charging information utilized in online charging may be not necessarily identical to the charging information employed in offline charging. In an example conclusion, online charging may be a mechanism where charging information may affect, in real-time, the service rendered and therefore a direct interaction of the charging mechanism with the control of network resource usage may be required. In an example, converged charging may be a process where online and offline charging may be combined.

Figure 16:
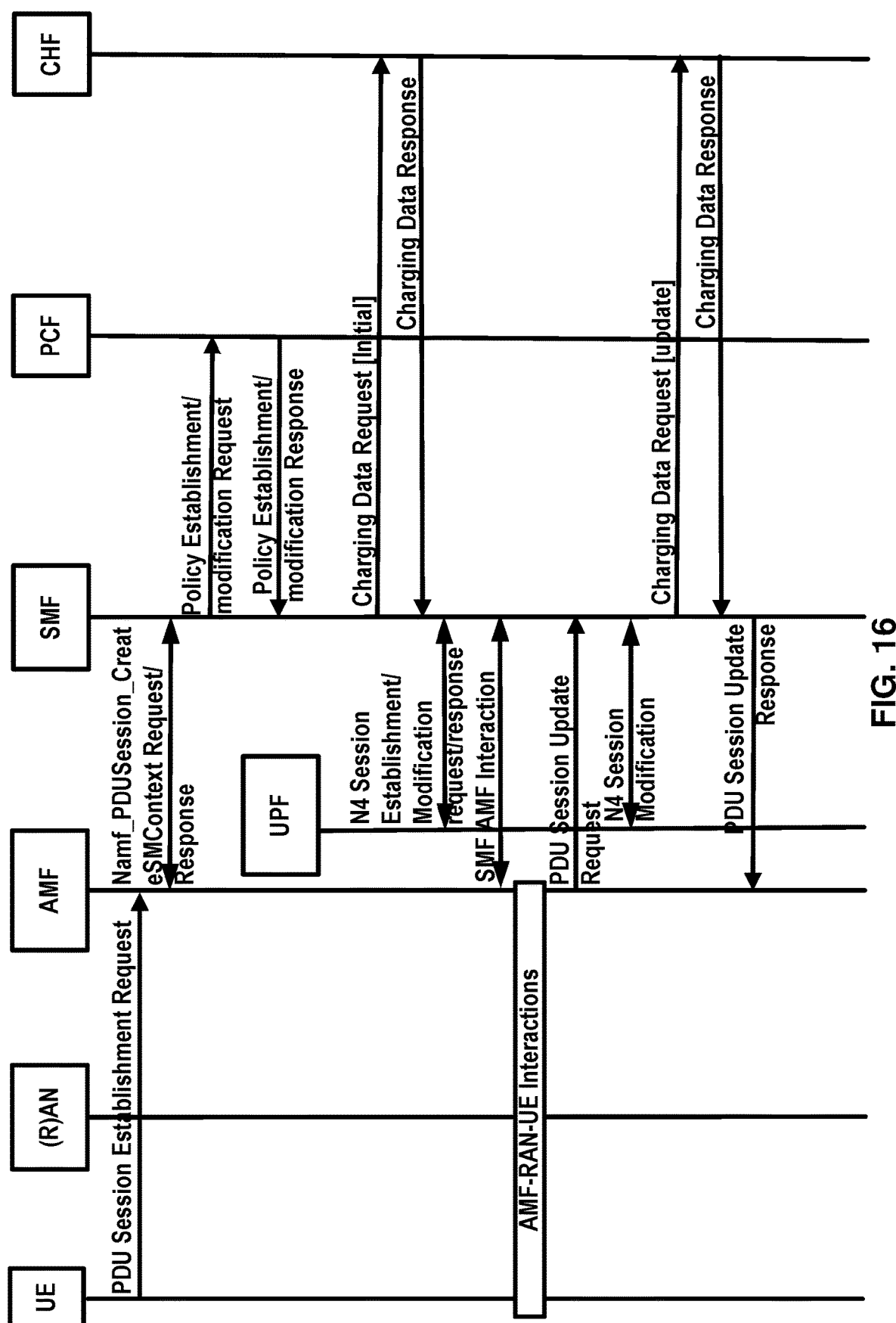
FIG. 16 is an example call flow for PDU session establishment charging as per an aspect of an embodiment of the present disclosure.

FIG. 16 is an example call flow for PDU session establishment charging as per an aspect of an embodiment of the present disclosure. In an example, a UE may initiate a PDU Session establishment procedure. A PDU Session Establishment Request may comprise one or more of: PDU Session ID, PDU Type, SSC mode, User location information and Access Technology Type Information. In response to the message received from the UE, an AMF may select an SMF and send to the selected SMF a message (e.g. Namf_P-

DUSession_CreateSMContext Request). The SMF may send to the AMF a response message (e.g. Namf_PDUSession_CreateSMContext Response).

In an example, the SMF may select a PCF and send to the PCF a message (e.g. SM Policy Association Establishment Request) to request PCC rules, and the PCF may provide PCC rules in a response message (e.g. SM Policy Association Establishment response). In an example, the SMF may create a Charging Id for the PDU session and may send a Charging Data Request [initial] message to a CHF for authorization for the subscriber to start the PDU session which is triggered by start of PDU session charging event. In an example, the CHF may open CDR for this PDU session and may acknowledge by sending a Charging Data Response [Initial] to the SMF. In an example, the SMF select a UPF and may initiate an N4 Session Establishment/Modification procedure with the selected UPF. The SMF may interact with the AMF, in an example, the SMF may send to the AMF a Namf_Communication_N1N2 MessageTransfer message comprising one or more of: PDU Session ID, QoS Profile(s), CN Tunnel Info, and S-NSSAI from the Allowed NSSAI. In an example, the AMF may interact with (R)AN and UE by sending to the (R)AN a N2 PDU Session Request message comprising the information received from the SMF, indicating the PDU session establishment is accepted.

In an example, the (R)AN may send to the AMF a N2 PDU Session Response message comprising one or more of: PDU Session ID, N2 SM information (PDU Session ID, AN Tunnel Info, List of accepted/rejected QFI(s)), wherein the Tunnel Info may be corresponding to the Access Network address of the N3 tunnel corresponding to the PDU Session. In an example, the AMF may send to the SMF a Nsmf_PDUSession_UpdateSMContext Request message comprising the N2 SM information received from (R)AN to the SMF. In an example, the SMF may initiate an N4 Session Modification procedure with the UPF. The SMF may provide AN Tunnel Info to the UPF as well as the corresponding forwarding rules. The UPF may send to the SMF a response message. In an example, the SMF may request quota from CHF, e.g. "start of service data flow" event may need quota from CHF. The SMF may send a message to the CHF (e.g. Charging Data Request [update]). As an example, for online charging or converged charging, the SMF may request quota from CHF when allocated quota is consumed or a trigger is met to request a quota.

In an example, the UPF may report resource usage of a PDU session to the SMF. As an example, the UPF may report resource usage of a wireless device to the SMF. by enforcing the charging control rules, the SMF may send to the CHF a message (e.g. Charging Data Request [update]) comprising resource usage information received from the UPF. In an example, the CHF may update CDR for this PDU session. The CHF may acknowledge the SMF by sending a Charging Data Response message. In an example, the SMF may send to the AMF a Nsmf_PDUSession_UpdateSMContext Response message.

Figure 17:
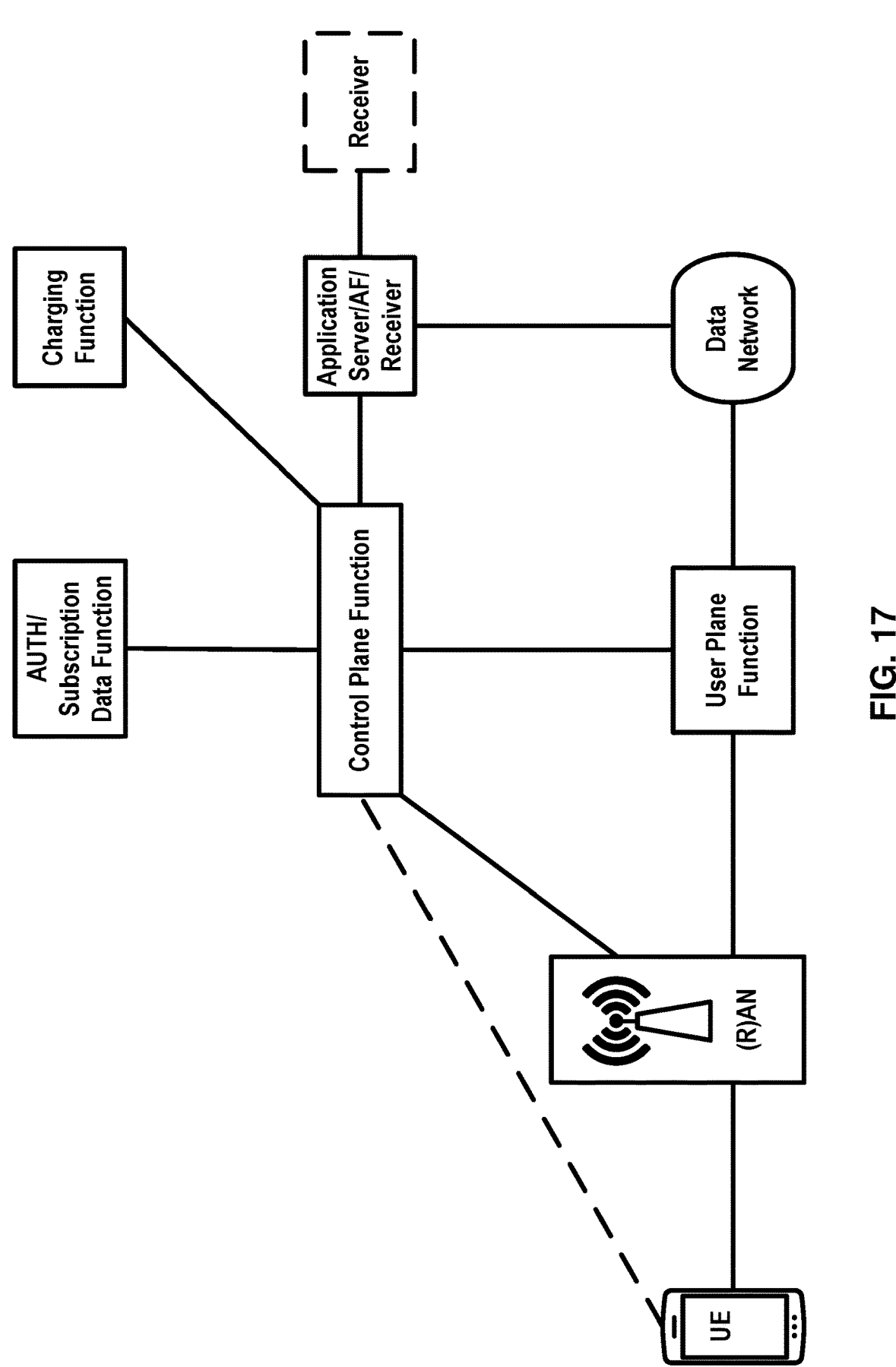
FIG. 17 is a diagram of an example communication system architecture as per an aspect of an embodiment of the present disclosure.

FIG. 17 is a diagram of an example communication system architecture. The architecture of FIG. 17 may be a future generation communication system, for example, a 6G communication system. The communication system may comprise at least one of: a wireless device (e.g. UE in the FIG. 17), an access network (e.g. (R)AN in the FIG. 17), a control plane function, a user plane function, a AUTH/Subscription Data Function, a charging function, an application server/application function (AF), and/or a data network. In an example, the control plane function may comprise an access and mobility management function. In an example, the control plane function may comprise a session management function. In an example, the control plane function may comprise a policy and charging control function. In an example, a receiver may be co-located with the application server/AF. In an example, the receiver may be deployed separately and may connect to the application server/AF. In an example, the receiver may be a control function of an application. In an example, the receiver may be a second UE to communicate with the UE. In an example, the application server/AF/receiver may be in the data network. In an example, the application server/AF/receiver may be outside the data network and connect to the data network.

In an example, holographic display technology may have made significant advances in recent years, from lightfield displays to different kinds of head mounted displays (HMDs). With the science and technology to construct and render holograms being well understood, holographic applications may be on their way to becoming a reality. Those applications may involve not only the local rendering of holograms but networking aspects, specifically the ability to transmit and stream holographic data from remote sites, referred to as "Holographic-Type Communications" (HTC). Far from being just a technological gimmick, HTC may have plenty of useful applications. For example, holographic telepresence may allow remote participants to be projected as holographic presences into a room. Conversely, immersive holographic spaces may render artifacts from a distant location into a room, rendering local users into the remote location. Remote troubleshooting and repair applications may allow technicians to interact with holographic renderings of items at remote and hard-to-reach locations, such as on an oil drilling platform or inside a space probe. Holographic signage which renders holographic content that is centrally managed and distributed may present a natural next step for digital signage. Training and education applications may provide remote students with the ability to engage with the objects and other pupils for active participation in the classroom. In addition, possibilities abound in the areas of immersive gaming and entertainment. For HTC to become a reality, there may be multiple challenges that future networks will need to address. They may need to provide a very high bandwidth due to the large data volumes involved in the transmission of high-quality holograms. The quality of a hologram may involve not just color depth, resolution, and frame rate as in video, but it may also involve the transmission of volumetric data from multiple viewpoints to account for shifts in tilt, angle, and position of the observer relative to the hologram ("six degrees of freedom"). The streaming of underlying volumetric data and image arrays may impose additional synchronization requirements to ensure smooth viewing transitions for the user.

Going beyond the streaming of holographic information itself, some applications may additionally combine holographic images with data from other streams. For example, holographic avatars may be able to combine a holographic image with an avatar. This may allow an entity to not just be projected or rendered from a remote site, but to feed information back to that entity from that remote viewpoint. For example, a video and audio stream may be derived from the point of view of where the hologram is projected. This may be accomplished by superimposing holograms over corresponding cameras, microphones, or other sensors. For this to work may require tight synchronization across multiple data streams, but the result will be applications that provide an even more realistic sense of user interactivity.

A second set of extensions may concern combining HTC with tactile networking applications, allowing users to "touch" a hologram. This may open new possibilities for applications such as the ones mentioned for training and remote repair. Tactile networking applications may impose requirements of ultra-low delay (to provide an accurate sense of touch feedback) on underlying networks and, in particular as far as mission-critical applications such as remote surgery are concerned, tolerate no loss. Coupling tactile networking with HTC may introduce additional high-precision synchronization requirements to ensure all the various data streams are properly coordinated. When discussing networking applications that involve not only optical (video, holograms) and acoustic (audio) senses, but touch as well (tactile), the question arises: why stop there; what about the other senses? Indeed, to create fully immersive experiences, it may make sense to also involve the senses of smell and taste. Unlike vision and hearing, smell and taste may be considered "lower" senses. They generally may do not command focus of attention or guide human activity but may be more related to feelings and emotions. These are "near senses" in that their perception may involve a direct (chemical) reaction of the agent that is being perceived with a receptor. In contrast, far senses (hearing and sight) may allow perception from sources that are remote, with artefacts transmitted by waves, not chemical or physical reactions. The fact that chemical reaction may be involved creates a significant hurdle to overcome, namely the problem of how to construct effective actuators. Some limited successes have been achieved using "digital lollipops", devices inserted into the mouth that deliver small currents and differences in temperature to the tongue's papillae (taste sensors) to simulate sensations such as sourness, saltiness, or sweetness. Smell may constitute an even more challenging problem. Some researchers have proposed "transcranial stimulation", e.g. a set of electrical magnets (e.g., incorporated into a headset) to deliver stimuli to areas in the brain responsible for creating sensory sensations.

Even more than the networking industry, the food industry may be very interested in breakthroughs in this area. For example, the ability to generate "digital sweetness" may promise the ability to cut down on the use of sugars or artificial sweeteners. While true breakthroughs in actuators that convey a digital sense of smell and taste seem at this point far away, assuming those hurdles can be overcome, there may clearly be interesting potential networked applications. For example, remote learning solutions as well as digital advertising may exploit the fact that memory retention can be improved by association with smells and tastes. Digital experiences may be enhanced, in particular as smells and tastes can evoke or amplify emotions. For example, certain images may be associated with a certain scent. Cloud-based medical solutions may generate bitter tastes from remote locations to prevent the intake of certain foods at certain times as part of a dietary regimen. In contrast to the actuator problem, requirements imposed by sensory applications on the network may be expected to be reasonably straightforward to support. To communicate data for taste and smell, it may be sufficient to communicate the data that is actually in contact with the taste or smell receptors—the taste and smell in and by itself, not the taste and smell as emitted by any one of many objects in an environment. For example, to communicate a particular taste in a scene, it may not be necessary to communicate what every "pixel" of every object potentially tastes like. This may be different from vision, where every object in a scene will reflect light that is perceived by the end user. Although there may be additional factors that influence the sensation of taste, such as texture, given that the number of receptors in a tongue (around 8000) is about 4 orders of magnitude fewer than the number of receptors in an eye's retina (around 150 million), the volume of "taste" data that needs to be transmitted may be dramatically lower than what is required for the communication of images. In addition, as detection of a taste in the human body may take as much as a second, no particular requirements may be imposed concerning support for ultra-low latency. Similar considerations apply for scent data, despite the fact that the delay involved in detecting scents by a person may be significantly lower.

Current networks may provide assurance of bandwidth and reliability. Bandwidth may be obvious, because any information carried over the network may be packetized and consumes transmission media capacity. The support for precision of time in data delivery may be a fundamental communication service provided by the networks. There may be the following types of basic time-engineered services. IN-TIME SERVICES may supply data for real-time applications a-priori that allow a bounded time of arrival of data packets, e.g. a packet may arrive ahead of a specific time. Typical multi-media applications may buffer in the order of one hundred millisecond's worth of data, but on industry floors controller-to-field-unit feedback control-loop responses may be under ten milliseconds. Both situations are similar in that a late arriving packet may be useless and the behavior may demand bounded arrival times. To appreciate the relevance of time-constrained delivery, compare with an email or web-based service: slow performance causes degraded experience, but the data may be still relevant. ON-TIME SERVICES may expect data-arrival at a specific time with tolerance for only a very small difference. On-time service guarantees may be served by accurate time with the smallest resolution of measurable time (in the order of one millisecond). For example, when several operations are quasi-synchronized, a set of jobs may operate in sequence determined by a precise time for each job. This may be particularly relevant to safety response applications such as moving autonomous objects (cars, drones), where in-time service delivery may cause unpredictable outcomes, but on-time services may assure that the system behavior is precisely controlled. An absolute time stamping may be required in the finance market sector in order to establish fairness across trading operations. COORDINATED SERVICES may demand timeliness of delivery of packets from multiple flows (from the same or from multiple sources). For example, holo-sense enabled applications may source different senses over separate flows. In general, smell and touch do not have the same level of sensitivity as video, but they may still be synchronized with respect to visual rendering in order to deliver near real experiences.

In existing technologies, a network entity (e.g., a target base station during a handover and/or after a handover) may receive multiple data flows (e.g., service data flows, traffic data flows, packet flows, and/or QoS flows) transmitted between one or more UEs and an application server/receiver. If the network entity is overloaded and/or congested, the network entity may discard packets of one of the multiple flows (e.g. multiple service data flows/multiple packet flows/multiple QoS flows) during a handover and/or after a handover. Additionally or alternatively, the network entity may delay scheduling of one of the multiple flows during a handover and/or after a handover. In the case of communications with multiple flows between the one or more UEs and the application server/receiver (e.g., holographic-type communications (HTC)), each of the multiple flows may need to be synchronized. If the multiple flows are not received synchronously, attempts to reconstruct an application (e.g. a video, a picture, an action, and/or the like) may fail.

Example embodiments of the present disclosure may provide enhanced mechanisms to support synchronization of multiple data flows by a network (e.g., a 6G communication network and/or a future generation network) during a handover and/or after a handover. As noted above, a network entity (e.g., a target base station) that is overloaded may discard data or delay transmission of data associated with a particular service data flow/packet flow/QoS flow. If the delayed or discarded flow is associated with an application that relies on synchronous reception of multiple flows (e.g., HTC), then the application may fail. Example embodiments of the present disclosure may provide enhanced mechanisms to support synchronization, by the network entity, of multiple flows transmitted between one or more UEs and an application server/receiver, during a handover and/or after a handover. Example embodiments of the present disclosure may provide enhanced mechanisms to enable the network entity to schedule the multiple data flows synchronously during a handover and/or after a handover. For example, example embodiments of the present disclosure may indicate a synchronization of the multiple data flows to the network entity. According to various embodiments, a target base station may receive, from a source base station, a handover request message comprising a flows synchronization request indication (FSRI). According to various embodiments, the target base station may receive packets of the multiple SDFs. According to various embodiments, based on the handover request message, the target base station may enforce synchronization of the multiple SDFs during handover and/or after handover. For example, when facing an overload scenario, the target base station may attempt to avoid discard and/or delay of any one flow associated with the synchronization request. For example, the network entity may determine to treat each of the multiple flows associated with a synchronization request similarly. If the target base station is overloaded, the target base station may deliver all the multiple flows synchronously while discarding/delaying other selected flows. Alternatively, the target base station may discard data associated with each of the multiple flows to reduce congestion, or delay each of the multiple flows to reduce congestion.

Figure 18:
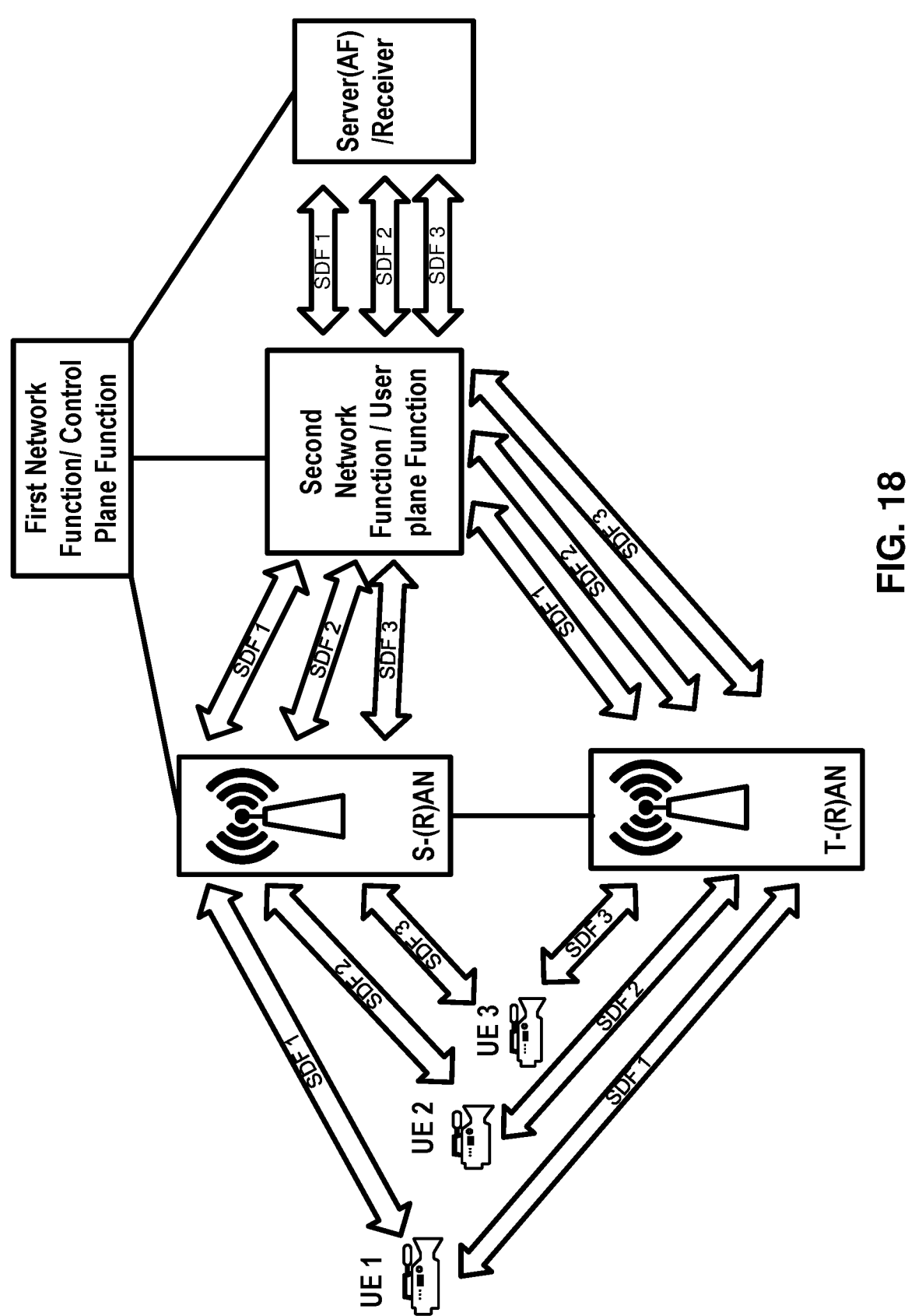
FIG. 18 illustrates an example mobile communication networks supporting handover for synchronization of multiple service data flows as per an aspect of an embodiment of the present disclosure.

FIG. 18 illustrates an example mobile communication networks supporting handover for synchronization of multiple service data flows. In an example, multiple UEs may send multiple data flows to an application server/receiver via a communication network (e.g. 6G communication network) in a uplink direction, and the multiple data flows may need to be synchronized by the communication network. In an example, a service data flow may be an aggregate set of packet flows carried through a user plane function and/or a source base station (e.g. S-(R)AN) that matches a service data flow template. In an example, a packet flow may be a specific user data flow from and/or to the UE. In an example, a service data flow template may be a set of service data flow filters. In an example, a service data flow filter may be a set of packet flow header parameter values/ranges used to identify one or more of the packet flows in a user plane function, a base station, a UE and/or an application server/receiver. In an example, a QoS flow may be a granularity of QoS differentiation in a session (e.g. a PDU session, a service data session, and/or the like) for QoS forwarding treatment in a communication system (e.g. 5G, 6G, and/or the like). A QoS flow ID (QFI) may be used to identify a QoS flow. For example, all traffic mapped to the same QoS flow (e.g. the same QFI) may receive the same forwarding treatment (e.g. scheduling policy, queue management policy, rate shaping policy, RLC configuration, etc.).

For example, the communication network may comprise base station(s) (e.g. a source base station and/or a target base station), first network function (s) (e.g. control plane function (s)) and/or second network function(s) (e.g. user plane function(s)). In an example, although not shown completely in the figure, all base stations may connect to the first network function (e.g. for control signaling) and/or the second network function (e.g. for user plane data). In an example, UE 1 may send SDF 1 to the application server/receiver via a source base station (e.g. S-(R)AN) and a second network function (e.g. user plane function); UE 2 may send SDF 2 to the application server/receiver via the S-(R)AN and the second network function; UE 3 may send SDF 3 to the application server/receiver via the S-(R)AN and the second network function. The UE 1 may comprise a camera 1, and the SDF 1 may comprise video data 1. The UE 2 may comprise a camera 2, and the SDF 2 may comprise video data 2. The UE 3 may comprise a camera 3, and the SDF 3 may comprise video data 3. The SDF 1, SDF 2, and SDF 3 may be concurrent stream/data flows need to be synchronized by the communication network. The SDF 1, SDF 2, and SDF 3 may be part of an application (e.g. a holographic view) respectively, and the application server/receiver may reconstruct the application by the SDF 1, SDF 2 and SDF 3. In an example, the application server may be a receiver. In an example, the application server may connect to a receiver. The receiver may be a control function/management function of an application. The receiver may be a wireless device. In an example, the application server/receiver may send multiple data flows to multiple UEs via the communication network in a downlink direction, and the multiple data flows need to be synchronized by the communication network.

In an example, the UE 1, UE 2 and UE 3 may handover together from the S-(R)AN to a target base station (e.g. T-(R)AN). For example, UE 1, UE 2 and UE 3 may be three drones flying together and may handover together from the S-(R)AN to the T-(R)AN. For example, UE 1, UE 2 and UE 3 may be sensors/equipment in a moving ambulance, and may handover together from the S-(R)AN to the T-(R)AN. In an example, the "handover together" may indicate that multiple UEs handover at the same time. In an example, the "handover together" may indicate that multiple UEs handover at a closed time, e.g. the time difference between the handover of two UEs may be in a limited period (e.g. millisecond(s), second(s), a minute and/or the like)). In an example, during the handover and/or after handover, the multiple UEs may send multiple SDFs to the application server/receiver via the T-(R)AN and/or the second network function in an uplink direction. In an example, during the handover and/or after handover, the application server/receiver may send multiple SDFs to the UEs via the second network function and/or the T-(R)AN in a downlink direction.

Figure 19:
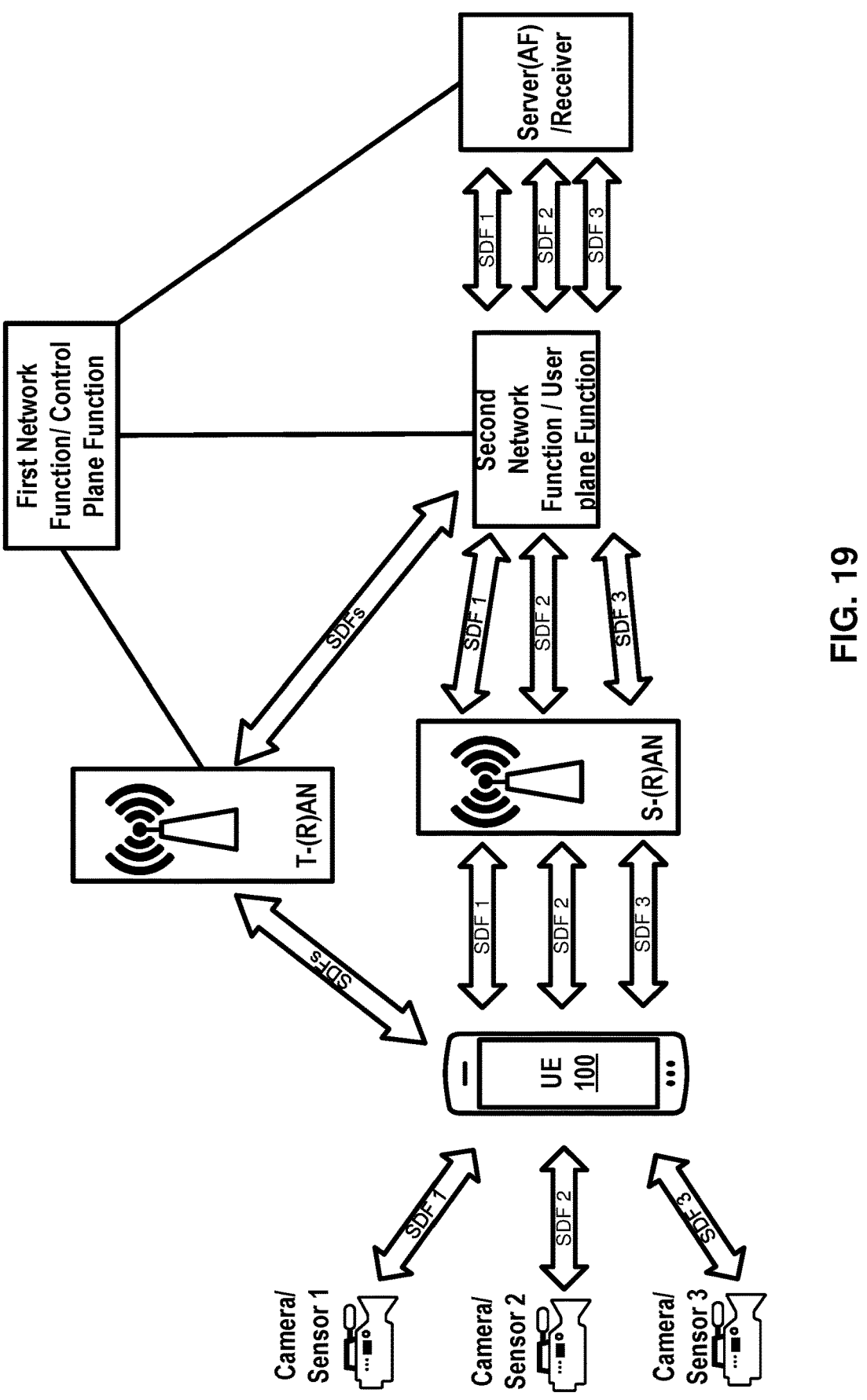
FIG. 19 illustrates an example mobile communication networks supporting handover for synchronization of multiple service data flows as per an aspect of an embodiment of the present disclosure.

FIG. 19 illustrates an example mobile communication networks supporting handover for synchronization of multiple service data flows. In an example, there may be data sources (e.g. cameras, sensors) connecting to a wireless device (UE), each data source may send different data flow(s) to the UE via a near field communication network (e.g. bluetooth, wifi, etc.), the UE may map different data flow(s) to different SDFs, and may send the different SDFs to an application server/receiver (e.g. a Holographic-Type Communication (HTC) server) via a communication network in a uplink direction, and the HTC server may perform the hologram image reconstruction. In an example, the application server/receiver may send multiple SDFs to the UE via the communication network in a downlink direction, and the multiple SDFs need to be synchronized by the communication network. The UE may send map multiple SDFs to different data flow and send to the different data sources. For example, the communication network may comprise base station(s) (e.g. a source base station and/or a target base station), first network function (s) (e.g. control plane function (s)) and/or second network function(s) (e.g. user plane function(s)). In an example, although not shown completely in the figure, all base stations may connect to the first network function (e.g. for control signaling) and/or the second network function (e.g. for user plane data).

In an example, the UE may handover from the source base station (e.g. S-(R)AN) to a target base station (e.g. T-(R) AN). For example, the UE may be a drone and may take multiple cameras/sensors, and the UE may handover from the S-(R)AN to the T-(R)AN. For example, the UE in a moving ambulance may connect to multiple sensors/equipment, and the UE may handover from the S-(R)AN to the T-(R)AN. In an example, during the handover and/or after handover, the UE may send multiple data flows to the application server/receiver via the T-(R)AN and/or the second network function in an uplink direction. In an example, during the handover and/or after handover, the application server/receiver may send multiple data flows to the UE via the second network function and/or the T-(R)AN in a downlink direction.

Figure 20:
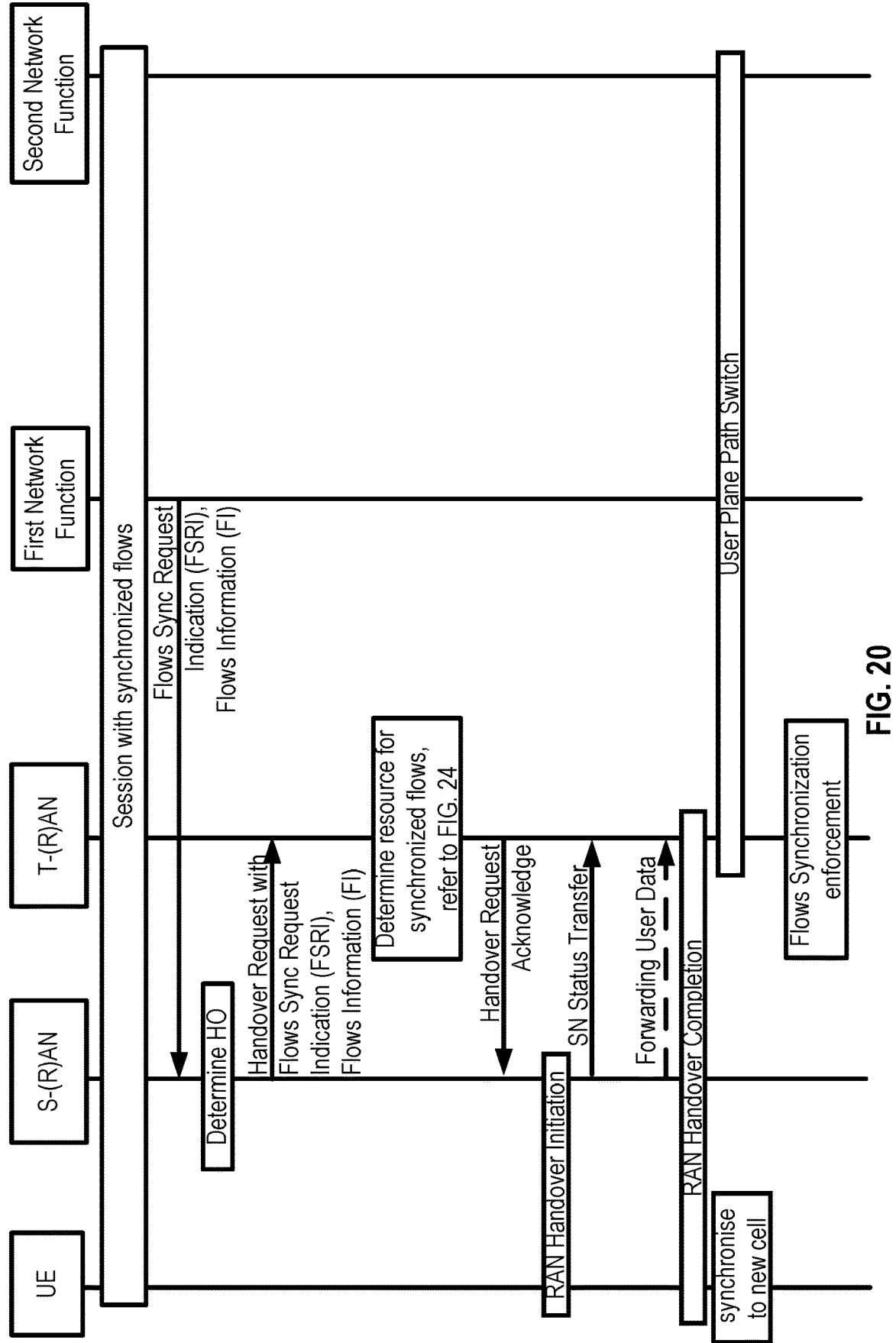
FIG. 20 is an example call flow as per an aspect of an embodiment of the present disclosure.

FIG. 20 is an example call flow which may comprise one or more actions. In an example, a UE may have established a session (e.g. service data session) with a communication network (e.g. a 6G communication network). The UE may send/receive multiple data packets to/from a server (AF)/receiver via the communication network. For example, the communication network may comprise a source base station (e.g. S-(R)AN) and/or a second network function. The S-(R)AN and/or the second network function may schedule the data packets synchronously (e.g. at the same time or within some acceptable time difference). In an example, the data packet may comprise at least one header and/or a payload. For example, the data packet may be an Ethernet data packet. For example, the data packet may be an IP data packet. For example, the data packet may be a TCP/IP data packet. For example, the data packet may be a UDP/IP data packet.

In an example, the first network function may send a message (e.g. service data session response) to the S-(R)AN. For example, the service data session (SDS) response message may comprise at least one information element: a flows synchronization indication, flow information of multiple data flows, time configuration information, SDS identifier; QoS profile(s), at least one QoS control rule; at least one packet detection rule; CN Tunnel Info, accepted network slices; UE IP address(es); HTC DNN, and/or Header Compression Configuration.

In an example, the flows synchronization indication may indicate requesting synchronization of the multiple data flows. In an example, the flow information of multiple data flows may comprise flow identifiers of the multiple SDFs/packet flows and/or flow filter information of the multiple SDFs/packet flows. For example, the flow information of multiple data flows may comprise one or more flow identifiers of one or more QoS flows and/or flow filter information of the one or more QoS flows. In an example, the flow filter information may comprise an IP packet filter set and/or an Ethernet packet filter set. For example, the IP packet filter set may comprise at least any combination of: source/destination IP address or IPv6 prefix, source/destination port number, protocol ID of the protocol above IP/Next header type, Type of Service (TOS) (IPv4)/Traffic class (IPv6) and Mask, Flow Label (IPv6), security parameter index, and/or packet filter direction. For example, the Ethernet packet filter set may comprise at least any combination of: source/destination MAC address, Ethertype as defined in IEEE 802.3, Customer-VLAN tag (C-TAG) and/or Service-VLAN tag (S-TAG) VIP fields as defined in IEEE 802.1Q, Customer-VLAN tag (C-TAG) and/or Service-VLAN tag (S-TAG) PCP/DEI fields as defined in IEEE 802.1Q, packet filter direction, and/or a IP packet filter set in the case that Ethertype indicates IPv4/IPv6 payload.

In an example, the time configuration information may indicate timestamp configuration information of the multiple data flows for synchronization. The time configuration information may comprise at least one of: a timestamp type, a timestamp size, a timestamp location and/or an accepted time difference between multiple data flows for synchronization. The timestamp type may indicate at least one of: an absolute time, a relative time and/or an NTP timestamp. The timestamp size may indicate how many octets/bits (e.g. 8 octets, 64 bits) the timestamp occupies in a data packet. The timestamp location may indicate the position of the timestamp in a data packet. For example, the timestamp may be in an IP header (e.g. IP option 4). For example, the timestamp may be in a Transmission Control Protocol (TCP) header. For example, the timestamp may be at the end of the payload of an Ethernet packet. For example, the timestamp may be at the end of the payload of an TCP/IP packet. For example, the timestamp may be at the end of the payload of an IP packet. For example, an accepted time difference may be 2 millisecond, timestamp of SDF 1 is 1000 and timestamp of SDF 2 is 1001, as the time difference between SDF 1 and SDF 2 is 1 millisecond which is less than the accepted time difference, then, the SDF 1 and SDF 2 may be scheduled synchronously. The SDS identifier may indicate identifier of the service data session. In an example, the QoS profile(s) and/or the at least one QoS control rule may be used to authorize QoS on a service data flow/packet flow/QoS flow. In an example, the QoS profile(s) and/or the at least one QoS control rule may comprise a QoS class identifier (e.g. QCI, 5QI), an priority (e.g. ARP), and/or at least one bandwidth value for uplink and/or downlink service data flow(s)/packet flow (s)/QoS flow(s). The at least one packet detection rule may be used for the S-(R)AN to detect incoming packets and may apply to the at least one QoS control rule if the incoming packets matched to the at least one packet detection rule. In an example, the at least one packet detection rule may comprise data/traffic packet detection information (e.g. one or more match fields against which incoming packets are matched) and may apply the QoS profile(s) and/or the at least one QoS control rule to the data/traffic packets matching the at least one packet detection rule.

In an example, the at least one packet detection rule may comprise the flow information. In an example, the at least one QoS control rule may comprise the flow information. The CN Tunnel Info may comprise Core Network address (es) (e.g. second network address, user plane function address) corresponding to the service data session. The first network may allocate UE IP address(es) and send the UE IP address(es) to the S-(R)AN and/or the UE. The Header Compression Configuration may comprise configuration information for header compression performed by the S-(R)

AN and/or the UE. The accepted network slices may comprise accepted/allowed network slices (e.g. an HTC network slice). In an example, the accepted network slices and/or the HTC network slice may be applied to the multiple data flows. In an example, the HTC network slice may indicate a network slice with an HTC service type. In an example, the HTC network slice may indicate the multiple data flows of the HTC network slice are requested to be synchronized. In an example, the HTC DNN may be applied to the multiple data flows. In an example, the HTC DNN may indicate the multiple data flows of the DNN are requested to be synchronized.

In response to the message received from the first network function, the S-(R)AN may take one or more actions. In an example action, based on the flows synchronization indication, the time configuration information, the SDS identifier, the QoS profile(s) and/or at least one QoS control rule (e.g. QoS parameters and/or the flow information); and/or the at least one packet detection rule (e.g. the flow information); the S-(R)AN may determine resources for the multiple data flows which are needed to be synchronized. For example, based on the flows synchronization indication and/or the at least one QoS control rule, the S-(R)AN may allocate resource for the multiple data flows which are needed to be synchronized. For example, the S-(R)AN may determine DRBs for the multiple data flows. For example, the S-(R)AN may determine a DRB for all the multiple data flows. For example, the S-(R)AN may determine multiple DRBs for the multiple data flows. In an example, the S-(R)AN may map the DRB(s) to the multiple data flows and indicate/mark that the multiple data flows associated with the DRB(s) are needed to be synchronized. For example, the S-(R)AN may reject the request of the first network function, e.g. by sending a cause value to the first network function indicating the S-(R)AN cannot allocate resource (e.g. DRBs) for any one of the multiple data flows. For example, the S-(R)AN may accept the request of the first network function, e.g. by sending a success cause value to the first network function indicating the request is success.

In an example, the S-(R)AN may receive data packets from the UE. In an example, the data packets sent by the UE may comprise a timestamp. For example, the timestamp may indicate a time when the UE sent the data packets. In an example, the timestamp may be an absolute time (e.g. the current time). In an example, the timestamp may be a relative time, for example, the timestamp may comprise second number since Jan. 1, 1900. For example, the timestamp may be a network time protocol (NTP) timestamp. In an example, the timestamp may be in an IP header (e.g. IP option 4). In an example, the timestamp may be in a Transmission Control Protocol (TCP) header. In an example, the timestamp may be at the end of the payload of an Ethernet packet. In an example, the timestamp may be at the end of the payload of an TCP/IP packet. In an example, the timestamp may be at the end of the payload of an IP packet.

In an example action, in response to the data packets received from the UE, and/or in response to the message received from the first network function, based on the flows synchronization indication, the time configuration information, the QoS profile(s) and/or the at least one QoS control rule; the at least one packet detection rule, and/or timestamp in the data packets, the S-(R)AN may enforce synchronization of the data packets by scheduling the data packets synchronously (e.g. at the same time or within some acceptable time difference). In an example action, based on the CN Tunnel Info, the S-(R)AN may send/forward the data packets to the second network function (e.g. user plane function) synchronously.

In an example, the S-(R)AN may receive data packets from the second network function. For example, the S-(R)AN may receive data packets from the server (AF)/receiver via the second network function. In an example, the data packets may comprise a timestamp. For example, the timestamp may indicate a time when the server (AF)/receiver sent the data packets. In an example, the timestamp may be an absolute time (e.g. the current time). In an example, the timestamp may be a relative time, for example, the timestamp may comprise number of seconds since Jan. 1, 1900. For example, the timestamp may be a network time protocol (NTP) timestamp. In an example, the timestamp may be in an IP header (e.g. IP option 4). In an example, the timestamp may be in a Transmission Control Protocol (TCP) header. In an example, the timestamp may be at the end of the payload of an Ethernet packet. In an example, the timestamp may be at the end of the payload of an TCP/IP packet. In an example, the timestamp may be at the end of the payload of an IP packet. In an example action, in response to the data packets received from the second network function, and/or in response to the message received from the first network function, based on the flows synchronization indication, the time configuration information, the QoS profile(s) and/or the at least one QoS control rule; the at least one packet detection rule, and/or timestamp in the data packets, the S-(R)AN may enforce synchronization of the data packets by scheduling the data packets synchronously (e.g. at the same time or within some acceptable time difference). In an example action, the S-(R)AN may send/forward the data packets to the UE(s) synchronously.

In an example action, the S-(R)AN may send a message (e.g. service data session response) to the UE, the service data session response may comprise one or more information elements received from the first network function. For example, the service data session response message sent to the UE may indicate accepting synchronization for the multiple data flows. For example, the service data session (SDS) response message sent to the UE may comprise at least one of: flows synchronization (accept) indication, time configuration information, SDS identifier; the at least one QoS control rule; the at least one packet detection rule; CN Tunnel Info, accepted network slices; UE IP address(es); HTC DNN, and/or Header Compression Configuration.

In an example, the S-(R)AN may determine to handover the UE based on MeasurementReport received from the UE and RRM information. The S-(R)AN may send to a target base station (e.g. T-(R)AN) a message (e.g. handover request) to request a handover. In an example, the handover request message may indicate requesting synchronization of the multiple data flows associated with DRB(s) during handover and/or after handover. In an example, the handover request message may comprise at least one information element: the flows synchronization indication, the flow information of the multiple data flows, the time configuration information, the SDS identifier; the QoS profile(s) and/or the at least one QoS control rule, the at least one packet detection rule, the CN Tunnel Info, the accepted network slices (e.g. the HTC network slice), the UE IP address(es), the HTC DNN, the Header Compression Configuration, a target cell ID, RRM-configuration including UE inactive time, current QoS flows to DRBs mapping rules applied to the UE (e.g. the multiple data flows to DRBs mapping information), SIB information (e.g. SIB1 from the S-(R)AN), and/or UE capabilities for different RATs. In an example, the flows synchronization indication may indicate requesting synchronization of the multiple data flows associated with DRB(s). FIG. 21 is an example diagram depicting a handover request message body.

In response to the message received from the S-(R)AN, the T-(R)AN may take one or more actions. In an example action, based on the handover request message, the T-(R)AN may determine resources for the multiple data flows associated with DRB(s) which are needed to be synchronized. For example, based on the flows synchronization indication, the flow information of the multiple data flows, the time configuration information, the SDS identifier; the QoS profile(s) and/or the at least one QoS control rule, the at least one packet detection rule, the accepted network slices, the HTC DNN, the target cell ID, the RRM-configuration, the current QoS flows to DRBs mapping rules applied to the UE, the SIB information and/or the UE capabilities for different RATs, the T-(R)AN may determine resources (e.g. DRB(s) of the T-(R)AN) for the multiple data flows associated with DRB(s) of the S-(R)AN, wherein the multiple data flows are needed to be synchronized. For example, the T-(R)AN may determine resources (e.g. DRB(s) of the T-(R)AN) are available for all the multiple data flows. For example, based on one or more information elements of the handover request message, the T-(R)AN may determine resources (e.g. DRB(s) of the T-(R)AN) for the multiple data flows associated with the HTC network slice. For example, based on one or more information elements of the handover request message, the T-(R)AN may determine resources (e.g. DRB(s) of the T-(R)AN) for the multiple data flows associated with the HTC DNN. In an example, the T-(R)AN may determine the resources (e.g. DRB(s) of the T-(R)AN) for the multiple data flows are available. For example, the T-(R)AN may determine the resources (e.g. DRB(s) of the T-(R)AN) for the multiple data flows are not available, e.g. resource is not available for one of the multiple data flows.

In an example action, based on the handover request message, the T-(R)AN may determine whether support the synchronization of the multiple data flows. For example, based on one or more information elements of the handover request message (e.g. the flows synchronization indication and/or the flow information), the T-(R)AN may determine whether the T-(R)AN is able to enforce the synchronization of the multiple SDFs. For example, the T-(R)AN may determine that the T-(R)AN is able to enforce the synchronization of the multiple SDFs. For example, the T-(R)AN may determine that the T-(R)AN is not able to enforce the synchronization of the multiple data flows.

In an example action, based on the determining (s), the T-(R)AN may send a response message (e.g. handover request acknowledgement) to the S-(R)AN. In an example, the handover request acknowledgement message may indicate the handover request is accepted/success. For example, the handover request acknowledgement message may comprise a cause value indicating the handover request is accepted/success. In an example, the handover request acknowledgement message may indicate the handover request is rejected/failure. For example, the handover request acknowledgement message may comprise a cause value indicating the resources (e.g. DRB(s) of the T-(R)AN) for the multiple data flows are available, wherein the multiple data flows are needed to be synchronized. For example, the handover request acknowledgement message may comprise a cause value indicating the resources (e.g. DRB(s) of the T-(R)AN) for the multiple data flows are not available, wherein the multiple data flows are needed to be synchronized. For example, the handover request acknowledgement message may comprise a cause value indicating the T-(R) AN is able to enforce the synchronization of the multiple data flows. For example, the handover request acknowledgement message may comprise a cause value indicating the T-(R)AN is not able to enforce the synchronization of the multiple data flows.

In response to the message received from the T-(R)AN, the S-(R)AN may take one or more actions. In an example action, the S-(R)AN may trigger the air interface handover by sending a message (e.g. RRCReconfiguration) to the UE. The RRCReconfiguration message may comprise the information required to access the target cell. For example, the RRCReconfiguration message may comprise at least one of: a target cell ID, the new C-RNTI, T-(RAN) security algorithm identifiers for the selected security algorithms, a set of dedicated RACH resources, association between RACH resources and SSB(s), association between RACH resources and UE-specific CSI-RS configuration(s), common RACH resources, and/or system information of the target cell, etc. In an example action, the S-(R)AN may send SN STATUS TRANSFER message to the T-(R)AN. In an example, the UE may synchronize to the target cell and may complete the RRC handover procedure by sending RRCReconfiguration-Complete message to T-(R)AN. In an example, the T-(R)AN may send a PATH SWITCH REQUEST message to the first network function to switch the downlink data path towards the T-(R)AN. The first network function may confirm the PATH SWITCH REQUEST message by sending a PATH SWITCH REQUEST ACKNOWLEDGE message to the T-(R)AN. In response to receive the PATH SWITCH REQUEST ACKNOWLEDGE message from the first network function, the T-(AN) may send a UE CONTEXT RELEASE to inform the S-(R)AN about the success of the handover. The S-(R)AN may release radio and C-plane related resources associated to the UE context.

In an example action, the T-(R)AN may enforce the synchronization of the multiple data flows. In an example, the T-(R)AN may receive data packets from the UE during the handover and/or after the handover. In an example, the data packets sent by the UE may comprise a timestamp as described above. In an example action, in response to the data packets received from the UE, and/or in response to the handover request message received from the S-(R)AN, based on the flows synchronization indication, the time configuration information, the QoS profile(s) and/or the at least one QoS control rule; the at least one packet detection rule, and/or timestamp in the data packets, the T-(R)AN may enforce synchronization of the data packets by scheduling the data packets synchronously (e.g. at the same time or within some acceptable time difference). For example, the T-(R)AN may receive SDF 1, SDF 2 and/or SDF 3 from the UE, the SDF 1 may comprise a timestamp 1, the SDF 2 may comprise a timestamp 1+Δt, SDF 3 may comprise a timestamp 1−Δt, for example, Δt is 1 milliseconds, the (R)AN may detect that SDF 1, SDF 2 and/or SDF 3 may match to the at least one packet detection rule. Based on the flows synchronization (accept) indication and/or time configuration information (e.g. accepted time difference between SDFs is 2 millisecond), the (R)AN may schedule SDF 1, SDF 2 and/or SDF 3 synchronously (e.g., at the same time or within some acceptable time difference). Based on the CN Tunnel Info, the T-(R)AN may send/forward the SDF, SDF 2 and/or SDF 3 to the second network function (e.g. user plane function) synchronously.

In an example, the T-(R)AN may receive data packets from the second network function during the handover and/or after the handover. For example, the T-(R)AN may receive data packets from the server (AF)/receiver via the second network function. In an example, the data packets may comprise a timestamp. For example, the timestamp may indicate a time when the server (AF)/receiver sent the data packets. In an example, the timestamp may be an absolute time (e.g. the current time). In an example, the timestamp may be a relative time, for example, the timestamp may comprise number of seconds since Jan. 1, 1900. For example, the timestamp may be a network time protocol (NTP) timestamp. In an example, the timestamp may be in an IP header (e.g. IP option 4). In an example, the timestamp may be in a Transmission Control Protocol (TCP) header. In an example, the timestamp may be at the end of the payload of an Ethernet packet. In an example, the timestamp may be at the end of the payload of an TCP/IP packet. In an example, the timestamp may be at the end of the payload of an IP packet.

In an example action, in response to the data packets received from the second network function, and/or in response to the handover request message received from the S-(R)AN, based on the flows synchronization indication, the time configuration information, the QoS profile(s) and/or the at least one QoS control rule; the at least one packet detection rule, and/or the timestamp in the data packets, the T-(R)AN may enforce synchronization of the data packets by scheduling the data packets synchronously (e.g. at the same time or within some acceptable time difference). In an example action, the T-(R)AN may send/forward the data packets to the UE(s) synchronously.

The above example embodiments may apply to multiple UEs scenario (e.g. FIG. 18). In an example, the S-(R)AN may handover one or more UEs to the T-(R)AN. For example, the S-(R)AN may send a handover request message to the T-(R)AN, the handover request message may comprise at least one information element for one or more UEs: at least one information element: the flows synchronization indication, the flow information of the multiple data flows, the time configuration information, the SDS identifier; the QoS profile(s) and/or the at least one QoS control rule, the at least one packet detection rule, the CN Tunnel Info, the accepted network slices (e.g. the HTC network slice), the UE IP address(es), the HTC DNN, the Header Compression Configuration, a target cell ID, RRM-configuration including UE inactive time, current QoS flows to DRBs mapping rules applied to the UE (e.g. the multiple data flows to DRBs mapping information), SIB information (e.g. SIB1 from the S-(R)AN), and/or UE capabilities for different RATs. For example, the flows synchronization indication may indicate requesting synchronization of the multiple data flows for one or more UEs. For example, the flow information may indicate/comprise flow information of the multiple data flows for one or more UEs.

In an example action, based on the handover request message, the T-(R)AN may determine resources (e.g. DRB(s) of the T-(R)AN) for the multiple data flows associated with DRB(s) of the S-(R)AN for one or more UEs, wherein the multiple data flows are needed to be synchronized. In an example action, based on the handover request message, the T-(R)AN may determine whether support the synchronization of the multiple data flows for one or more UEs. In an example action, during the handover and/or after the handover, the T-(R)AN may enforce the synchronization of the multiple data flows for one or more UEs, e.g. by scheduling uplink/downlink data packets synchronously (e.g. at the same time or within some acceptable time difference). FIG. 22 is an example diagram depicting the procedures of a S-(R)AN as per an aspect of an embodiment of the present disclosure. FIG. 23 is an example diagram depicting the procedures of a T-(R)AN as per an aspect of an embodiment of the present disclosure.

Figure 24:
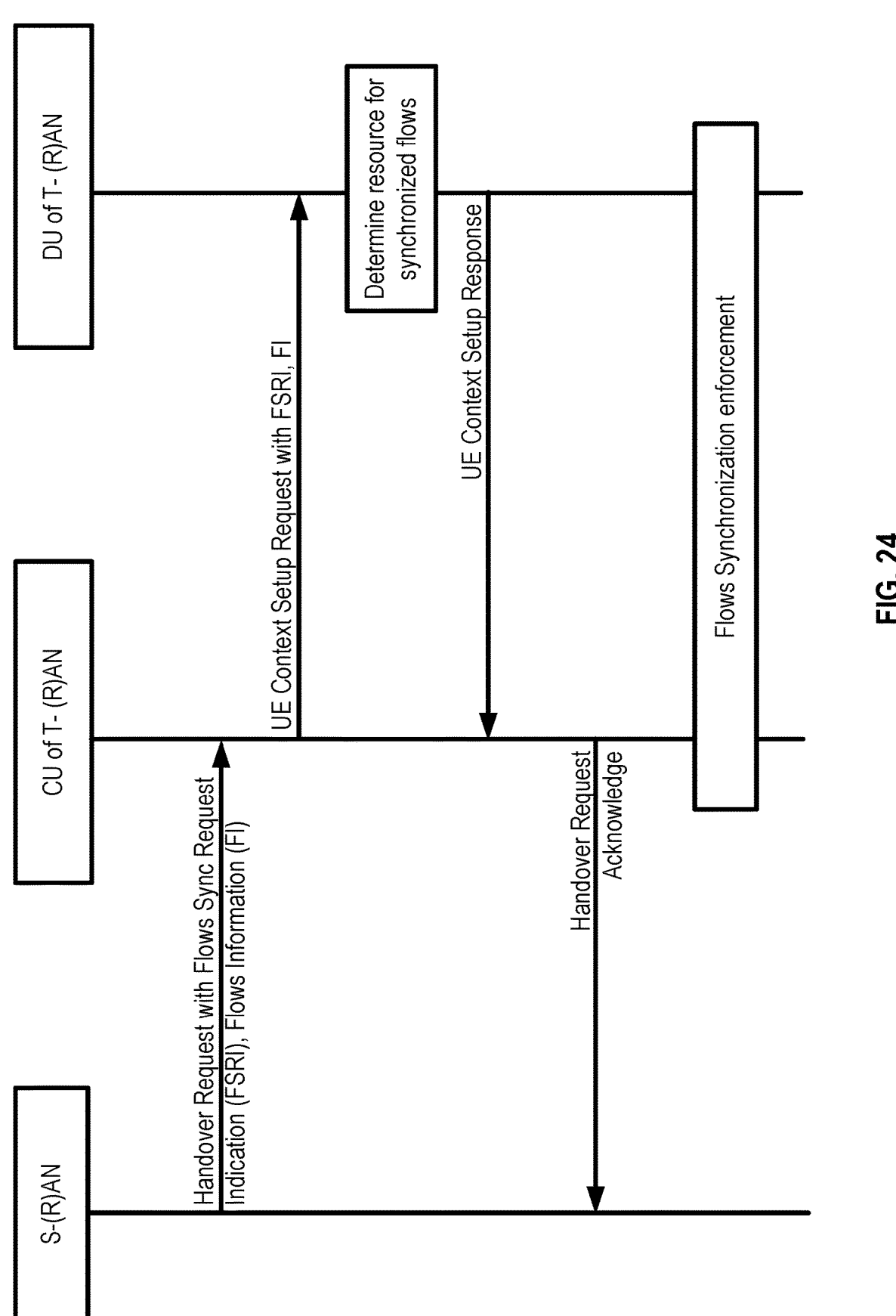
FIG. 24 is an example call flow as per an aspect of an embodiment of the present disclosure.

FIG. 24 is an example call flows which may comprise one or more actions. In an example, referring to the actions in FIG. 20, the T-(R)AN (e.g. CU of the T-(R)AN) may receive from the S-(R)AN a message (e.g. handover request). The handover request message may comprise at least one information element: the flows synchronization indication, the flow information of the multiple data flows, the time configuration information, the SDS identifier; the QoS profile(s) and/or the at least one QoS control rule, the at least one packet detection rule, the CN Tunnel Info, the accepted network slices (e.g. the HTC network slice), the UE IP address(es), the HTC DNN, the Header Compression Configuration, a target cell ID, RRM-configuration including UE inactive time, current QoS flows to DRBs mapping rules applied to the UE (e.g. the multiple data flows to DRBs mapping information), SIB information (e.g. SIB1 from the S-(R)AN), and/or UE capabilities for different RATs. In response to the message received from the S-(R)AN, the CU of the T-(R)AN may take one or more actions. In an example action, the CU of the T-(R)AN may send to a DU of the T-(R)AN a message (e.g. UE context setup request). The UE context setup request message may comprise one or more of the information elements of the handover request message (e.g. the flows synchronization indication, the flow information, the time configuration information, the HTC network slice, the HTC DNN, etc.). In response to the message received from the CU of the T-(R)AN, based on the information of the UE context setup request message (e.g. flows synchronization indication, the flow information, the time configuration information, the HTC network slice, the HTC DNN), the DU of the T-(R)AN may determine resources for the multiple data flows associated with DRB(s) which are needed to be synchronized. For example, based on the flows synchronization indication, the flow information of the multiple data flows, the time configuration information, the SDS identifier; the QoS profile(s) and/or the at least one QoS control rule, the at least one packet detection rule, the accepted network slices, the HTC DNN, the target cell ID, the RRM-configuration, the current QoS flows to DRBs mapping rules applied to the UE, the SIB information and/or the UE capabilities for different RATs, the DU of the T-(R)AN may determine resources (e.g. DRB(s) of the T-(R)AN) for the multiple data flows associated with DRB(s) of the S-(R)AN, wherein the multiple data flows are needed to be synchronized. For example, the DU of the T-(R)AN may determine resources (e.g. DRB(s) of the T-(R)AN) are available for all the multiple data flows. For example, based on one or more information elements of the UE context setup request message, the DU of the T-(R)AN may determine resources (e.g. DRB(s) of the T-(R)AN) for the multiple data flows associated with the HTC network slice. For example, based on one or more information elements of the UE context setup request message, the DU of the T-(R)AN may determine resources (e.g. DRB(s) of the T-(R)AN) for the multiple data flows associated with the HTC DNN. In an example, the DU of the T-(R)AN may determine the resources (e.g. DRB(s) of the T-(R)AN) for the multiple data flows are available. For example, the DU of the T-(R)AN may determine the resources (e.g. DRB(s) of the T-(R)AN) for the multiple data flows are not available, e.g. resource is not available for one of the multiple data flows.

In an example action, based on UE context setup request message, the DU of the T-(R)AN may determine whether support the synchronization of the multiple data flows. For example, based on one or more information elements of the UE context setup request message (e.g. the flows synchronization indication and/or the flow information), the DU of the T-(R)AN may determine whether the DU of the T-(R)AN is able to enforce the synchronization of the multiple SDFs. For example, the DU of the T-(R)AN may determine that the DU of the T-(R)AN is able to enforce the synchronization of the multiple SDFs. For example, the DU of the T-(R)AN may determine that the DU of the T-(R)AN is not able to enforce the synchronization of the multiple data flows.

In an example action, based on the determining (s), the DU of the T-(R)AN may send a response message (e.g. UE context setup response) to the CU of the T-(R)AN. In an example, the UE context setup response message may indicate the UE context setup request is accepted/success. For example, the UE context setup response message may comprise a cause value indicating the UE context setup request is accepted/success. In an example, the UE context setup response message may indicate the handover request is rejected/failure. For example, the UE context setup response message may comprise a cause value indicating the resources (e.g. DRB(s) of the T-(R)AN) for the multiple data flows are available, wherein the multiple data flows are needed to be synchronized. For example, the UE context setup response message may comprise a cause value indicating the resources (e.g. DRB(s) of the T-(R)AN) for the multiple data flows are not available, wherein the multiple data flows are needed to be synchronized. For example, the UE context setup response message may comprise a cause value indicating the DU of the T-(R)AN is able to enforce the synchronization of the multiple data flows. For example, the UE context setup response message may comprise a cause value indicating the DU of the T-(R)AN is not able to enforce the synchronization of the multiple data flows.

In response to the message received from the DU of the T-(R)AN, the CU of the T-(R)AN may send to the S-(R)AN a message (e.g. handover request acknowledgement). In an example, the handover request acknowledgement message may indicate the handover request is accepted/success. For example, the handover request acknowledgement message may comprise a cause value indicating the handover request is accepted/success. In an example, the handover request acknowledgement message may indicate the handover request is rejected/failure. For example, the handover request acknowledgement message may comprise a cause value indicating the resources (e.g. DRB(s) of the T-(R)AN) for the multiple data flows are available, wherein the multiple data flows are needed to be synchronized. For example, the handover request acknowledgement message may comprise a cause value indicating the resources (e.g. DRB(s) of the T-(R)AN) for the multiple data flows are not available, wherein the multiple data flows are needed to be synchronized. For example, the handover request acknowledgement message may comprise a cause value indicating the T-(R) AN is able to enforce the synchronization of the multiple data flows. For example, the handover request acknowledgement message may comprise a cause value indicating the T-(R)AN is not able to enforce the synchronization of the multiple data flows.

In an example action, during the handover and/or after the handover, the CU of the T-(R)AN and/or the DU of the T-(R)AN may enforce the synchronization of the multiple data flows, e.g. by scheduling the multiple data flows at the same time or within some acceptable time difference. The procedure of enforcing the synchronization of the multiple data flows may be similar to the procedure of enforcing the synchronization as described above with respect to FIG. 20. For brevity, further description will not be repeated here.

Figure 25:
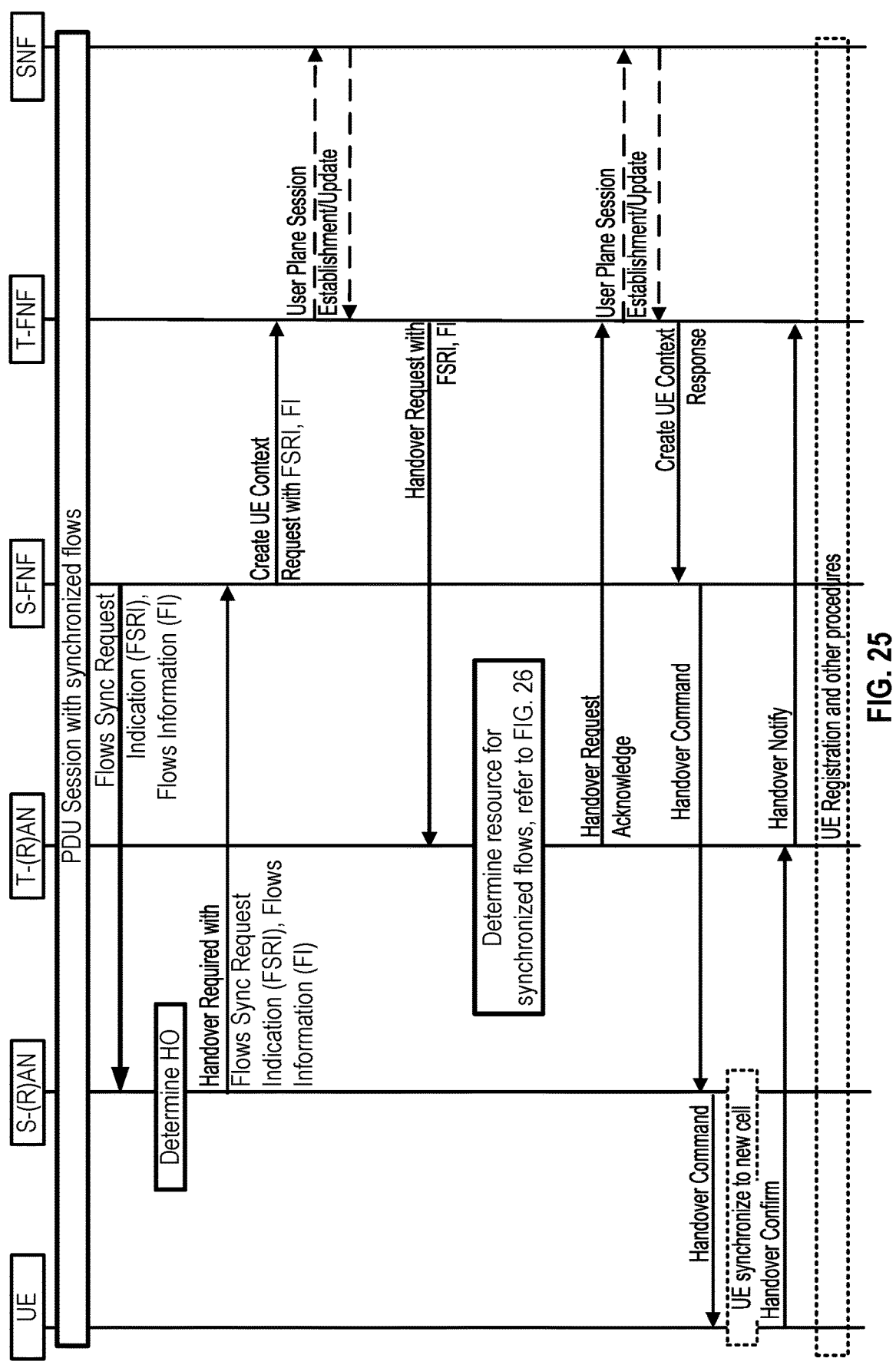
FIG. 25 is an example call flow as per an aspect of an embodiment of the present disclosure.

FIG. 25 is an example call flows which may comprise one or more actions. In an example, a UE may have established a session (e.g. service data session) with a communication network (e.g. a 6G communication network). In an example, the first network function may send a message (e.g. service data session response) to the S-(R)AN. For example, the service data session (SDS) response message may comprise at least one information element: a flows synchronization indication, flow information of multiple data flows, time configuration information, SDS identifier; QoS profile(s), at least one QoS control rule; at least one packet detection rule; CN Tunnel Info, accepted network slices; UE IP address(es); HTC DNN, and/or Header Compression Configuration. The definition/meaning/content of at least one information element in the service data session response may be similar to the definition/meaning/content of at least one information element in the service data session response as described above with respect to FIG. 20. For brevity, further description will not be repeated here.

In an example, the S-(R)AN may determine to handover the UE based on MeasurementReport received from the UE and RRM information. The S-(R)AN may send a message (e.g. handover required) to a target base station (e.g. T-(R)AN) to request a handover. In an example, there may not be a direct interface between the S-(R)AN and the T-(R)AN. The S-(R)AN may send the handover required message to the T-(R)AN via a source first network function (e.g. S-FNF) and/or a target first network function (T-FNF). For example, the S-(R)AN may send the handover required message to the S-FNF. The handover required message may comprise at least one information element: the flows synchronization indication, the flow information of the multiple data flows, the time configuration information, the SDS identifier; the QoS profile(s) and/or the at least one QoS control rule, the at least one packet detection rule, the CN Tunnel Info, the accepted network slices (e.g. the HTC network slice), the UE IP address(es), the HTC DNN, the Header Compression Configuration, a target cell ID, RRM-configuration including UE inactive time, current QoS flows to DRBs mapping rules applied to the UE (e.g. the multiple data flows to DRBs mapping information), SIB information (e.g. SIB1 from the S-(R)AN), and/or UE capabilities for different RATs. In response to the handover required message received from the S-(R)AN, the S-FNF may send to the T-FNF a create UE context request message comprising one or more information elements of the handover required message. In response to the message received from the S-FNF, the T-FNF may send a message (user plane session establishment/modification request) to a second network function. The user plane session establishment/modification request message may comprise at least one user plane rule for user plane session. In an example, the at least one user plane rule may comprise at least one of: the flows synchronization indication, the time configuration information, the flow information of the multiple data flows, at least one packet detection rule; at least one forwarding action rule; at least one QoS enforcement rule; and/or at least one usage reporting rule.

In an example, in response to the message received from the T-FNF, the second network function may send to the T-FNF a user plane session establishment/modification response message. The user plane session establishment/modification response message may comprise user plane address of the second network function. In response to the message received from the second network function, the T-FNF may send to T-(R)AN a handover request message.

The handover request message may comprise one or more information elements of the create UE context request message. In an example, the handover request message may comprise the user plane address of the second network function. In response to the message received from the S-(R)AN (e.g. via the S-FNF and/or the T-FNF), the T-(R) AN may take one or more actions. In an example action, based on one or more information elements of the handover request message, the T-(R)AN may determine resources (e.g. DRB(s) of the T-(R)AN) for the multiple data flows. In an example action, based on the handover request message, the T-(R)AN may determine whether support the synchronization of the multiple data flows. The one or more actions taken by the T-(R)AN may be similar to the actions taken by the T-(R)AN when the T-(R)AN receiving a handover request message as described above with respect to FIG. 20. For brevity, further description will not be repeated here.

In an example action, based on the determining (s), the T-(R)AN may send a response message (e.g. handover request acknowledgement) to the S-(R)AN via the T-FNF and/or the S-FNF. For example, the T-(R)AN may send the handover request acknowledgement message to the T-FNF. The handover request acknowledgement message may comprise at least one information element: user plane address of the T-(R)AN, a cause value indicating the handover request is rejected/failure, a cause value indicating the handover request is accepted/success, a cause value indicating the resources (e.g. DRB(s) of the T-(R)AN) for the multiple data flows are available, a cause value indicating the resources (e.g. DRB(s) of the T-(R)AN) for the multiple data flows are not available, a cause value indicating the T-(R)AN is able to enforce the synchronization of the multiple data flows, a cause value indicating the T-(R)AN is not able to enforce the synchronization of the multiple data flows. In response to the message received from the T-(R)AN, the T-FNF may send a user plane session establishment/modification request message to the second network function. The user plane session establishment/modification request message may comprise the user plane address of the T-(R)AN. In an example, in response to the message received from the T-(R)AN, the T-FNF may send a create UE context response message to the S-FNF. The create UE context response message may comprise one or more information of the handover request acknowledgement message. In response to the message received from the T-FNF, the S-FNF may send a handover command message to the S-(R)AN. The handover command message may comprise one or more information element of the create UE context response message. In response to the message received from the S-FNF, the S-(R)AN may send a handover command message to the UE. The handover command message may comprise radio parameters that the T-(R)AN has setup. In an example, after the UE has successfully synchronized to the target cell, it may send a handover confirm message to the T-RAN. The handover confirm message may indicate that the handover is considered as successful by the UE. In response to the message received from the UE, the T-(R)AN may send a handover notify message to the T-FNF. The handover notify message may indicate that the handover is considered as successful by the T-(R)AN.

In an example action, during the handover and/or after the handover, the T-(R)AN may enforce the synchronization of the multiple data flows, e.g. by scheduling the multiple data flows at the same time or within some acceptable time difference. The procedure of enforcing the synchronization of the multiple data flows may be similar to the procedure of enforcing the synchronization as described above with respect to FIG. 20. For brevity, further description will not be repeated here.

Figure 26:
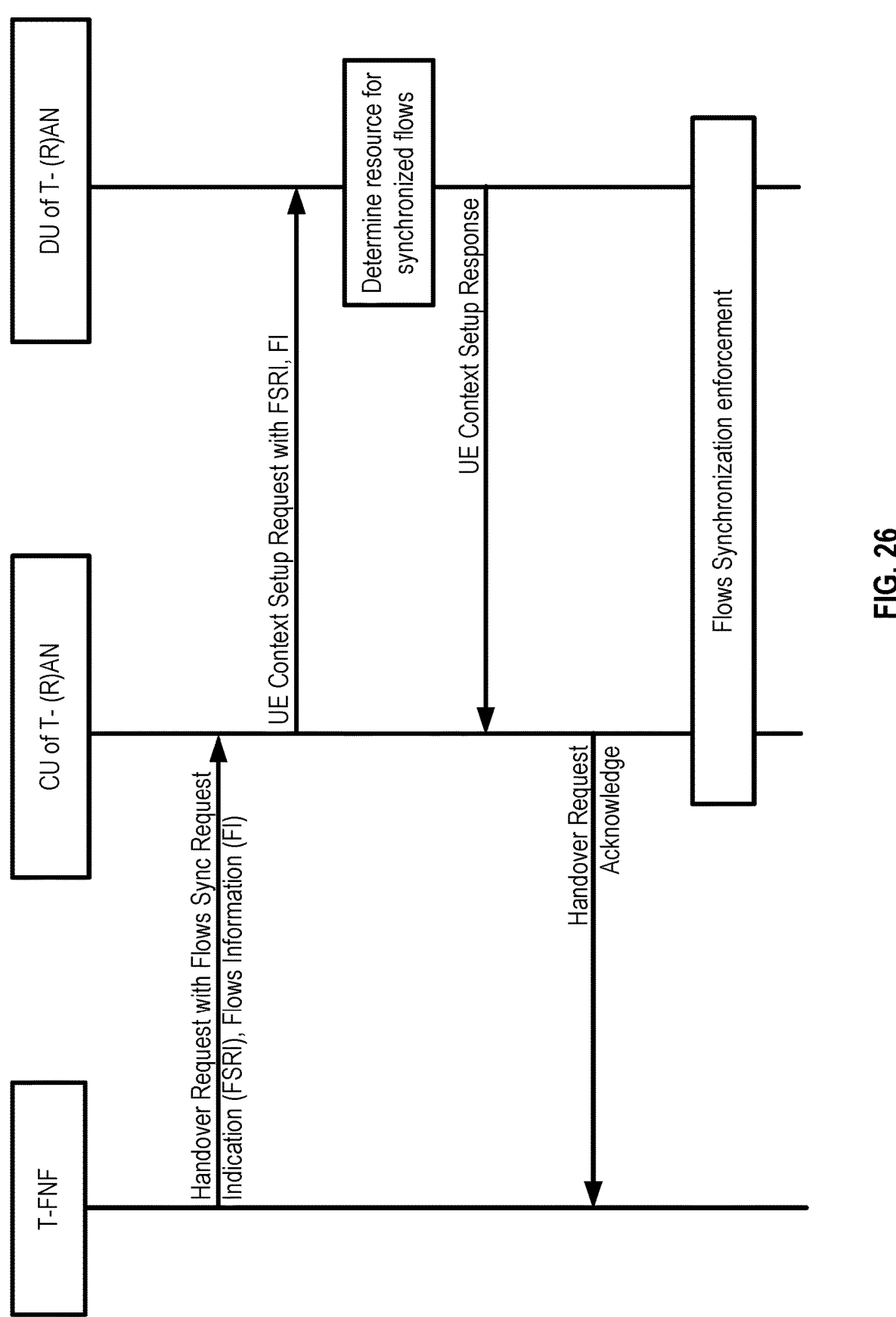
FIG. 26 is an example call flow as per an aspect of an embodiment of the present disclosure.

FIG. 26 is an example call flows which may comprise one or more actions. In an example, referring to the actions in FIG. 25, the T-(R)AN (e.g. CU of the T-(R)AN) may receive from the S-(R)AN a message (e.g. handover request) via the S-FNF and/or the T-FNF. The handover request message may comprise at least one information element: the flows synchronization indication, the flow information of the multiple data flows, the time configuration information, the SDS identifier; the QoS profile(s) and/or the at least one QoS control rule, the at least one packet detection rule, the CN Tunnel Info, the accepted network slices (e.g. the HTC network slice), the UE IP address(es), the HTC DNN, the Header Compression Configuration, a target cell ID, RRM-configuration including UE inactive time, current QoS flows to DRBs mapping rules applied to the UE (e.g. the multiple data flows to DRBs mapping information), SIB information (e.g. SIB1 from the S-(R)AN), and/or UE capabilities for different RATs.

The procedure/actions of the CU of the T-(R)AN may be similar to the procedure/actions of the CU of the T-(R)AN as described above with respect to FIG. 24. For brevity, further description will not be repeated here. The procedure/actions of the DU of the T-(R)AN may be similar to the procedure/actions of the DU of the T-(R)AN as described above with respect to FIG. 24. For brevity, further description will not be repeated here.

Figure 27:
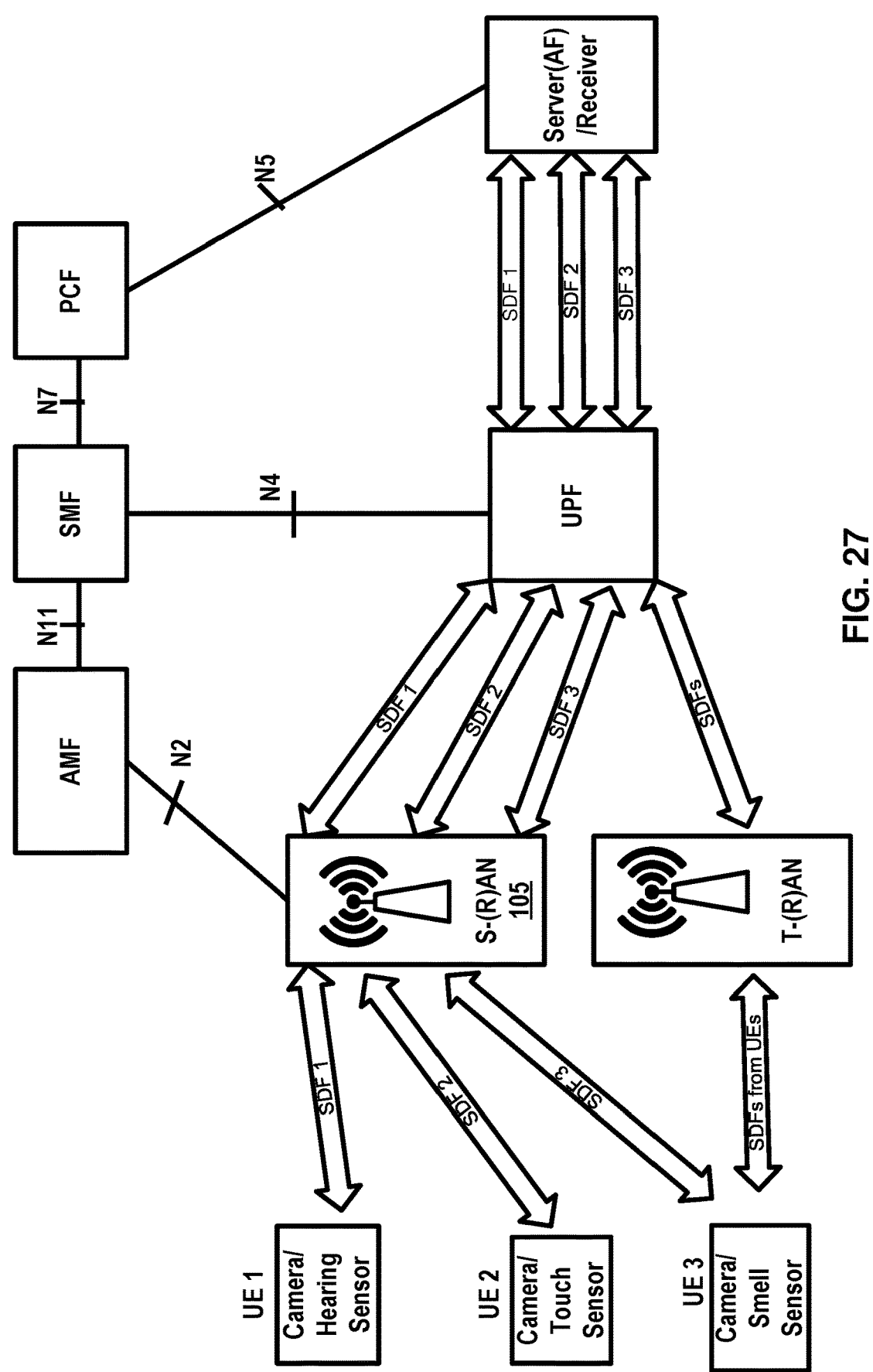
FIG. 27 illustrates an example mobile communication networks supporting handover for synchronization of multiple service data flows as per an aspect of an embodiment of the present disclosure.

FIG. 27 illustrates an example 5G communication networks supporting handover for synchronization of multiple service data flows. In an example, multiple UEs may send multiple data flows to an application server/receiver via a 5G communication network in a uplink direction, and the multiple data flows may need to be synchronized by the 5G communication network. For example, the 5G communication network may comprise base stations, AMF, SMF, UPF, and/or the PCF. For example, the base stations may comprise a source base station (e.g. S-(R)AN) and/or a target base station (e.g. T-(R)AN). Although not completely shown in the FIG. 27, each of or all the base stations may have an interface(s) with the AMF and connect to the AMF, and/or each of or all the base stations may have an interface(s) with the UPF and connect to the UPF. In an example, the 5G communication network may comprise an AF. In an example, UE 1 may send SDF 1 to the application server/receiver via the S-(R)AN and the UPF; UE 2 may send SDF 2 to the application server/receiver via the S-(R)AN and the UPF; UE 3 may send SDF 3 to the application server/receiver via the S-(R)AN and the UPF. The UE 1 may comprise a camera 1 and the SDF 1 may comprise video data 1. The UE 2 may comprise a camera 2 and the SDF 2 may comprise video data 2. The UE 3 may comprise a camera 3 and the SDF 3 may comprise video data 3. The SDF 1, SDF 2, and SDF 3 may be concurrent stream/data flows need to be synchronized by the 5G communication network. The SDF 1, SDF 2, and SDF 3 may be part of an application (e.g. a holographic view) respectively, and the application server/receiver may reconstruct the application by the SDF 1, SDF 2 and SDF 3. In an example, the application server may be a receiver. In an example, the application server may connect to a receiver. The receiver may be a control function/management function of an application. The receiver may be a wireless device. In an example, the application server/receiver may send multiple SDFs/packet flows and/or QoS flows to multiple UEs via the 5G communication network in a downlink direction, and the multiple SDFs/packet flows and/or QoS flows need to be synchronized by the communication network.

In an example, the UE 1, UE 2 and UE 3 may handover together from the S-(R)AN to a target base station (e.g. T-(R)AN). For example, UE 1, UE 2 and UE 3 may be three drones flying together and may handover together from the S-(R)AN to the T-(R)AN. For example, UE 1, UE 2 and UE 3 may be sensors/equipment in a moving ambulance, and may handover together from the S-(R)AN to the T-(R)AN. In an example, during the handover and/or after handover, the multiple UEs may send multiple data flows to the application server/receiver via the T-(R)AN and/or the UPF in an uplink direction. In an example, during the handover and/or after handover, the application server/receiver may send multiple data flows to the UEs via the UPF and/or the T-(R)AN in a downlink direction.

Figure 28:
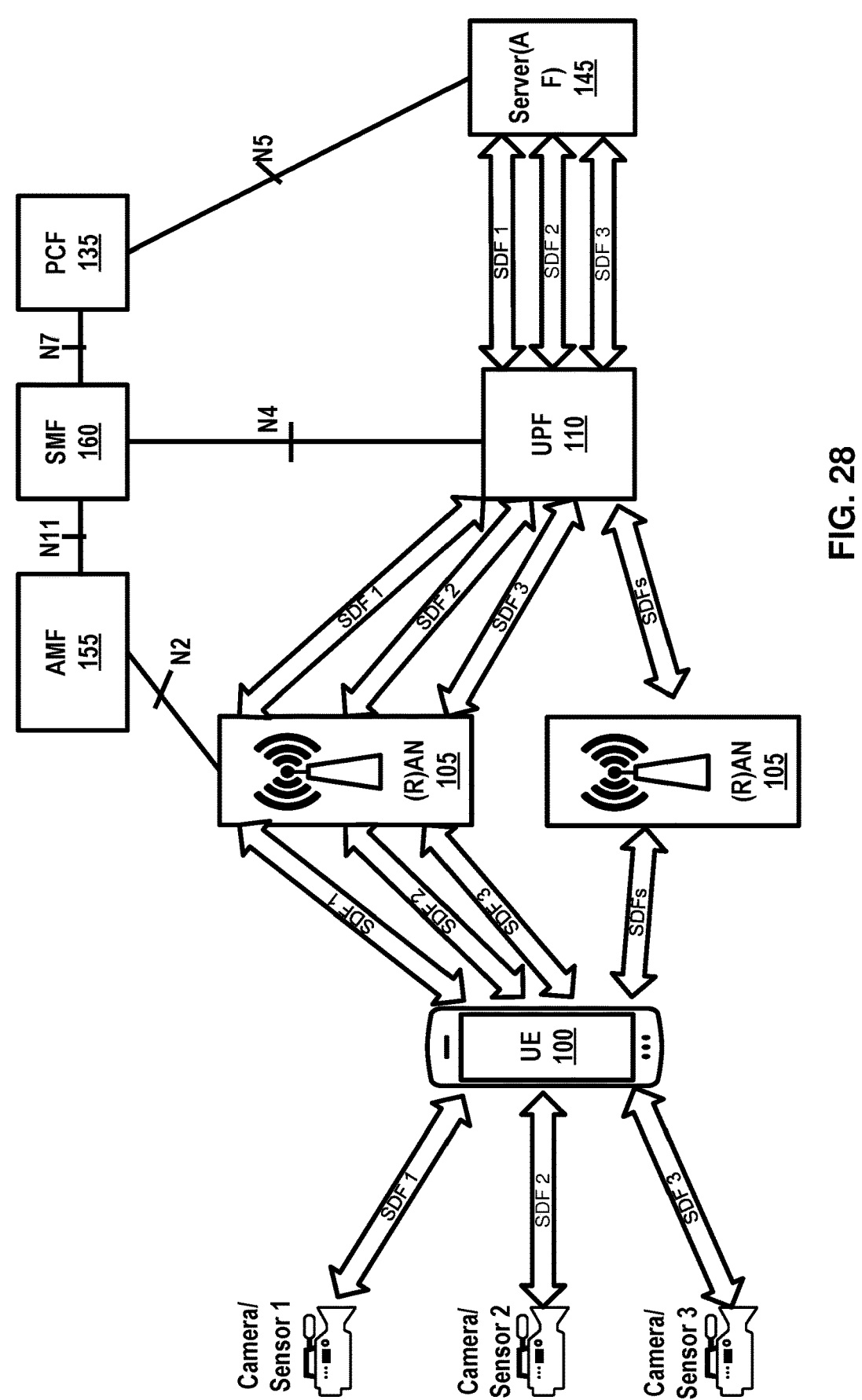
FIG. 28 illustrates an example mobile communication networks supporting handover for synchronization of multiple service data flows as per an aspect of an embodiment of the present disclosure.

FIG. 28 illustrates an example 5G mobile communication networks supporting handover for synchronization of multiple data flows. In an example, there may be multiple data sources (e.g. cameras, sensors) connecting to a wireless device (UE), each data source may send different data flow(s) to the UE via a near field communication network (e.g. bluetooth, wifi, etc.), the UE may map different data flow(s) to different SDFs, and may send the different SDFs to an application server/receiver (e.g. a Holographic-Type Communication (HTC) server) via the 5G communication network (e.g. a base station and/or a UPF) in a uplink direction, and the HTC server may perform the hologram image reconstruction. In an example, the application server/receiver may send multiple data flows to the UE via the 5G communication network in a downlink direction, and the multiple data flows need to be synchronized by the 5G communication network. The UE may send map the multiple data flows to different data flows and send to the different data sources. In an example, although not shown completely in the figure, all base stations may connect to the AMF and/or the UPF.

In an example, the UE may handover from the source base station (e.g. S-(R)AN) to a target base station (e.g. T-(R) AN). For example, the UE may be a drone and may take multiple cameras/sensors, and the UE may handover from the S-(R)AN to the T-(R)AN. For example, the UE in a moving ambulance may connect to multiple sensors/equipment, and the UE may handover from the S-(R)AN to the T-(R)AN. In an example, during the handover and/or after handover, the UE may send multiple data flows to the application server/receiver via the T-(R)AN and/or the UPF in an uplink direction. In an example, during the handover and/or after handover, the application server/receiver may send multiple data flows to the UE via the UPF and/or the T-(R)AN in a downlink direction.

Figure 29:
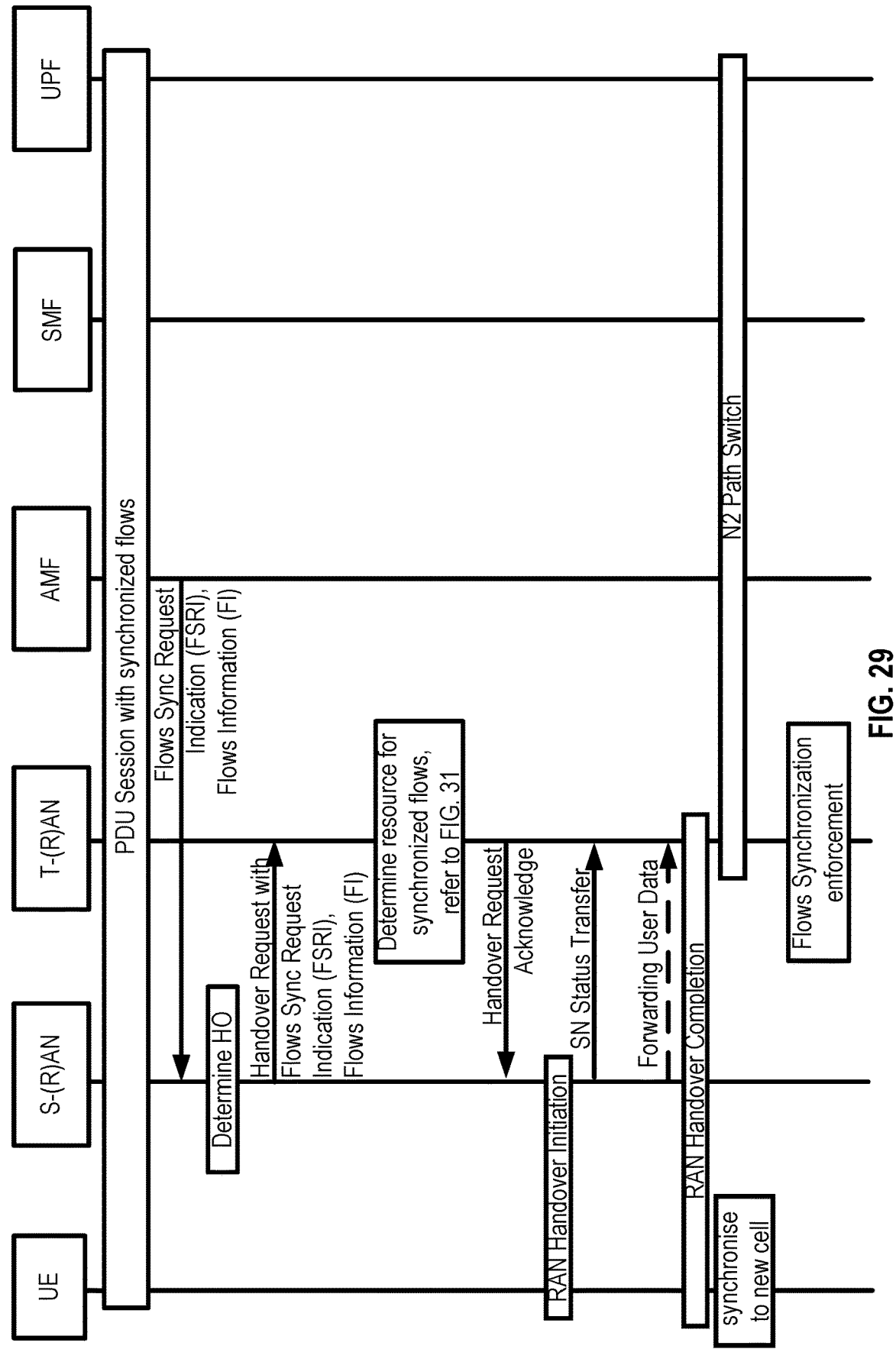
FIG. 29 is an example call flow as per an aspect of an embodiment of the present disclosure.

FIG. 29 is an example call flow which may comprise one or more actions. In an example, a UE may have established a PDU session with a 5G communication network. The UE may send/receive multiple data packets to/from a server (AF)/receiver via the 5G communication network (e.g. a S-(R)AN and/or a UPF). The S-(R)AN and/or UPF may schedule the data packets synchronously (e.g. at the same time or within some acceptable time difference). In an example, the data packet may comprise at least one header and/or a payload. For example, the data packet may be an Ethernet data packet. For example, the data packet may be an IP data packet. For example, the data packet may be a TCP/IP data packet. For example, the data packet may be a UDP/IP data packet.

In an example, the S-(R)AN may receive a message (e.g. N2 PDU session request) from the AMF. The N2 PDU session request message may comprise at least one information element: a flows synchronization indication, flow information of multiple data flows, time configuration information, PDU session identifier; QoS profile(s), at least one QoS control rule; at least one packet detection rule; CN Tunnel Info, accepted network slices; UE IP address(es); HTC DNN, and/or Header Compression Configuration.

In an example, the flows synchronization indication may indicate requesting synchronization of the multiple data flows. In an example, the flow information of multiple data flows may comprise flow identifiers of the multiple SDFs/packet flows and/or flow filter information of the multiple SDFs/packet flows. For example, the flow information of multiple data flows may comprise one or more flow identifiers of one or more QoS flows and/or flow filter information of the one or more QoS flows. In an example, the flow filter information may comprise an IP packet filter set and/or an Ethernet packet filter set. For example, the IP packet filter set may comprise at least any combination of: source/destination IP address or IPv6 prefix, source/destination port number, protocol ID of the protocol above IP/Next header type, Type of Service (TOS) (IPv4)/Traffic class (IPv6) and Mask, Flow Label (IPv6), security parameter index, and/or packet filter direction. For example, the Ethernet packet filter set may comprise at least any combination of: source/destination MAC address, Ethertype as defined in IEEE 802.3, Customer-VLAN tag (C-TAG) and/or Service-VLAN tag (S-TAG) VIP fields as defined in IEEE 802.1Q, Customer-VLAN tag (C-TAG) and/or Service-VLAN tag (S-TAG) PCP/DEI fields as defined in IEEE 802.1Q, packet filter direction, and/or a IP packet filter set in the case that Ethertype indicates IPv4/IPv6 payload.

In an example, the time configuration information may indicate timestamp configuration information of the multiple data flows for synchronization. The time configuration information may comprise at least one of: a timestamp type, a timestamp size, a timestamp location and/or an accepted time difference between multiple data flows for synchronization. The timestamp type may indicate at least one of: an absolute time, a relative time and/or an NTP timestamp. The timestamp size may indicate how many octets/bits (e.g. 8 octets, 64 bits) the timestamp occupies in a data packet. The timestamp location may indicate the position of the timestamp in a data packet. For example, the timestamp may be in an IP header (e.g. IP option 4). For example, the timestamp may be in a Transmission Control Protocol (TCP) header. For example, the timestamp may be at the end of the payload of an Ethernet packet. For example, the timestamp may be at the end of the payload of an TCP/IP packet. For example, the timestamp may be at the end of the payload of an IP packet. For example, an accepted time difference may be 2 millisecond, timestamp of SDF 1 is 1000 and timestamp of SDF 2 is 1001, as the time difference between SDF 1 and SDF 2 is 1 millisecond which is less than the accepted time difference, then, the SDF 1 and SDF 2 may be scheduled synchronously. The PDU session identifier may indicate identifier of a PDU session. In an example, the QoS profile(s) and/or the at least one QoS control rule may be used to authorize QoS on a service data flow/packet flow/QoS flow. In an example, the QoS profile(s) and/or the at least one QoS control rule may comprise a QoS class identifier (e.g. QCI, 5QI), an priority (e.g. ARP), and/or at least one bandwidth value for uplink and/or downlink service data flow(s)/packet flow (s)/QoS flow(s). The at least one packet detection rule may be used for the S-(R)AN to detect incoming packets and may apply to the at least one QoS control rule if the incoming packets matched to the at least one packet detection rule. In an example, the at least one packet detection rule may comprise data/traffic packet detection information (e.g. one or more match fields against which incoming packets are matched) and may apply the QoS profile(s) and/or the at least one QoS control rule to the data/traffic packets matching the at least one packet detection rule.

In an example, the at least one packet detection rule may comprise the flow information. In an example, the at least one QoS control rule may comprise the flow information. The CN Tunnel Info may comprise Core Network address(es) (e.g. UPF address) corresponding to the PDU session. The SMF may allocate UE IP address(es) and send the UE IP address(es) to the S-(R)AN and/or the UE via the AMF. The Header Compression Configuration may comprise configuration information for header compression performed by the S-(R)AN and/or the UE. The accepted network slices may comprise accepted/allowed network slices (e.g. an HTC network slice). In an example, the accepted network slices and/or the HTC network slice may be applied to the multiple data flows. In an example, the HTC network slice may indicate a network slice with an HTC service type. In an example, the HTC network slice may indicate the multiple data flows of the HTC network slice are requested to be synchronized. In an example, the HTC DNN may be applied to the multiple data flows. In an example, the HTC DNN may indicate the multiple data flows of the DNN are requested to be synchronized.

In response to the message received from the AMF, the S-(R)AN may take one or more actions. The actions taken by the S-(R)AN may be similar to the actions taken by the S-(R)AN as described above with respect to the FIG. 20. For brevity, further description will not be repeated here.

In an example, the S-(R)AN may determine to handover the UE based on MeasurementReport received from the UE and RRM information. The S-(R)AN may send to a target base station (e.g. T-(R)AN) a message (e.g. handover request) to request a handover. In an example, the handover request message may indicate requesting synchronization of the multiple data flows associated with DRB(s) during handover and/or after handover. In an example, the handover request message may comprise at least one information element: the flows synchronization indication, the flow information of the multiple data flows, the time configuration information, the PDU session identifier; the QoS profile(s) and/or the at least one QoS control rule, the at least one packet detection rule, the CN Tunnel Info, the accepted network slices (e.g. the HTC network slice), the UE IP address(es), the HTC DNN, the Header Compression Configuration, a target cell ID, RRM-configuration including UE inactive time, current QoS flows to DRBs mapping rules applied to the UE (e.g. the multiple data flows to DRBs mapping information), SIB information (e.g. SIB1 from the S-(R)AN), and/or UE capabilities for different RATs. In an example, the flows synchronization indication may indicate requesting synchronization of the multiple data flows associated with DRB(s).

In response to the message received from the S-(R)AN, the T-(R)AN may take one or more actions. In an example action, based on the handover request message, the T-(R)AN may determine resources for the multiple data flows associated with DRB(s) which are needed to be synchronized. For example, based on the flows synchronization indication, the flow information of the multiple data flows, the time configuration information, the PDU session identifier; the QoS profile(s) and/or the at least one QoS control rule, the at least one packet detection rule, the accepted network slices, the HTC DNN, the target cell ID, the RRM-configuration, the current QoS flows to DRBs mapping rules applied to the UE, the SIB information and/or the UE capabilities for different RATs, the T-(R)AN may determine resources (e.g. DRB(s) of the T-(R)AN) for the multiple data flows associated with DRB(s) of the S-(R)AN, wherein the multiple data flows are needed to be synchronized. For example, the T-(R)AN may determine resources (e.g. DRB(s) of the T-(R)AN) are available for all the multiple data flows. For example, based on one or more information elements of the handover request message, the T-(R)AN may determine resources (e.g. DRB(s) of the T-(R)AN) for the multiple data flows associated with the HTC network slice. For example, based on one or more information elements of the handover request message, the T-(R)AN may determine resources (e.g. DRB(s) of the T-(R)AN) for the multiple data flows associated with the HTC DNN. In an example, the T-(R)AN may determine the resources (e.g. DRB(s) of the T-(R)AN) for the multiple data flows are available. For example, the T-(R)AN may determine the resources (e.g. DRB(s) of the T-(R)AN) for the multiple data flows are not available, e.g. resource is not available for one of the multiple data flows.

In an example action, based on the handover request message, the T-(R)AN may determine whether support the synchronization of the multiple data flows. For example, based on one or more information elements of the handover request message (e.g. the flows synchronization indication and/or the flow information), the T-(R)AN may determine whether the T-(R)AN is able to enforce the synchronization of the multiple SDFs. For example, the T-(R)AN may determine that the T-(R)AN is able to enforce the synchronization of the multiple SDFs. For example, the T-(R)AN may determine that the T-(R)AN is not able to enforce the synchronization of the multiple data flows.

In an example action, based on the determining (s), the T-(R)AN may send a response message (e.g. handover request acknowledgement) to the S-(R)AN. The handover request acknowledgement message may comprise at least one information element: user plane address of the T-(R)AN, a cause value indicating the handover request is rejected/ failure, a cause value indicating the handover request is accepted/success, a cause value indicating the resources (e.g. DRB(s) of the T-(R)AN) for the multiple data flows are available, a cause value indicating the resources (e.g. DRB(s) of the T-(R)AN) for the multiple data flows are not available, a cause value indicating the T-(R)AN is able to enforce the synchronization of the multiple data flows, a cause value indicating the T-(R)AN is not able to enforce the synchronization of the multiple data flows.

In response to the message received from the T-(R)AN, the S-(R)AN may take one or more actions. In an example action, the S-(R)AN may trigger the air interface handover by sending a message (e.g. RRCReconfiguration) to the UE. The RRCReconfiguration message may comprise the information required to access the target cell. For example, the RRCReconfiguration message may comprise at least one of: a target cell ID, the new C-RNTI, T-(RAN) security algorithm identifiers for the selected security algorithms, a set of dedicated RACH resources, association between RACH resources and SSB(s), association between RACH resources and UE-specific CSI-RS configuration(s), common RACH resources, and/or system information of the target cell, etc. In an example action, the S-(R)AN may send SN STATUS TRANSFER message to the T-(R)AN. In an example, the UE may synchronize to the target cell and may complete the RRC handover procedure by sending RRCReconfiguration- Complete message to T-(R)AN. In an example, the T-(R)AN may send a PATH SWITCH REQUEST message to the AMF/SMF to switch the downlink data path towards the T-(R)AN. The AMF/SMF may confirm the PATH SWITCH REQUEST message by sending a PATH SWITCH REQUEST ACKNOWLEDGE message to the T-(R)AN. In response to receive the PATH SWITCH REQUEST ACKNOWLEDGE message from the AMF/SMF, the T-(AN) may send a UE CONTEXT RELEASE to inform the S-(R)AN about the success of the handover. The S-(R)AN may release radio and C-plane related resources associated to the UE context.

In an example action, during the handover and/or after the handover, the T-(R)AN may enforce the synchronization of the multiple data flows. In an example, the T-(R)AN may receive data packets from the UE during the handover and/or after the handover. In an example, the data packets sent by the UE may comprise a timestamp as described above. In an example action, in response to the data packets received from the UE, and/or in response to the handover request message received from the S-(R)AN, based on the flows synchronization indication, the time configuration information, the QoS profile(s) and/or the at least one QoS control rule; the at least one packet detection rule, and/or timestamp in the data packets, the T-(R)AN may enforce synchronization of the data packets by scheduling the data packets synchronously (e.g. at the same time or within some acceptable time difference).

In an example, the T-(R)AN may receive data packets from the UPF during the handover and/or after the handover. For example, the T-(R)AN may receive data packets from the server (AF)/receiver via the UPF. In an example, the data packets may comprise a timestamp. For example, the timestamp may indicate a time when the server (AF)/receiver sent the data packets as described above. In an example action, in response to the data packets received from the UPF, and/or in response to the handover request message received from the S-(R)AN, based on the flows synchronization indication, the time configuration information, the QoS profile(s) and/or the at least one QoS control rule; the at least one packet detection rule, and/or the timestamp in the data packets, the T-(R)AN may enforce synchronization of the data packets by scheduling the data packets synchronously (e.g. at the same time or within some acceptable time difference). In an example action, the T-(R)AN may send/ forward the data packets to the UE(s) synchronously.

The above example embodiments may apply to multiple UEs scenario (e.g. FIG. 27). The procedure for multiple UEs scenario may be similar to the procedure as described above with respect to the FIG. 20. For brevity, further description will not be repeated here.

Figure 30:
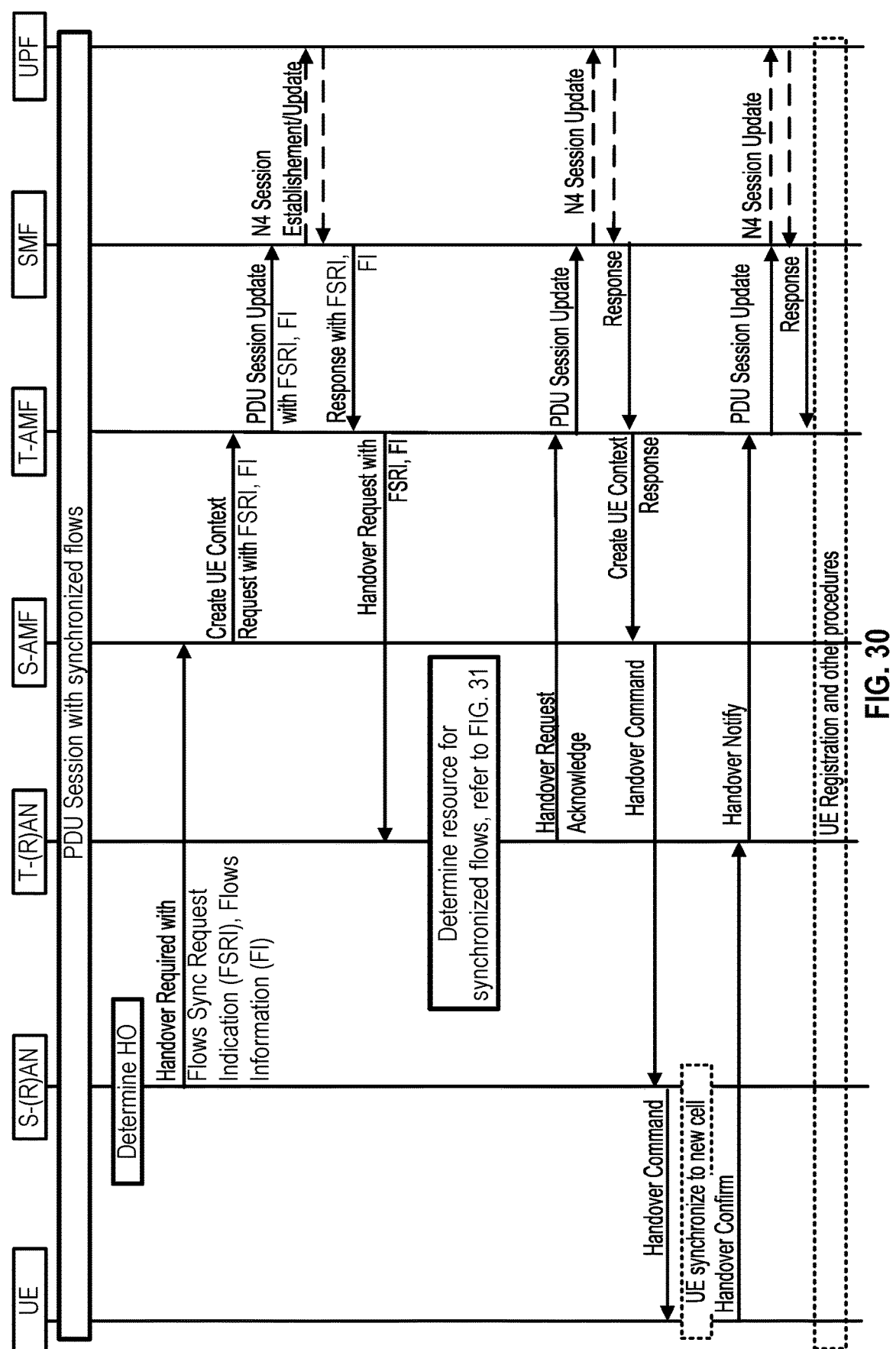
FIG. 30 is an example call flow as per an aspect of an embodiment of the present disclosure.

FIG. 30 is an example call flows which may comprise one or more actions. In an example, a UE may have established a PDU session with a 5G communication network. The UE may send/receive multiple data packets to/from a server (AF)/receiver via the 5G communication network (e.g. a S-(R)AN and/or a UPF). The S-(R)AN and/or UPF may schedule the data packets synchronously (e.g. at the same time or within some acceptable time difference). In an example, the S-(R)AN may receive a message (e.g. N2 PDU session request) from the AMF. The N2 PDU session request message may comprise at least one information element: a flows synchronization indication, flow information of multiple data flows, time configuration information, PDU session identifier; QoS profile(s), at least one QoS control rule; at least one packet detection rule; CN Tunnel Info, accepted network slices; UE IP address(es); HTC DNN, and/or Header Compression Configuration. The definition/meaning/content of at least one information element in the N2 PDU session request message may be similar to the definition/meaning/content of at least one information element in the N2 PDU session request message as described above with respect to FIG. 29. For brevity, further description will not be repeated here.

In an example, the S-(R)AN may determine to handover the UE based on MeasurementReport received from the UE and RRM information. The S-(R)AN may send a message (e.g. handover required) to a target base station (e.g. T-(R) AN) to request a handover. In an example, there may not be a direct interface (e.g. Xn interface) between the S-(R)AN and the T-(R)AN. For example, the S-(R)AN may perform a N2 based handover procedure. For example, the S-(R)AN may send the handover required message to the T-(R)AN via a source AMF (e.g. S-AMF) and/or a target AMF (T-AMF). For example, the S-(R)AN may send the handover required message to the S-AMF. The handover required message may comprise at least one information element: the flows synchronization indication, the flow information of the multiple data flows, the time configuration information, the PDU session identifier; the QoS profile(s) and/or the at least one QoS control rule, the at least one packet detection rule, the CN Tunnel Info, the accepted network slices (e.g. the HTC network slice), the UE IP address(es), the HTC DNN, the Header Compression Configuration, a target cell ID, RRM-configuration including UE inactive time, current QoS flows to DRBs mapping rules applied to the UE (e.g. the multiple data flows to DRBs mapping information), SIB information (e.g. SIB1 from the S-(R)AN), and/or UE capabilities for different RATs. In response to the handover required message received from the S-(R)AN, the S-AMF may send to the T-AMF a create UE context request message comprising one or more information elements of the handover required message. In response to the message received from the S-AMF, the T-AMF may send a message (e.g. PDU session update) to an SMF, the PDU session update message may comprise one or more information elements of the create UE context request message. The SMF may send a message (N4 session establishment/modification request) to a UPF. The N4 session establishment/modification request message may comprise at least one user plane rule for a user plane session. In an example, the at least one user plane rule may comprise at least one of: the flows synchronization indication, the time configuration information, the flow information of the multiple data flows, at least one packet detection rule; at least one forwarding action rule; at least one QoS enforcement rule; and/or at least one usage reporting rule. In an example, the UPF may send a N4 session establishment/modification response message to the SMF. The N4 session establishment/modification response message may comprise CN N3 Tunnel Info (e.g. user plane address of the UPF).

In response to the message received from the UPF, the SMF may send a PDU session update response message to the T-AMF. The PDU session update response message may comprise the CN N3 Tunnel Info. In response to the message received from the SMF, the T-AMF may send to the T-(R) AN a handover request message. The handover request message may comprise one or more information elements of the create UE context request message. In an example, the handover request message may comprise the CN N3 Tunnel Info. In response to the message received from the S-(R)AN (e.g. via the S-AMF and/or the T-AMF), the T-(R)AN may take one or more actions. In an example action, based on one or more information elements of the handover request message, the T-(R)AN may determine resources (e.g.

DRB(s) of the T-(R)AN) for the multiple data flows. In an example action, based on the handover request message, the T-(R)AN may determine whether support the synchronization of the multiple data flows. The one or more actions taken by the T-(R)AN may be similar to the actions taken by the T-(R)AN when the T-(R)AN receiving a handover request message as described above with respect to FIG. 20. For brevity, further description will not be repeated here.

In an example action, based on the determining (s), the T-(R)AN may send a response message (e.g. handover request acknowledgement) to the S-(R)AN via the T-AMF and/or the S-AMF. For example, the T-(R)AN may send the handover request acknowledgement message to the T-AMF. The handover request acknowledgement message may comprise at least one information element: AN Tunnel Info (e.g. user plane address of the T-(R)AN), a cause value indicating the handover request is rejected/failure, a cause value indicating the handover request is accepted/success, a cause value indicating the resources (e.g. DRB(s) of the T-(R)AN) for the multiple data flows are available, a cause value indicating the resources (e.g. DRB(s) of the T-(R)AN) for the multiple data flows are not available, a cause value indicating the T-(R)AN is able to enforce the synchronization of the multiple data flows, a cause value indicating the T-(R)AN is not able to enforce the synchronization of the multiple data flows. In response to the message received from the T-(R)AN, the T-AMF may send a PDU session update request message to the SMF. The PDU session update request message may comprise the information (e.g. AN Tunnel Info, cause value) received from the T-(R)AN. The SMF may send a message (N4 session establishment/modification request) to the UPF. The N4 session establishment/modification request message may comprise the AN Tunnel Info and/or the at least one user plane rule for the user plane session. In an example, the UPF may send a N4 session establishment/modification response message to the SMF. The N4 session establishment/modification response message may comprise CN N3 Tunnel.

In response to the message received from the UPF, the SMF may send a PDU session update response message to the T-AMF. The PDU session update response message may comprise the CN N3 Tunnel Info. In response to the message received from the SMF, the T-AMF may send a create UE context response message to the S-AMF. The create UE context response message may comprise one or more information of the handover request acknowledgement message. In response to the message received from the T-AMF, the S-AMF may send a handover command message to the S-(R)AN. The handover command message may comprise one or more information element of the create UE context response message. In response to the message received from the S-AMF, the S-(R)AN may send a handover command message to the UE. The handover command message may comprise radio parameters that the T-(R)AN has setup. In an example, after the UE has successfully synchronized to the target cell, it may send a handover confirm message to the T-RAN. The handover confirm message may indicate that the handover is considered as successful by the UE. In response to the message received from the UE, the T-(R)AN may send a handover notify message to the T-AMF. The handover notify message may indicate that the handover is considered as successful by the T-(R)AN.

In an example action, during the handover and/or after the handover, the T-(R)AN may enforce the synchronization of the multiple data flows, e.g. by scheduling the multiple data flows at the same time or within some acceptable time difference. The procedure of enforcing the synchronization of the multiple data flows may be similar to the procedure of enforcing the synchronization as described above with respect to FIG. 20. For brevity, further description will not be repeated here.

Figure 31:
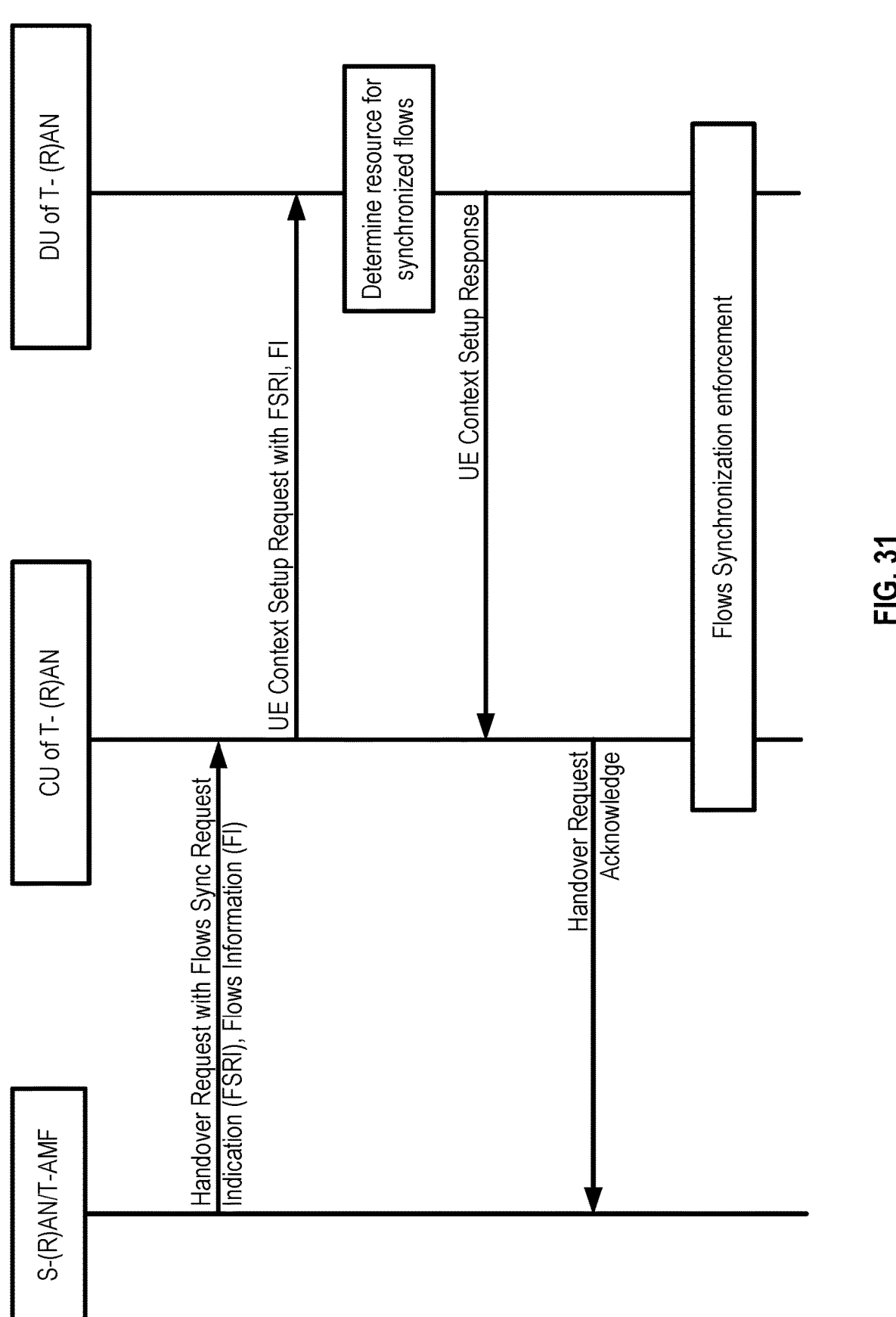
FIG. 31 is an example call flow as per an aspect of an embodiment of the present disclosure.

FIG. 31 is an example call flows which may comprise one or more actions. In an example, a T-(R)AN (e.g. CU of the T-(R)AN) may receive a message (e.g. handover request) from a S-(R)AN. For example, as shown in FIG. 29, the T-(R)AN may receive the handover request message from the S-(R)AN. For example, as shown in FIG. 30, the T-(R)AN may receive the handover request message from the S-(R)AN via the S-AMF and/or T-AMF. The handover request message may comprise at least one information element: the flows synchronization indication, the flow information of the multiple data flows, the time configuration information, the PDU session identifier; the QoS profile(s) and/or the at least one QoS control rule, the at least one packet detection rule, the CN Tunnel Info, the accepted network slices (e.g. the HTC network slice), the UE IP address(es), the HTC DNN, the Header Compression Configuration, a target cell ID, RRM-configuration including UE inactive time, current QoS flows to DRBs mapping rules applied to the UE (e.g. the multiple data flows to DRBs mapping information), SIB information (e.g. SIB1 from the S-(R)AN), and/or UE capabilities for different RATs.

The procedure/actions of the CU of the T-(R)AN may be similar to the procedure/actions of the CU of the T-(R)AN as described above with respect to FIG. 24. For brevity, further description will not be repeated here. The procedure/actions of the DU of the T-(R)AN may be similar to the procedure/actions of the DU of the T-(R)AN as described above with respect to FIG. 24. For brevity, further description will not be repeated here.

In an example, a target base station may receive a handover request message from a source base station (S-BS). The handover request message may comprise a flows synchronization request indication (FSRI) requesting synchronization of multiple service data flows (SDFs). In an example, the T-BS may receive packets of the multiple SDFs. In an example, based on the FSRI, T-BS may enforce synchronization of the multiple SDFs. In an example embodiment, the handover request message may further comprise at least one of: flow information of the multiple SDFs; a holographic-type communication (HTC) network slice for the multiple SDFs; an HTC data network name (DNN) for the multiple SDFs; and/or time configuration information. In an example embodiment, the flow information of the multiple SDFs may further comprise at least one of: flow identifiers of the multiple SDFs; and/or flow filter information of the multiple SDFs. In an example embodiment, the flow information may further comprise at least one of: an IP packet filter set; and/or an Ethernet packet filter set. In an example embodiment, the HTC network slice may indicate a network slice with an HTC service type. In an example embodiment, the HTC network slice may indicate the multiple SDFs of the HTC network slice are requested to be synchronized. In an example embodiment, the HTC DNN may indicate the multiple SDFs of the DNN are requested to be synchronized.

In an example embodiment, the time configuration information may further comprise at least one of: a timestamp type; a timestamp size; a timestamp location; and/or an accepted time difference between SDFs/traffic data flows/QoS flow(s) for synchronization. In an example embodiment, the T-BS may send to the S-BS, a handover request acknowledgement message based on the determining. In an example embodiment, the handover request acknowledgement message may comprise a cause value indicating the resources are not available. In an example embodiment, the cause value may indicate the result of the handover. In an example embodiment, based on the FSRI, the target base station (T-BS) may determine whether resources are available for the multiple SDFs. In an example embodiment, the determining may determine that the resources are not available. In an example embodiment, the determining may determine that the resources are available. In an example embodiment, based on the FSRI, the T-BS may determine, at least one data radio bearers (DRB) applied to the multiple SDFs. In an example embodiment, based on the FSRI, the T-BS may determine, whether resources are available for a HTC network slice. In an example embodiment, based on measurement report received from a wireless device, the S-BS may determine a handover to the T-BS. In an example embodiment, each of the multiple SDFs may comprise timestamp information indicating when the each of the multiple SDFs was sent. In an example embodiment, the enforcing may comprise scheduling data packets of the multiple SDFs at the same time or within some acceptable time difference. In an example embodiment, the T-BS may send the packets of the multiple SDFs to a second network function. In an example embodiment, the scheduling data packets may be based on time configuration information. In an example embodiment, the scheduling data packets may be based on timestamp information of each of the multiple SDFs. In an example embodiment, the timestamp information may be a relative time. In an example embodiment, the timestamp information may be an absolute time. In an example embodiment, based on the FSRI, the target base station (T-BS) may determine whether the T-BS is able to enforce the synchronization of the multiple SDFs. In an example embodiment, based on the determining, the T-BS may send a handover request acknowledgement message to the S-BS. In an example embodiment, the handover request acknowledgement message may comprise a cause value indicating the synchronization of the multiple SDFs is not be able to be enforced.

In an example, a source base station may receive a first message from a first network function. The first message may comprise a flows synchronization request indication (FSRI) requesting synchronization of multiple service data flows (SDFs). In an example, the source base station may send to a target base station a handover request message comprising the FSRI. In an example, based on the FSRI, the source base station may receive a handover request acknowledgement message from the target base station. In an example embodiment, the first message may further comprise at least one of: flow information of the multiple SDFs; a holographic-type communication (HTC) network slice for the multiple SDFs; an HTC data network name (DNN) for the multiple SDFs; and/or time configuration information. In an example embodiment, the source base station may receive packets of the multiple SDFs. In an example embodiment, based on the FSRI, the source base station may enforce the synchronization of the multiple SDFs. In an example embodiment, the enforcing may be based on time configuration information. In an example embodiment, each of the multiple SDFs may comprise timestamp information indicating when the each of the multiple SDFs was sent. In an example embodiment, the enforcing may be based on timestamp information.

In an example, a target base station may receive a handover request message from a source base station (S-BS). The handover request message may comprise a flows synchronization request indication (FSRI) requesting synchronization of multiple service data flows (SDFs). In an example, based on the FSRI, the target base station (T-BS) may determine whether resources are available for the multiple SDFs. In an example, the T-BS may receive packets of the multiple SDFs. In an example, based on the FSRI, the T-BS may enforce synchronization of the multiple SDFs. In an example embodiment, the handover request message may be transferred from the source base station to the target base station via a source first network function (FNF) and a target FNF. In an example embodiment, the handover request acknowledgement message may be transferred from the target base station to the source base station via the target FNF and the source FNF. In an example embodiment, the determining may determine that the resources are not available. In an example embodiment, the handover request acknowledgement message may comprise a cause value indicating the resources are not available. In an example embodiment, the handover request message may further comprise at least one of: flow information of the multiple SDFs; a holographic-type communication (HTC) network slice for the multiple SDFs; an HTC data network name (DNN) for the multiple SDFs; and/or time configuration information.

In an example, a centralized unit (CU) of a target base station may receive a first message from a source base station. The first message may comprise a flows synchronization request indication (FSRI) indicating requesting synchronization of multiple service data flows (SDFs). In an example, the CU of the target base station may send the FSRI to a distributed unit of the target base station. In an example, the CU may receive the multiple SDFs. In an example, the target base station may enforce flows synchronization of the multiple SDFs. In an example, a distributed unit (DU) of a target base station may receive a UE context setup request message from a central unit (CU) of the target base station. The UE context setup request message may comprise a flows synchronization request indication (FSRI) indicating requesting synchronization of multiple service data flows (SDFs). In an example, based on the FSRI, the DU may determine whether resources are available for both the multiple SDFs. In an example, based on the determining, the DU may send a UE context setup response message to the CU.

In an example, a centralized unit (CU) of a target base station may receive a first message from a target first network. The first message may comprise a flows synchronization request indication (FSRI) indicating requesting synchronization of multiple service data flows (SDFs). In an example, the CU of the target base station may send the FSRI to a distributed unit of the target base station. In an example, the CU may receive the multiple SDFs. In an example, the target base station may enforce flows synchronization of the multiple SDFs.

According to various embodiments, one or more devices such as, for example, a wireless device, off-network wireless device, a base station, a core network device, and/or the like, may be employed in a system. One or more of the devices may be configured to perform particular operations or actions by virtue of having software, firmware, hardware, or a combination of them installed on the one or more of the devices, that in operation causes or cause the one or more devices to perform the actions. One or more computer programs can be configured to perform particular operations or actions by virtue of including instructions that, when executed by data processing apparatus, cause the apparatus to perform the actions. Embodiments of example actions are illustrated in the accompanying figures and specification.

Features from various embodiments may be combined to create yet further embodiments.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various Examples. If A and B are sets and every element of A is an element of B, A is called a subset of B. In this specification, only non-empty sets and subsets are considered. For example, possible subsets of B={cell1, ce112} are: {cell1}, {cell2}, and {cell1, cell2}.

In this specification, various Examples are disclosed. Limitations, features, and/or elements from the disclosed example Examples may be combined to create further Examples within the scope of the disclosure.

In this specification, various Examples are disclosed. Limitations, features, and/or elements from the disclosed example Examples may be combined to create further Examples within the scope of the disclosure.

In this specification, parameters (Information elements: IEs) may comprise one or more objects, and one of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example, when one or more messages comprise a plurality of parameters, it implies that a parameter in the plurality of parameters is in at least one of the one or more messages, but does not have to be in one of the one or more messages.

Many of the elements described in the disclosed Examples may be implemented as modules. A module is defined here as an isolatable element that performs a defined function and has a defined interface to other elements. The modules described in this disclosure may be implemented in hardware, software in combination with hardware, firmware, wetware (e.g. hardware with a biological element) or a combination thereof, some of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various Examples have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative Examples. Thus, the present Examples should not be limited by any of the above described exemplary Examples. In particular, it should be noted that, for example purposes, the above explanation has focused on the example(s) using 5G AN. However, one skilled in the art will recognize that Examples of the invention may be implemented in a system comprising one or more legacy systems or LTE. The disclosed methods and systems may be implemented in wireless or wireline systems. The features of various Examples presented in this invention may be combined. One or many features (method or system) of one Example may be implemented in other Examples. A limited number of example combinations are shown to indicate to one skilled in the art the possibility of features that may be combined in various Examples to create enhanced transmission and reception systems and methods.

In addition, it should be understood that any figures which highlight the functionality and advantages, are presented for example purposes. The disclosed architecture is sufficiently flexible and configurable, such that it may be utilized in ways other than that shown. For example, the actions listed in any flowchart may be re-ordered or optionally used in some examples.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

The invention claimed is:

1. A method comprising:
receiving, by a second base station from a first base station, a message comprising an indication requesting synchronization of data flows of one or more wireless devices;
receiving, by the second base station from the one or more wireless devices, packets of the data flows, each data flow comprising a respective timestamp indicating when the data flow is sent; and
based on the indication requesting the synchronization and the respective timestamp of each data flow, synchronizing forwarding, by the second base station to a user plane function, of the packets of the data flows.

2. The method of claim 1, wherein:
the message further comprises a holographic-type communication (HTC) data network name (DNN) for the data flows, the HTC DNN indicating that the data flows are requested to be synchronized; and the synchronizing forwarding is between the one or more wireless devices and the user plane function.

3. The method of claim 2, further comprising receiving, by the second base station from the user plane function, downlink packets of the packets of the data flows.

4. The method of claim 3, wherein the synchronizing forwarding comprises synchronizing transmitting, by the second base station to the one or more wireless devices, of the downlink packets.

5. The method of claim 1, further comprising receiving, by the second base station from a first wireless device, first packets of a first data flow of the data flows.

6. The method of claim 5, further comprising receiving, by the second base station, second packets of a second data flow of the data flows.

7. The method of claim 6, wherein the synchronizing forwarding comprises synchronizing transmitting, by the second base station to the user plane function, of the first packets and the second packets.

8. The method of claim 6, wherein the second packets are received from the first wireless device.

9. A method comprising:
receiving, by a first base station from a network function, a message comprising an indication requesting synchronization of data flows of one or more wireless devices, each data flow comprising a respective timestamp indicating when the data flow is sent by the network function;
receiving, by the first base station from the one or more wireless devices, packets of the data flows; and
based on the indication requesting the synchronization and the respective timestamp of each data flow, synchronizing forwarding, by the first base station to a user plane function, of the packets of the data flows.

10. The method of claim 9, wherein:
the message further comprises a holographic-type communication (HTC) data network name (DNN) for the data flows, the HTC DNN indicating that the data flows are requested to be synchronized; and
the synchronizing forwarding is between the one or more wireless devices and the user plane function.

11. The method of claim 10, further comprising receiving, by the first base station from the user plane function, downlink packets of the packets of the data flows.

12. The method of claim 11, wherein the synchronizing forwarding comprises synchronizing transmitting, by the first base station to the one or more wireless devices, of the downlink packets.

13. The method of claim 9, further comprising receiving, by the first base station from a first wireless device, first packets of a first data flow of the data flows.

14. The method of claim 13, further comprising receiving, by the first base station, second packets of a second data flow of the data flows.

15. The method of claim 14, wherein the synchronizing forwarding comprises synchronizing transmitting, by the first base station to the user plane function, of the first packets and the second packets.

16. The method of claim 14, wherein the second packets are received from the first wireless device.

17. A second base station, comprising:
one or more processors; and
memory storing instructions that, when executed by the one or more processors, cause the second base station to perform operations comprising:

receiving, from a first base station, a message comprising an indication requesting synchronization of data flows of one or more wireless devices;

receiving, from the one or more wireless devices, packets of the data flows, each data flow comprising a respective timestamp indicating when the data flow is sent; and based on the indication requesting the synchronization and the respective timestamp of each data flow, synchronizing forwarding, to a user plane function, of the packets of the data flows.

18. The second base station of claim 17, wherein:

the message further comprises a holographic-type communication (HTC) data network name (DNN) for the data flows, the HTC DNN indicating that the data flows are requested to be synchronized; and the synchronizing forwarding is between the one or more wireless devices and the user plane function.

19. The second base station of claim 18, wherein the instructions further cause the second base station to perform the operations comprising:

receiving, from the user plane function, downlink packets of the packets of the data flows.

20. The second base station of claim 19, wherein the synchronizing forwarding comprises synchronizing transmitting, by the second base station to the one or more wireless devices, of the downlink packets.

\*  \*  \*  \*  \*